(12) United States Patent
Lake

(10) Patent No.: US 11,884,588 B2
(45) Date of Patent: Jan. 30, 2024

(54) CEMENTITIOUS REAGENTS, METHODS OF MANUFACTURING AND USES THEREOF

(71) Applicant: Terra CO2 Technology Holdings, Inc., Golden, CO (US)

(72) Inventor: Donald John Lake, Vancouver (CA)

(73) Assignee: TERRA CO2 TECHNOLOGY HOLDINGS, INC., Golden, CO (US)

( * ) Notice: Subject to any disclaimer, the term of this patent is extended or adjusted under 35 U.S.C. 154(b) by 0 days.

(21) Appl. No.: 18/106,807

(22) Filed: Feb. 7, 2023

(65) Prior Publication Data

US 2023/0192544 A1    Jun. 22, 2023

Related U.S. Application Data

(63) Continuation of application No. 17/721,140, filed on Apr. 14, 2022, now Pat. No. 11,591,262, which is a continuation of application No. 17/128,404, filed on Dec. 21, 2020, now Pat. No. 11,306,026, which is a continuation-in-part of application No. 16/915,804, filed on Jun. 29, 2020, now Pat. No. 11,104,610.

(60) Provisional application No. 63/025,148, filed on May 14, 2020, provisional application No. 63/004,673, filed on Apr. 3, 2020, provisional application No. 62/867,480, filed on Jun. 27, 2019.

(51) Int. Cl.
| | |
|---|---|
| C04B 12/02 | (2006.01) |
| C04B 7/36 | (2006.01) |
| C04B 7/44 | (2006.01) |
| C04B 14/04 | (2006.01) |

(52) U.S. Cl.
CPC ............ *C04B 12/027* (2013.01); *C04B 7/368* (2013.01); *C04B 7/4453* (2013.01); *C04B 14/041* (2013.01)

(58) Field of Classification Search
CPC ........... C04B 7/43; C04B 7/44; C04B 7/4453; C04B 14/22; C04B 14/30; C04B 20/0036; C04B 20/0012; C04B 20/026; C04B 20/04; C04B 35/62665; C04B 2103/0042; C04B 2111/00327; C04B 2235/528; B05B 7/20; B22F 3/003; C03B 5/00; C03B 19/10; C09K 8/80; F27B 15/00; F27B 15/003; F27B 15/10; F27B 15/14; Y02P 40/121

See application file for complete search history.

(56) References Cited

U.S. PATENT DOCUMENTS

| | | | |
|---|---|---|---|
| 5,830,251 A | 11/1998 | Simpson | |
| 11,104,610 B2 * | 8/2021 | Lake | ............... F27B 15/00 |
| 11,306,026 B2 * | 4/2022 | Lake | ............... C04B 14/041 |
| 11,591,262 B2 * | 2/2023 | Lake | ............... C03B 19/1025 |

* cited by examiner

*Primary Examiner* — Anthony J Green
(74) *Attorney, Agent, or Firm* — FisherBroyles, LLP; Jason P. Mueller

(57) ABSTRACT

Described are cementitious reagent materials produced from globally abundant inorganic feedstocks. Also described are methods for the manufacture of such cementitious reagent materials and forming the reagent materials as microspheroidal glassy particles. Also described are apparatuses, systems and methods for the thermochemical production of glassy cementitious reagents with spheroidal morphology. The apparatuses, systems and methods make use of an in-flight melting/quenching technology such that solid particles are flown in suspension, melted in suspension, and then quenched in suspension. The cementitious reagents can be used in concrete to substantially reduce the $CO_2$ emission associated with cement production.

18 Claims, 20 Drawing Sheets

*520*  *519*

CEMENTITIOUS REAGENTS, METHODS OF MANUFACTURING AND USES THEREOF

CROSS-REFERENCE TO RELATED APPLICATIONS

This application is a Continuation of U.S. application Ser. No. 17/721,140 filed Apr. 14, 2022, now U.S. Pat. No. 11,591,262, which is a Continuation of U.S. application Ser. No. 17/128,404 filed Dec. 21, 2020, now U.S. Pat. No. 11,306,026, which is a Continuation-in-Part of U.S. application Ser. No. 16/915,804 filed Jun. 29, 2020, now U.S. Pat. No. 11,104,610, which claims the benefit under 35 U.S.C. § 119(e) of U.S. Provisional Application Ser. No. 62/867,480, filed Jun. 27, 2019, U.S. Provisional Application Ser. No. 63/004,673, filed Apr. 3, 2020, and U.S. Provisional Application Ser. No. 63/025,148, filed on May 14, 2020, the disclosures of which are incorporated, in their entirety, by this reference.

BACKGROUND

The field of the present disclosure is related to cementitious reagents, and more particularly, to the creation of relatively homogeneous cementitious reagent materials and cementitious materials from abundant heterogeneous feedstocks.

Concrete has played an important role in civilization for thousands of years and is still the most commonly used building material. Concrete may be formed by mixing water, aggregate (e.g., sand, gravel, and/or rock), and cement. Through a hydration process, hydraulic cements bind the aggregate into a solid composite. Concrete may be characterized by the type of aggregate or cement used, the properties it exhibits, or by the methods used in its production.

Cement is the essential binding component of concrete that allows flowable concrete slurries to harden into a useful composite material at ambient temperatures. Many binder chemistries have been successfully used to make concrete, but Portland cement and its variations have been the dominant concrete binder for almost 200 years. Despite advances in production efficiency and material performance, there are significant and intrinsic problems with Portland cement chemistry that cannot be solved at any reasonable cost by current methods.

Portland cement production is a $CO_2$ intensive process that causes about 8% of global anthropogenic $CO_2$ emissions. Some estimates project that cement demand will increase by 12-23% by 2050. However, the growing absolute demand for cement is at odds with the need for complete decarbonization of the economy that is also required by 2050 to avoid catastrophic effects of climate change, according to the UN IPCC Climate Report 2018. There is therefore an urgent need for drastically lowering the specific $CO_2$ emissions of cement, especially because absolute production volume is increasing.

One way that the industry has tried to reduce the $CO_2$ emission of cement is by developing geopolymer cements, which are generally aluminosilicate inorganic polymers that cure through a geo-polymerization process. Commercially relevant geopolymer cements in use today include several specific solid reagents (commonly: metakaolin (MK-750), ground granulated blast furnace slag (GGBFS), and coal fly ash). However, these reagents cannot satisfy the global transition to low-$CO_2$ cements because supply is relatively limited in geography and volume compared to the enormous demand for cement. Also, the cost of shipping these products from production locations is significant compared to their market value.

Cementitious reagents are useful in both hydraulic and geopolymer cements. Geopolymer reagents, and supplementary cementitious materials (SCMs), are typically selected from several common cementitious materials: byproduct ashes from combustion (e.g., coal fly ash), slag byproducts (e.g., ground granulated blast furnace slag), calcined clays (e.g., metakaolin), and natural pozzolans (e.g., volcanic ash). These materials are generally substantially non-crystalline and sometimes reactive in cementitious systems such as in geopolymeric systems.

Since the majority of SCMs that are used in blended hydraulic cements are industrial by-products (e.g., coal combustion, or quality iron production), their material properties are a result of the industrial by-product and are not specifically tailored as a quality cementitious reagent. Accordingly, these materials lack any guarantee of ideal or even consistent composition and quality, and their suitability as cementitious reagents varies from plant to plant, and over time. There is also no control over production location, and the concrete industry lacks control over future availability of these critically important cementitious materials. It would be much more advantageous if the production location could be chosen based on market needs, particularly because shipping of cementitious materials is very expensive.

Fly ash is a partially glassy aluminosilicate by-product of coal combustion. It is frequently used as an admixture in hydraulic cement mixes to improve flowability and create a pozzolanic reaction to improve properties of concrete including strength, resistance to alkali-silica reaction and others. Unfortunately, only certain coal and combustion processes create a consistent supply of fly ash of a quality acceptable for use in concrete (e.g., ASTM Type C and Type F ash, or CSA Type C, CI, and F ashes). Ash is not produced as an optimal SCM; rather, combustion is optimized for power generation and pollution prevention: there is no guaranteed consistency of by-product ash. Further challenges for the future of fly ash in concrete include a significant decrease in regional availability due to transition from coal energy to natural gas in many markets, carbon introduced post-combustion can negatively affect air entrainment in concrete, recovery of ash from impoundments will increase cost, and quality must be verified through testing in each case.

Ground Granulated Blast Furnace Slag (GGBFS) is a glassy $CaO$—$SiO_2$ by-product of iron production in blast furnaces. Concretes incorporating GGBFS have many advantageous properties including improved chemical durability, whiteness, reduced heat of hydration, mitigation of $CO_2$ footprint, and other beneficial properties. Unfortunately, the supply of blast furnace slag is quite limited due to the small number of blast furnaces operating in most markets. As such, GGBFS is in high demand as a quality SCM and prices for this by-product are now similar to the price of cement itself. Additionally, the limited geographic supply leads to shortages or at least high shipping costs for many local concrete markets. Finally, iron production and resulting blast furnace slag supply are not coupled directly to concrete demand, leaving supply volume, local availability, and market price of these important admixtures largely up to chance.

Natural pozzolans are siliceous or aluminosiliceous materials that are able to participate in the pozzolanic reaction with $Ca(OH)_2$. These include as-mined or calcined volcanic ash, diatomaceous earth, kaolinite and other clays, MK-750 and other natural minerals and rocks that react with lime to produce a hydrated calcium silicate compound. Natural pozzolans can be very effective SCMs in concrete, however they require mining of non-renewable resources and pozzolans often require significant shipping distances since deposits are not extremely common. Also, natural materials often require significant processing such as calcining to enhance reactivity.

Fly ash (usually with low CaO content, as in type F), GGBFS, and certain natural and processed "pozzolans" (e.g., volcanic ashes, zeolites, and MK-750) are also common geopolymer reagents, and the same unfortunate limitations on supply, geographic availability, price, quality, and consistency apply for their application in geopolymer binders and cements.

To overcome certain limitations of these existing SCM and geopolymer reagent supplies, several attempts have been made to improve on aspects of traditional methods. Despite some improvements, these man-made products or compositions still possess numerous deficiencies, for instance with respect to reactivity and chemistry of reagents for use in geopolymer chemistry (e.g., optimizing reagents to later produce high coordination, branched, and three-dimensional alkali/alkaline earth aluminosilicate polymers). They also require expensive lab-grade reagents and cannot simply use globally abundant feedstocks.

Also, previously manufactured glassy cementitious reagents have angular or fibrous particle morphology. Thus, cement pastes made from such reagents require a lot of water and have relatively poor workability (e.g., with excessive yield stress or higher than optimal plastic viscosity) which is a barrier to use in practical concrete applications.

Combustion ashes and silica fume typically do not have angular particle morphology. However, these are not available in sufficient quantities, do not have appropriate chemistry, and/or are too expensive to support a large-scale transition to high SCM blend hydraulic or geopolymer cements.

There is thus a need for cementitious reagents that solve existing workability issues with a similar degree of effectiveness as super plasticizers and water reducers in equivalent Portland cement mix designs. There is also a need for a method of reducing $CO_2$ emissions in production of Portland cement, and particularly, a need for an engineered cementitious reagent with low or zero process $CO_2$ emissions that can be used as a supplementary cementitious material in hydraulic cements, and/or as a solid geopolymer reagent.

There is also need for a cementitious reagent that can be produced ubiquitously from globally abundant feedstocks, is reactive in cementitious systems, and delivers workable low-yield stress cement mixes.

Furthermore, there is a need for production of cementitious reagents wherein the production location could be chosen based on market needs. There is particularly a need for non-angular particle or microspheroidal glassy particles useful in cementitious reagents, geopolymer reagents, supplementary cementitious materials (SCM), cement mixes and concrete.

There is also a need for the economical production of such microspheroidal glassy particles, e.g., by using globally abundant feedstocks. There is also a need for apparatuses, systems and methods using in-flight melting/quenching such wherein solid particles are flown in suspension, melted in suspension, and then quenched in suspension.

The dominant cement used in concrete today is a hydration-curing calcium silicate product known as Portland cement. Unfortunately, manufacture of Portland cement clinker causes $CO_2$ process emissions (from heating limestone) that are globally impactful (about 3-5%, not counting fuel-derived GHG emissions). The process is carried out in a rotary kiln with raw meal flowing countercurrent to the kiln burner. The process is very energy intensive, consuming ~3-5 GJ/ton, of which about 1.5 GJ/ton is spent simply calcining limestone. Of the few viable strategies to decrease environmental impact of cement, geopolymer chemistry provides a globally viable alternative cement with improved environmental and material performance. The inconsistent supply and limited geographic availability of traditional geopolymer reagents such as fly ash and slags have limited standardization and adoption of geopolymer concretes. On the other hand, an increasing demand for supplementary cementitious materials (SCM) in hydraulic cements (to enhance material and environmental performance) has further squeezed demand for these materials.

Various approaches have been used to manufacture cementitious reagents. However, these methods suffer from crucial deficiencies that have prevented an economic manufacturing process for glassy cementitious reagents. For instance, high-temperature refractory-lined furnaces and crucibles have been used to directly contain glass melts in existing academic research on cementitious reagents (a natural extension of traditional glassmaking techniques). However, solid refractory materials in crucibles and surrounding conventional furnaces require low heating and cooling rates (order of about 10-50° C./min) to avoid thermal shock breakage. Conventional melting furnaces have high thermal mass which makes maintenance difficult and costly as a result of long startup and shutdown cycles. It is preferable to avoid the need for refractories that directly contact the melt, so as to avoid, complexity, wear, and also considerable start up and shut down times.

Quenching of molten glass for cementitious reagents (blast furnace slag, for example) has previously required water, which is costly, inhibits heat recovery, could have negative environmental consequences, and may require added complication of solid/liquid separation. Melt quenching methods were thus either wasteful or slow, diminishing reactivity. Air-quenching methods of cooling melts are either too slow or require very specific chemistry to ensure low melt viscosities of about 1 Pa-s or less, which is not feasible for most desired feedstock materials.

Previous glass manufacturing methods have required costly particle size reduction (milling) of glassy product (typically before and after thermal processing).

Accordingly, there is still a need for a convenient and economic method of manufacturing a glassy cementitious reagent from globally abundant feedstocks.

There is also a need to minimize energy consumption and cope with very high and variable melt viscosity without requiring fluxes.

There is also a need for methods of producing microspheroidal glassy particles and for apparatuses and systems useful for producing such microspheroidal glassy particles.

SUMMARY

Embodiments relate to an alternative cement material (ACM), which in some embodiments includes solid microspheroidal glassy particles having one or more of the following properties: mean roundness (R)>0.8 and less than about 40% particles having angular morphology (R<0.7).

In some embodiments, the particles have a mean roundness (R) of at least 0.9. In embodiments, less than about 30% of the particles, or less than about 25% of the particles, or less than about 20% of the particles, or less than about 15% of the particles, or less than about 10% of the particles have an angular morphology (R<0.7).

In some embodiments, the particles include the mean oxide Formula 1: $(CaO,MgO)a \cdot (Na_2O,K_2O)b \cdot (Al_2O_3, Fe_2O_3)c \cdot (SiO_2)d$ [Formula 1]; wherein a is about 0 to about 4, b is about 0.1 to about 1, c is 1, and d is about 1 to about 20.

In some embodiments, the particles further includes one or more of the following properties: (i) a content of 45%-100%, and preferably 90-100%, X-ray amorphous solid; and (ii) molar composition ratios of $(Ca,Mg)_{0-12} \cdot (Na,K)_{0.05-1} \cdot (Al, Fe^{3+})t \cdot Si_{1-20}$.

According to another aspect, some embodiments relate to a cementitious reagent including a mixture of microspheroidal glassy particles as defined herein.

According to another particular aspect, some embodiments relate to a cementitious reagent including a mixture of microspheroidal glassy particles, these particles exhibiting one or more of the following properties: (i) mean roundness (R)>0.8; (ii) less than about 20% particles having angular morphology (R<0.7); (iii) the oxide Formula 1 as defined hereinbefore; (iv) a content of 45%-100%, and preferably 90-100%, X-ray amorphous solid; (v) a molar composition ratio of $(Ca,Mg)_{0-12} \cdot (Na,K)_{0.05-1} \cdot (Al, Fe^{3+})_1 \cdot Si_{1-20}$; and (vi) a low calcium content of about <10 wt. % CaO, or an intermediate calcium content of about 10 wt. % to about 20 wt. % CaO, or a high calcium content of >30 wt. % CaO.

In some embodiments, the cementitious reagent is in the form of a non-crystalline solid. In some embodiments, the cementitious reagent is in the form of a powder. In some embodiments, the particle size distribution with D[3,2] (i.e., surface area mean, or Sauter Mean Diameter) is about 20 μm or less, more preferably 10 μm or less, or most preferably 5 μm or less. In one embodiment, the mixture of microspheroidal glassy particles of the cementitious reagent has the oxide Formula 1 as defined hereinabove. In some embodiments, the cementitious reagent includes less than about 10 wt. % CaO. In some embodiments, the cementitious reagent includes more than about 30 wt. % CaO. In some embodiments the cementitious reagent is about 40-100% and preferably about 80% X-ray amorphous, 90% X-ray amorphous, and up to about 100% X-ray amorphous, and in some embodiments, is 100% non-crystalline.

According to some embodiments, a geopolymer binder includes a cementitious reagent as defined herein. According to another particular aspect, some embodiments relate to a supplementary cementitious material (SCM) including a cementitious reagent as defined herein, for instance a SCM having at least 20 wt. % of the cementitious reagent.

According to another particular aspect, some embodiments relate to a solid concrete including a cementitious reagent as defined herein.

According to another particular aspect, some embodiments relate to the use of microspheroidal glassy particles as defined herein, and to the use of a cementitious reagent as defined, to manufacture a geopolymer binder or cement, a hydraulic cement, a supplementary cementitious material (SCM) and/or solid concrete.

According to another particular aspect some embodiments relate to a method for producing a cementitious reagent from aluminosilicate materials, including the steps of: (i) providing a solid aluminosilicate material; (ii) in-flight melting said solid aluminosilicate material to melt said material into a liquid and thereafter in-flight quenching said liquid to obtain a powder including solid microspheroidal glassy particles, thereby obtaining a cementitious reagent with said powder of microspheroidal glassy particles.

In some embodiments, the method further including: (iii) of grinding said powder of microspheroidal glassy particles into a finer powder. In one embodiment, the powder has a particle size distribution with D[3,2] of about 20 μm or less, more preferably 10 μm or less, or most preferably 5 μm or less.

In some embodiments, the cementitious reagent obtained by the method includes one or more of the following properties: reactivity in cementitious systems and/or in geopolymeric systems; delivers workable low yield stress geopolymer cement mixes below 25 Pa when a cement paste has an oxide mole ratio of $H_2O/(Na_2O,K_2O)<20$; has a water content in a cement paste such that the oxide mole ratio $H_2O/(Na_2O,K_2O)<20$; and forms a cement paste with higher workability than an equivalent paste with substantially angular morphology, given the same water content.

Throughout the instant specification, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

In some embodiments, the method further includes the step of adjusting composition of a non-ideal solid aluminosilicate material to a desired content of the elements Ca, Na, K, Al, Fe, and Si. In one embodiment the adjusting includes blending a non-ideal aluminosilicate material with a composition adjustment material in order to reach desired ratio(s) with respect to one or several of the elements Ca, Na, K, Al, Fe, and Si.

In some embodiments, the method further includes the step of sorting the solid aluminosilicate material to obtain a powder of aluminosilicate particles of a desired size. In some embodiments, the method further includes the step of discarding undesirable waste material from said solid aluminosilicate material.

In some embodiments, the in-flight melting includes heating at a temperature above a liquid phase temperature to obtain a liquid. In some embodiments, the temperature is between about 1000° C. to about 1600° C., or between about 1300° C. to about 1550° C.

In some embodiments, the method further includes the step of adding a fluxing material to the solid aluminosilicate material to lower its melting point and/or to induce greater enthalpy, volume, or depolymerization of the liquid. In some embodiments, the fluxing material is mixed with the solid aluminosilicate material prior to, or during the melting.

In some embodiments, the in-flight melting/quenching includes reducing a temperature of the liquid below a glass transition temperature to achieve a solid. In some embodiments, the in-flight melting/quenching includes reducing a temperature of the liquid below about 500° C., or preferably below about 200° C., or lower. In some embodiments, reducing a temperature of the liquid includes quenching at a rate of about $10^2$ $Ks^{-1}$ to about $10^6$ $Ks^{-1}$, preferably at a rate of $>10^{3.5}$ $Ks^{-1}$. In some embodiments, quenching includes a stream of cool air, steam, or water. In one embodiment, the method further includes separating quenched solid particles from hot gases in a cyclone separator.

In some embodiments, the method for producing a cementitious reagent from aluminosilicate materials may additionally include reducing particle size of the powder of solid microspheroidal glassy particles. In some embodiments reducing particle size may include crushing and/or pulverizing the powder in a ball mill, a roller mill, a vertical roller mill or the like.

According to another aspect, some embodiments relate to an apparatus for producing microspheroidal glassy particles, the apparatus including a burner, a melting chamber and a quenching chamber. The melting chamber and the quenching chamber may be completely separate or may be first and second sections of the same chamber, respectively. The apparatus may be configured such that solid particles are flown in suspension, melted in suspension, and then quenched in suspension in the apparatus.

In some embodiments, the burner provides a flame heating solid particles in suspension to a heating temperature sufficient to substantially melt said solid particles into a liquid. In some embodiments, the burner generates a flame that is fueled with a gas that entrains aluminosilicate feedstock particles towards the melt/quench chamber. The gas may include an oxidant gas and a combustible fuel. In some embodiments the burner may include at least one of a plasma torch, an oxy-fuel burner, an air-fuel burner, a biomass burner, and a solar concentrating furnace.

In some embodiments, the quenching chamber of the apparatus includes a cooling system for providing cool air inside the quenching chamber, the cool air quenching molten particles to solid microspheroidal glassy particles. In some embodiments, the cooling system includes a fluid (e.g., gas- or liquid-containing) cooling loop positioned around the quenching chamber.

In some embodiments, the apparatus may include one or more of a cyclone separator, a baghouse chamber, and an electrostatic precipitator (ESP) for collecting the microspheroidal glassy particles. A cyclone separator (or cyclone) is a centrifugal device in which microspheroidal glassy particles, due to their mass, may be directed by centrifugal force to the periphery of a cyclone chamber and may exit the chamber via a collection device fitted to the separator. A baghouse chamber, which may be operated in conjunction with a cyclone separator, includes an inlet for receiving a gas stream containing microspheroidal glassy particles, an outlet for exiting the gas stream after filtering, and a main chamber located between the inlet and the outlet. At least one filter bag may be housed within the main chamber for filtering the gas stream, i.e., for separating the microspheroidal glassy particles from the conveying gas stream. The filter bag may include a fabric filter bag, for example. An electrostatic precipitator may remove microspheroidal glassy particles from a conveying gas stream by using electrical energy to apply an electric charge to the particles. The charged particles may then be attracted to collector plates carrying an opposite charge.

According to some embodiments, a method for producing microspheroidal glassy particles includes: providing an in-flight melting/quenching apparatus including a burner, a melting chamber and a quenching chamber; providing solid particles; flowing said solid particles in suspension in a gas to be heated by said burner; heating said solid particles into said melting chamber to a heating temperature above liquid phase to obtain liquid particles in suspension; and quenching said liquid particles in suspension to a cooling temperature below a liquid phase temperature to obtain a powder including solid microspheroidal glassy particles.

In some embodiments of these methods, the solid particles include aluminosilicate materials. In some embodiments of these methods, the heating temperature is between about 1000° C. to about 1600° C., or between about 1300° C. to about 1550° C. In some embodiments of these methods, the cooling (quench) temperature is below about 500° C., or below about 200° C. In some embodiments of these methods, the quenching includes providing cool air inside the quenching chamber. In some embodiments, these methods further include collecting the powder with a collection system.

Additional aspects of some embodiments relate to the use of an apparatus as defined herein, particularly an apparatus including at least one of a plasma torch, an oxy-fuel burner, an air-fuel burner, a biomass burner, and a solar concentrating furnace, for producing a cementitious reagent from aluminosilicate materials using in-flight melting/quenching.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

Figure 1:
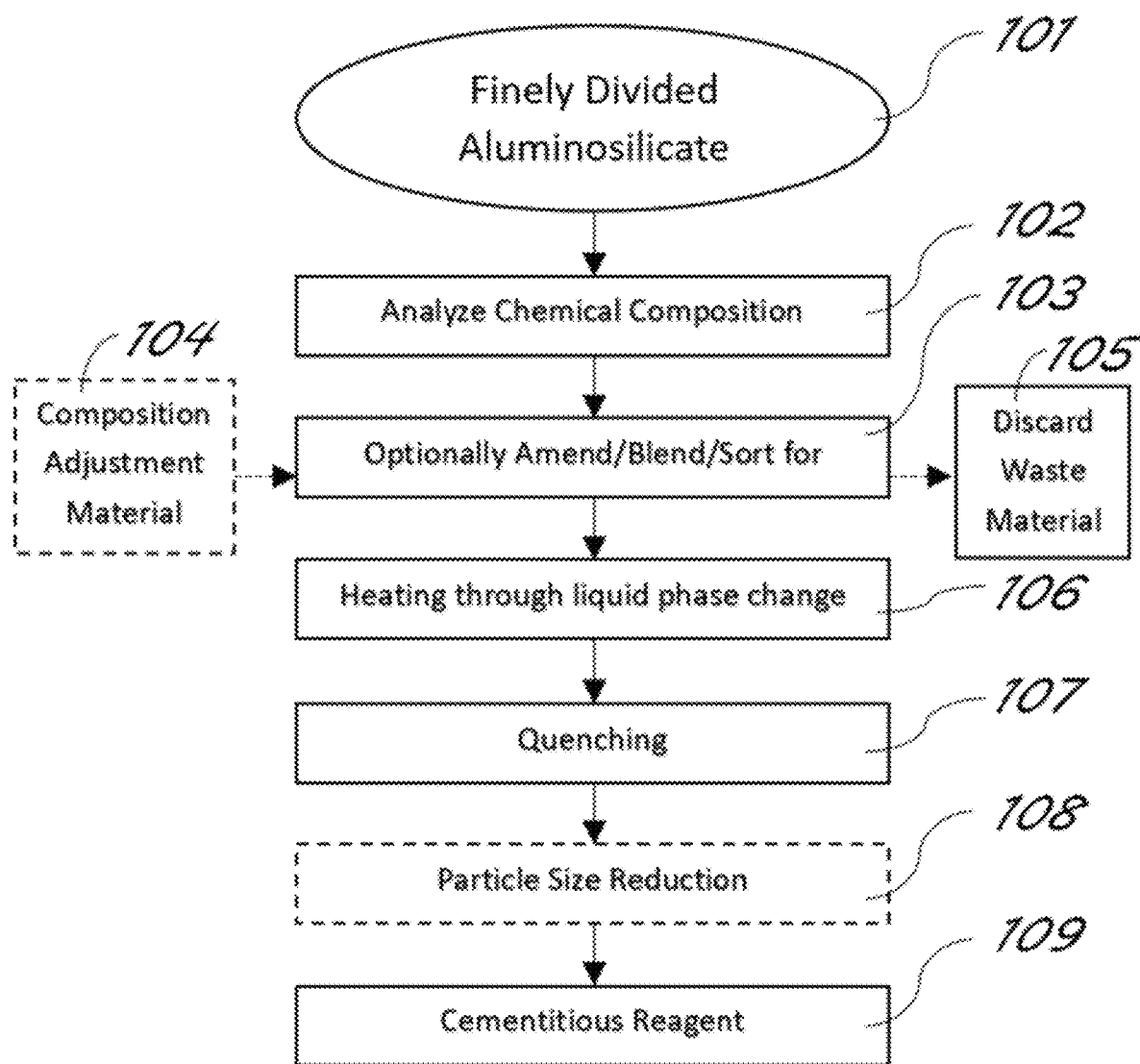
FIG. 1 is a flow diagram showing production of a cementitious reagent starting from a solid aluminosilicate material, in accordance with some embodiments.

The following detailed description provides a better understanding of the features and advantages of the inventions described in the present disclosure in accordance with the embodiments disclosed herein. Although the detailed description includes many specific embodiments, these are provided by way of example only and should not be construed as limiting the scope of the present disclosure.

In the following description of the embodiments, references to the accompanying drawings are by way of illustration of an example by which embodiments may be practiced. It will be understood that other embodiments may be made without departing from the scope of the invention disclosed.

Microspheroidal Glassy Particles

Some embodiments relate to the production and uses of solid microspheroidal glassy particles. As explained with more details hereinafter, a related aspect concerns a cementitious reagent including a mixture or plurality of such microspheroidal glassy particles.

In accordance with various embodiments, the solid microspheroidal glassy particles are appreciably round particles of high sphericity. As used herein, the term "roundness" and corresponding unit "R" refer to roundness as defined by Takashimizu & Iiyoshi (2016). The values required to calculate R can be determined by performing image analysis on appropriate photomicrographs of powders. R (roundness) provides a convenient quantitative measure of roundness that is highly correlated with Krumbein's "roundness" (Krumbein, W. C. (1941) Measurement and geological significance of shape and roundness of sedimentary particles. Journal of Sedimentary Petrology 11:64-72. https://doi.org/10.1306/D42690F3-2B26-11D7-8648000102C1865D.)

In some embodiments, the microspheroidal glassy particles have mean roundness (R) of at least 0.9 (standard deviation <0.15). In some embodiments, the microspheroidal glassy particles have bulk roundness (R) of at least 0.8 (standard deviation <0.15). In some embodiments, the microspheroidal glassy particles have bulk roundness (R) of at least 0.7, or 0.6, or 0.5 (standard deviation <0.15).

In some embodiments, a mixture of microspheroidal glassy particles includes less than about 50% particles, or less than about 40% particles, or less than about 30% particles, or less than about 25% particles, or less than about 20% particles, or less than about 15% particles, or less than about 10% particles having angular morphology (e.g., R<0.7).

In some embodiments, a mixture or plurality of microspheroidal glassy particles is provided in a powder form having a particle size distribution with D[3,2] of about 20 μm or less, more preferably about 10 μm or less, or most preferably about 5 μm or less.

In some embodiments, microspheroidal glassy particles are a non-crystalline solid.

In some embodiments, the microspheroidal glassy particles may be characterized as an oxide material having a composition represented by Formula 1: $(CaO,MgO)a \cdot (Na_2O,K_2O)b \cdot (Al_2O_3,Fe_2O_3)c \cdot (SiO_2)d$, wherein a is about 0 to about 4, b is about 0.1 to about 1, c is 1, and d is about 1 to about 20.

In some embodiments, the microspheroidal glassy particles include one or more of the following properties: (i) a content of 45%-100%, and preferably 90-100%, X-ray amorphous solid; and (ii) molar composition ratios of $(Ca, Mg)_{0-12} \cdot (Na,K)_{0.05-1} \cdot (Al, Fe^{3+})_1 \cdot Si_{1-20}$.

In some embodiments, the microspheroidal glassy particles are 40-100% X-ray amorphous, more preferably about 80 to about 100% X-ray amorphous, and in some embodiments is 100% non-crystalline.

In some embodiments, the particles include less than about 10 wt. % CaO. In some embodiments, the particles include more than about 30 wt. % CaO. In some embodiments, the particles include a high-calcium content with a molar composition of $Si/(Fe^{3+},Al)$ between 1-20, and CaO content of about 10 wt. % to about 50 wt. %, preferably about 20-45 wt. %. In some embodiments, the particles include an intermediate-calcium content with a molar composition of $Si/(Fe^{3+},Al)$ between 1-20, and CaO content of about 10 wt. % to about 20 wt. %.

As described hereinafter, the microspheroidal glassy particles may advantageously be produced from globally abundant inorganic feedstocks such as aluminosilicate material. As used herein, the term "aluminosilicate material" refers to a material including oxides of silicon and aluminum and optionally iron selected from natural rocks and minerals, dredged materials, mining waste including rocks and minerals, waste glass, aluminosilicate-bearing contaminated materials and aluminosiliceous industrial by-products. An aluminosilicate material is preferably in the form of a crystalline solid (e.g., at least 50 wt. %, or at least 60 wt. %, or at least 70 wt. %, or at least 80 wt. %, or at least 90 wt. %, or 100 wt. % crystalline solid). In some embodiments, the aluminosilicate material includes at least 2 wt. % ($Na_2O$, $K_2O$), or at least 3 wt. % ($Na_2O,K_2O$), or at least 4 wt. % ($Na_2O,K_2O$), or at least 5 wt. % ($Na_2O,K_2O$), at least 6 wt. % ($Na_2O,K_2O$), or at least 7 wt. % ($Na_2O,K_2O$), or at least 8 wt. % ($Na_2O,K_2O$), or at least 10 wt. % ($Na_2O,K_2O$), or at least 12 wt. % ($Na_2O,K_2O$), or at least 15 wt. % ($Na_2O$, $K_2O$), or at least 20 wt. % ($Na_2O,K_2O$). In some instances, the inorganic feedstocks are heterogeneous, and the glassy particles produced are more homogeneous than the feedstock, as shown during partial homogenization during melting. That is, more than 10% of the particles produced fall within a new intermediate formulation range.

In some embodiments the aluminosilicate material may be selected from dredged sediments, demolished concrete, mine wastes, glacial clay, glacial deposits, fluvial deposits, rocks and mineral mixtures, for instance rocks and mineral mixtures composed of some or all the elements Ca, Mg, Na, K, Fe, Al and Si. These aluminosilicate materials are widely abundant in many different geographic regions.

As described hereinafter, the elemental composition of the feedstock may be analyzed and chosen for desired uses. The feedstock may be analyzed by quantitative or semi-quantitative methods such as XRF, XRD, LIBS, EDS, wet chemical analysis, and various other existing methods to determine the feedstock elemental composition.

As described hereinafter, the microspheroidal glassy particles may be produced using a process or method for in-flight thermochemical processing such as in-flight melting/quenching and/or suspension melting, for melting into a liquid the starting inorganic materials and thereafter quenching the liquid into solid particles. As used herein, the term "in-flight melting/quenching" or "suspension melting" refers to a process wherein solid particles are flown in suspension, melted in suspension, and then quenched in suspension to obtain a powder.

In some embodiments, the term "microspheroidal glassy particles" encompasses particles as defined hereinabove that are found in the powder resulting directly from an in-flight melting/quenching process. In embodiments, the term "microspheroidal glassy particles" refers to particles obtained after grinding or milling (e.g., using a jaw crusher, an impact mill, etc.) of the powder obtained after the in-flight melting/quenching process.

As described hereinafter, the microspheroidal glassy particles find many uses including, but not limited to, the preparation of cementitious reagents, the preparation of geopolymer binders or cements, the preparation of hydraulic cements, the preparation of supplementary cementitious materials (SCMs), and in the manufacture of solid concrete. One additional use may be as a fertilizer or soil amendment, e.g., as a substitute to "rock dust."

Cementitious Material

Some embodiments described herein relate to cementitious reagent powders including microspheroidal glassy particles as defined herein.

Some embodiments also relate to geopolymer binders or cements, hydraulic cements, supplementary cementitious materials (SCMs), hydraulic concrete mixtures, and solid concrete powders including microspheroidal glassy particles as defined herein.

Particle morphology may have a considerable impact on physical properties and handling of cement slurries. Accordingly, the high-roundness morphology of the particles advantageously may provide increased workability, fluidity, and/or decreased water demand for geopolymer cement mixes. In particular, having high degrees of roundness reduces yield stress and viscosity of cement mixes by reducing interparticle friction. Additionally, spheroidal morphology may decrease water demand by improving packing for a given particle size distribution.

Figure 2:
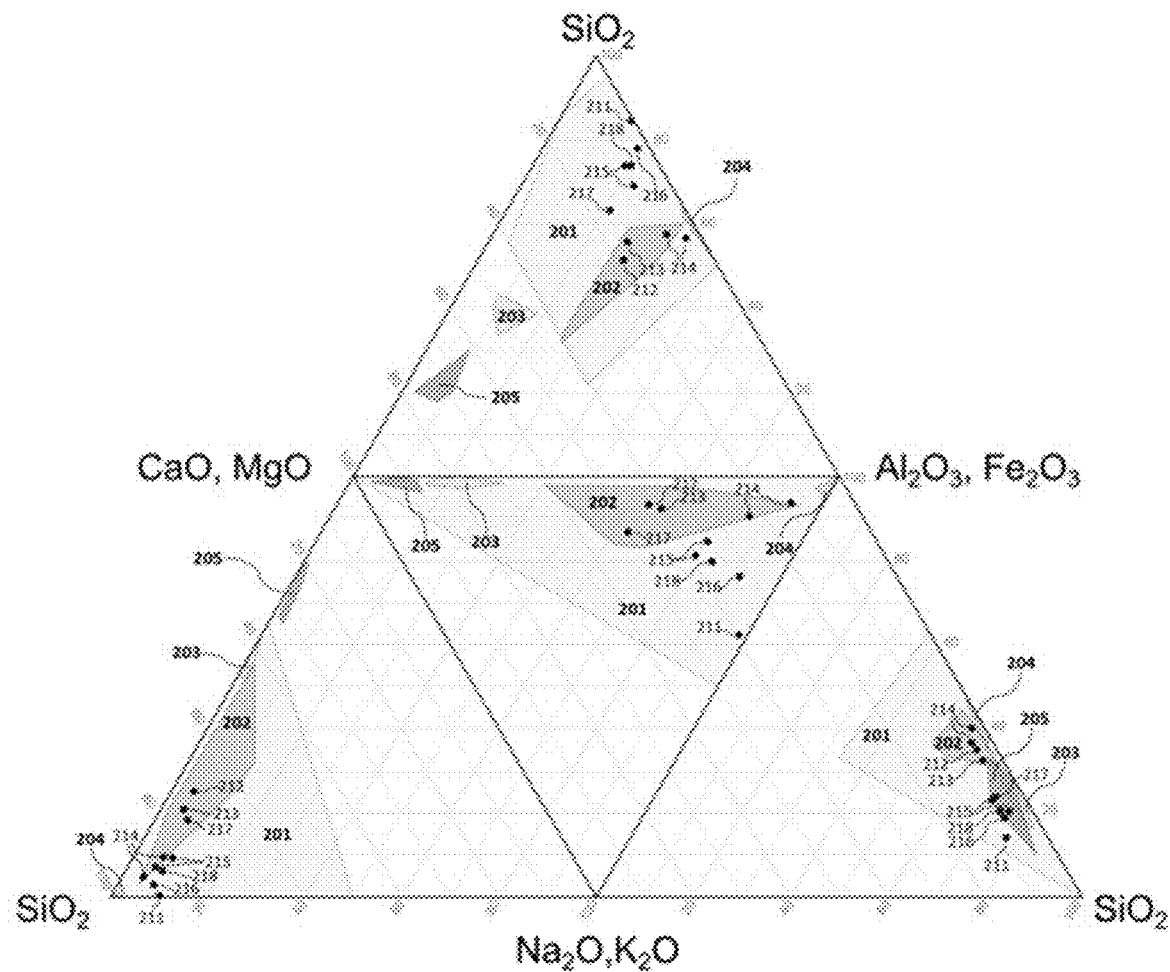
FIG. 2 is a set of four ternary CaO, MgO—$SiO_2$—($Na_2O$, $K_2O$)—($Al_2O_3$, $Fe_2O_3$) composition diagrams, in accordance with some embodiments.
Figure 3:
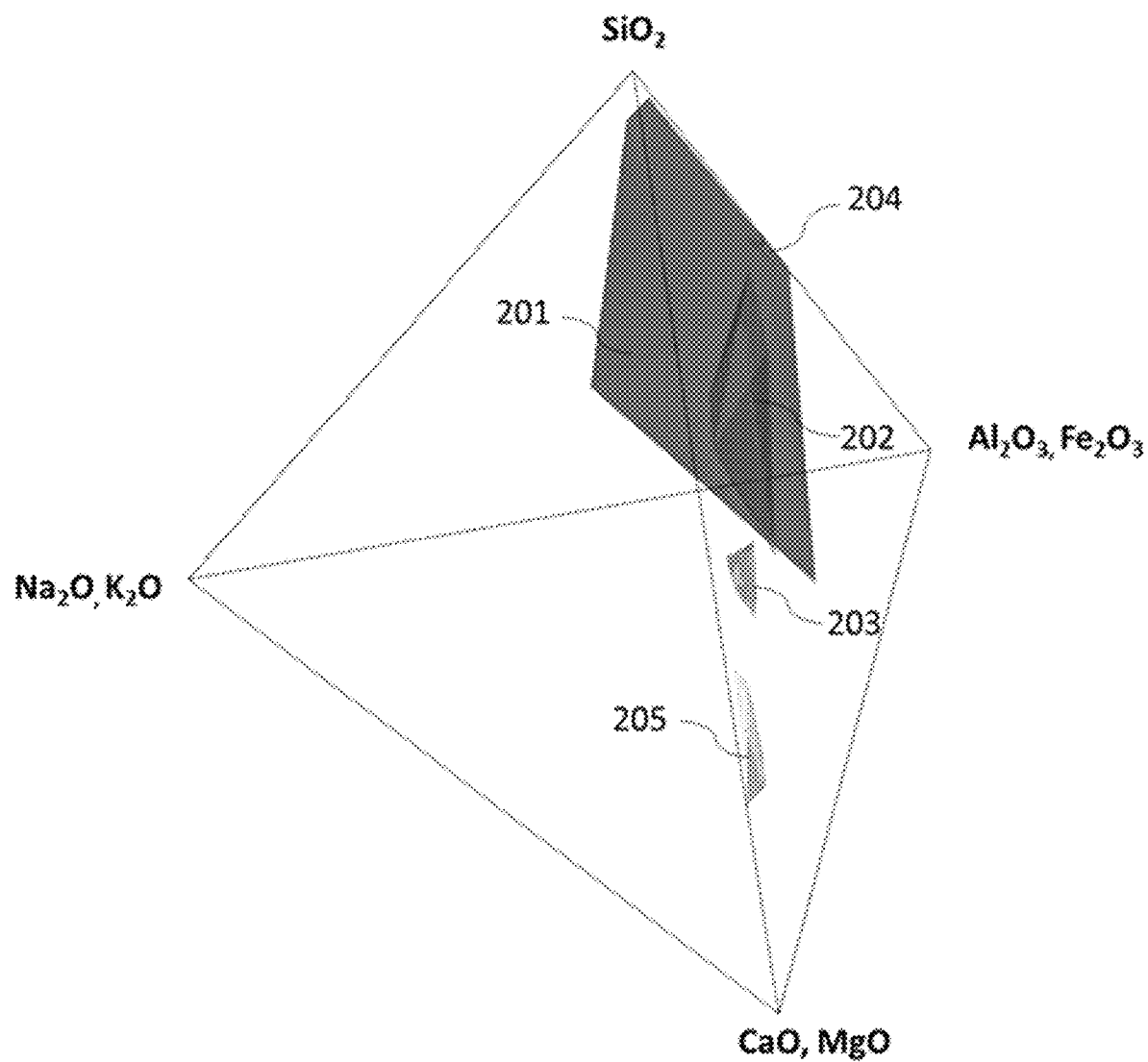
FIG. 3 is a three-dimensional quaternary diagram in (CaO, MgO)—($Al_2O_3$, $Fe_2O_3$)—($Na_2O$, $K_2O$)—($SiO_2$) space using the same material compositional data plotted in FIG. 2, in accordance with some embodiments.

As illustrated in FIGS. 2 and 3, the composition of cementitious reagents in accordance with embodiments is different from existing cementitious materials. Indeed, considering combinations of ternary compositions of element groups (CaO, MgO), ($Al_2O_3$, $Fe_2O_3$), ($Na_2O$, $K_2O$), and ($SiO_2$), embodiments of a cementitious reagent 201 occupy a position in these figures that is different and distinct from fly ash (C and F) 202, ground-granulated blast-furnace slag (GGBS or GGBFS) 203, metakaolin 204, and Portland cement 205. Examples of specific feedstock compositions are shown in FIG. 2: volcanic pumice 211 (Example 1), basalt 212 (Example 2), a second basalt 213 (Example 3), coal tailings samples 214 (Example 4), dredged sediment 215 (Example 5), copper porphyry flotation tailings 216 (Example 6), demolished concrete 217 (Example 7), dioritic aggregate crusher dust 218 (Example 8).

Advantageously, the cementitious reagent may be formulated from globally abundant rock, minerals and compounds of suitable composition. In this way, the abundant feedstock may not need to be shipped very far to a processing facility, or a cement plant. In some instances, a cement plant may be built at the feedstock location.

In some embodiments, a cementitious reagent includes a mixture of microspheroidal glassy particles as defined herein and may be characterized by one or more of the following properties: (i) is in the form of a non-crystalline solid; (ii) is in the form of a powder; (iii) has a particle size distribution with D[3,2] of about 20 μm or less, more preferably 10 μm or less, or most preferably 5 μm or less; (iv) has the oxide Formula 1, as defined hereinbefore; (v) a content of 45%-100%, and preferably 90-100%, X-ray amorphous solid; (vi) molar composition ratios of $(Ca,Mg)_{0-12} \cdot (Na,K)_{0.05-1} \cdot (Al, Fe^{3+})_1 \cdot Si_{1-20}$; (vii) includes less than about 10 wt. % CaO; (viii) includes more than about 30 wt. % CaO; (ix) has a molar composition of $Si/(Fe^{3+},Al)$ between 1-20, and a CaO content of about 10 wt. % to about 50 wt. %, preferably about 20-45 wt. %; (x) has a molar composition of $Si/(Fe^{3+}, Al)$ between 1-20, and a CaO content of about 10 to about 20 wt. %; (xi) is 40-100% X-ray amorphous, more preferably above 80%, above 90%, and in some cases, up to about 100% X-ray amorphous, and in some cases, is 100% non-crystalline; (xii) has a particle size distribution with D[3,2] of about 20 μm or less, more preferably about 10 μm or less, or most preferably about 5 μm or less.

In some embodiments, the cementitious reagent includes less than about 10 wt. % CaO. In some embodiments, the cementitious reagent includes more than about 30 wt. % CaO. In some instances, the composition of cementitious reagent with respect to molar ratio of (Na, K), and Ca may be varied to obtain certain advantages depending on the binder. For example, a cementitious reagent with less than about 10 wt. % CaO may be suitable for use in heat-cured geopolymer and as a fly ash substitute. In the alternative, a cementitious reagent with greater than about 30 wt. % CaO has hydraulic properties and may be added to geopolymer resin to allow ambient-temperature curing of geopolymer cements and may directly replace blast furnace slag in blended Portland cement. In some cases, the CaO content is lower than about 30 wt. % in order to reduce the $CO_2$ impact of cement by avoiding a need for decomposition of carbonate-sourced calcium.

In some embodiments, the cementitious reagent is a low-calcium containing cementitious reagent with a molar composition of $Si/(Fe^{3+},Al)$ between 1-20, and with a CaO content of about 10 wt. % or less. Preferably such cementitious reagent is 40-100% X-ray amorphous, more preferably about 80% to about 100% X-ray amorphous, and in some embodiments 100% non-crystalline. Such low-calcium containing cementitious reagent may find numerous commercial applications, for instance, as a pozzolanic admixture in hydraulic cement, and/or as a reagent in geopolymer binders and cements.

In some embodiments, the cementitious reagent is a high-calcium containing cementitious reagent with a molar composition of $Si/(Fe^{3+},Al)$ between 1-20, and CaO content of about 10 to about 50 wt. %, preferably about 20-45 wt. %. Preferably such cementitious reagent is 40-100% X-ray amorphous, more preferably about 80 to about 100% X-ray amorphous, even more preferably 100% non-crystalline. Such a high-calcium containing cementitious reagent may find numerous commercial applications, for instance as a hydraulic admixture in blended hydraulic cement, and/or as a reagent in geopolymer binders and cements.

In some embodiments, the cementitious reagent is an intermediate-calcium containing cementitious reagent with a molar composition of $Si/(Fe^{3+},Al)$ between 1-20, and CaO content of about 10 to about 20 wt. %. Preferably such cementitious reagent is about 40 to about 100% and preferably about 80% to about 100% X-ray amorphous, and even more preferably 100% non-crystalline. Such an intermediate-calcium containing cementitious reagent may find numerous commercial applications, for instance as a cementitious reagent with desirable intermediate hydraulic and pozzolanic properties, particularly in ambient-curing geopolymer applications.

In some embodiments, the Na,K content in the cementitious reagent is optimized. This may be advantageous for SCM applications where free lime in hydraulic cement will exchange with soluble alkalis and coordinate with sialate molecules derived from cementitious reagent to create some extent of relatively stable alkali aluminosilicate polymerization that greatly improves chemical properties of traditional hydraulic cements. In embodiments, the Na,K content is chosen in accordance with the understanding that geopolymer reagents with significant Na,K content may be implemented with less soluble silicate hardener than would otherwise be used, thus decreasing the soluble silicate requirement (and cost) of a geopolymer mix design.

According to some embodiments, a geopolymer cement may include a cementitious reagent as disclosed herein. The geopolymer cement may further include an ambient cure reagent, and a solid or liquid hardener. The ambient cure reagent may contain a leachable source of calcium (or calcium and aluminum, or calcium and iron) and may, for example, include Portland cement or calcic slag, although other ambient cure reagents are contemplated. A suitable liquid hardener may include an alkali-silicate solution where molar $Me_2O/SiO_2$ (Me=Na or K) is less than unity. Mixing water may be added for workability, and solid aggregate may be added to form a concrete mixture. An example concrete mixture may include 40-70 wt. % cementitious reagent, 15-25 wt. % ambient cure reagent, and 5-45 wt. % solid aggregate.

Methods of Preparation

Microspheroidal glassy particles as defined herein, as well as compositions including same such as cementitious reagents, geopolymer binders or cements, hydraulic cements, supplementary cementitious materials (SCMs), and concrete can be prepared using any suitable method or process.

FIG. 1 shows exemplary steps necessary to produce cementitious reagent from aluminosilicate materials in accordance with some embodiments. Briefly, a finely divided aluminosilicate material powder 101 is selected and its chemical composition is analyzed 102 and evaluated. The feedstock may be analyzed by any suitable quantitative or semi-quantitative methods such as XRF, XRD, LIB S, EDS, wet chemical analysis, and various other existing methods to determine the feedstock elemental composition.

If the selected composition is not acceptable, the material is optionally amended, blended (e.g., in a vessel prior to thermochemical processing), for example, through addition of a composition adjustment material 104 (see hereinafter) or sorted 103 and any undesirable waste material may be discarded.

The resulting solid aluminosilicate material including a powder of desirable composition is next heated 106 and individual particles or particle agglomerates are melted into a liquid in suspension. Next the liquid particles in suspension are quenched 107 to obtain a powder including solid microspheroidal glassy particles. Next, the powder is optionally crushed and/or pulverized (partially or entirely) 108 if it is desired to reduce particle size and/or adjust reactivity and obtain the cementitious reagent 109.

Regarding the addition of a composition adjustment material 104, as used herein the term "composition adjustment material" refers to any solid or liquid material with a composition suitable for preferentially altering the bulk or surface composition of aluminosilicate material with respect to one or several of the elements Ca, Na, K, Al, Fe, and Si.

Composition adjustment materials that introduce calcium (Ca) ma include calcium salts such as $CaCO_3$, $Ca(OH)_2$, CaO, CaCl, $CaF_2$, calcium silicate minerals and compounds, calcium aluminum silicate minerals and compounds, waste Portland cement products, waste hydraulic cement products, wollastonite, gehlenite, and other melilite group mineral compositions.

Composition adjustment materials that introduce aluminum (Al) may include aluminous rocks, minerals, soils, sediments, by-products, and compounds including one or more of kaolinite, halloysite and other aluminum-rich/alkali-poor clay minerals, $Al_2SiO_5$ polymorphs, chloritoid, staurolite, garnet, corundum, mullite, gehlenite, diaspore, boehmite, gibbsite, and nepheline and other feldspathoids. Other materials that may be used include aluminum metal, bauxite, alumina, red mud (alumina refinery residues).

Composition adjustment materials that introduce iron (Fe) may include iron-rich rocks, minerals, soils, sediments, by-products, and compounds such as olivine, chlorite minerals (chamosite, clinochlore, etc.), pyroxenes, amphiboles, goethite, hematite, magnetite, ferrihydrite, lepidicrocite and other iron oxy-hydroxide compositions, iron-rich clay and phyllosilicate minerals, iron ore tailings, and elemental iron.

In some embodiments, the glassy cementitious reagents (microspheroidal glassy particles) disclosed herein may be substantially free of non-reactive crystalline phases, such as mullite. By way of example, the mullite content in the microspheroidal glassy particles may be less than about 1 wt. %. In some embodiments, the glassy cementitious reagents may include less than about 0.5 wt. % phosphorus ($P_2O_5$) (e.g., less than about 0.2 wt. % phosphorus or less than about 0.1 wt. % phosphorus) or less than 0.2 wt. % sulfur ($SO_3$) (e.g., less than about 1000 ppm, less than about 500 ppm sulfur, less than about 200 ppm sulfur, or less than about 100 ppm sulfur). Furthermore, the presently-disclosed glassy cementitious reagents may be free or substantially free of contaminants such as heavy metals.

As used herein, the terminology "heavy metal" or "heavy metals" refers, in some examples, to elements from the Periodic Table of Elements having a density of greater than about 5 g/cm$^3$. A total heavy metal content may include one or more elemental species as well as compounds, i.e., alloys thereof. Example heavy metals include V, Cr, Mn, Co, Ni, Cu, Zn, As, Mo, Cd, Sb, Hg, and Pb. In certain embodiments, a glassy cementitious reagent may have a total heavy metal content of less than approximately 3000 ppm, e.g., less than about 2000 ppm or less than about 1000 ppm.

By way of example, glassy cementitious reagents may have a composition that includes, individually or in any combination, less than about 1 wt. % titanium (e.g., less than about 0.5 wt. % or less than about 0.2 wt. % titanium), less than about 500 ppm vanadium, less than about 300 ppm chromium, less than about 1000 ppm manganese, less than about 100 ppm cobalt (e.g., less than about 50 ppm cobalt), less than about 300 ppm nickel (e.g., less than about 100 ppm nickel), less than about 500 ppm copper (e.g., less than about 200 ppm copper), less than about 300 ppm zinc (e.g., less than about 150 ppm zinc), less than about 50 ppm arsenic (e.g., less than about 10 ppm arsenic or less than about 1 ppm arsenic), less than about 1 ppm selenium, less than about 50 ppm molybdenum (e.g., less than about 5 ppm molybdenum), less than about 5 ppm cadmium (e.g., less than about 1 ppm cadmium or less than about 0.1 ppm cadmium), less than about 5 ppm antimony (e.g., less than about 1 ppm antimony or less than about 0.1 ppm antimony), less than about 0.1 ppm mercury, or less than about 100 ppm lead (e.g., less than about 25 ppm lead or less than about 10 ppm lead). In certain embodiments, a glassy cementitious reagent may be characterized by a total contamination content (e.g., a sum of vanadium, chromium, manganese, cobalt, nickel, copper, zinc, arsenic, selenium, molybdenum, cadmium, antimony, mercury, and lead) of less than about 1 wt. %, e.g., less than about 10000 ppm, less than about 5000 ppm, less than about 2000 ppm, less than about 1000 ppm, less than about 500 ppm, less than about 200 ppm, or less than about 100 ppm, including ranges between any of the foregoing values).

The heating 106 is carried out to reach a heating temperature above a liquid phase temperature to obtain a liquid, for instance at about 1000° C. to about 1600° C., or about 1300° C. to about 1550° C. Any suitable method or apparatus may be used for the heating and for obtaining the liquid including, but not limited to, in-flight melting (i.e., suspension melting). This may be achieved by using an in-flight melting apparatus equipped with, for instance, one or more plasma torches, oxy-fuel burners, air-fuel burners, biomass burners, a solar concentrating furnace. Typically, a furnace temperature of about 1000° C. to about 1600° C. is needed, and most typically about 1300° C. to about 1550° C., to rapidly obtain the desired liquid phase particles in suspension. In embodiments, the device is selected such that melting is as fast as possible. An example of a suitable in-flight melting apparatus and method is described hereinafter.

In some embodiments the quenching step 107 includes reducing temperature of the liquid below the glass transition, for instance at about 500° C. or lower, or preferably below about 200° C. or lower. In embodiments, the quenching is done rapidly, i.e., the temperature is reduced at a rate of about $10^2$ Ks$^{-1}$-$10^6$ Ks$^{-1}$ (preferably at a rate of >$10^{3.5}$ Ks$^{-1}$). Any suitable method may be used for the quenching including, but not limited to, contacting the molten material with a sufficient stream of adequately cool air, with steam, or with water to produce a non-crystalline solid.

If desired, a fluxing material may be added to the solid aluminosilicate material in order to lower its melting point and/or to induce depolymerization of the liquid. The fluxing material may be mixed with the solid aluminosilicate material prior to heating/melting or during the heating/melting. Common fluxing materials that may induce depolymerization in melts, and/or lower melting temperature includes $CaF_2$, $CaCO_3$, waste glass, glass cullet, glass frit, alkali-bearing minerals (e.g., feldspars, zeolites, clays, and feldspathoid minerals), borate salts, halogen compounds (fluoride and chloride bearing salts) and calcium salts.

Regarding the optionally crushing and/or pulverization step 108, this may be carried out using any suitable method or apparatus including, but not limited to, a ball mill, a roller mill and a vertical roller mill. Preferably the particle size is reduced to obtain a fine powder useful in cementitious applications. Obtaining a finer powder may be useful for increasing surface area and providing for faster reaction rates, as described for instance in Example 9. Those skilled in the art will be able to determine the size of the particles desired for a particular need, taking into consideration an economic trade-off between loss of spherical morphology/workability, cost of grinding, and final performance requirements. In embodiments, the powder has a particle size distribution with D[3,2] of approximately 10 μm or less, or preferably 5 μm or less. Such a particle size is generally desirable to ensure sufficient reactivity and consistent material properties.

Uses of Aluminosilicate Materials

As described herein, some embodiments concern the use of aluminosilicate materials to produce solid microspheroidal glassy particles and non-crystalline cementitious reagents as defined herein.

Another aspect is the use of in-flight thermochemical processing of aluminosilicate materials to produce solid microspheroidal glassy particles and/or solid cementitious reagents. The glassy particles and solid cementitious reagents described herein may advantageously be used as an alternative supplementary cementitious material (SCM) in blended hydraulic cement and/or as a geopolymer solid reagent in geopolymer binders (thus eliminating the need for some or all of MK-750, fly ash, GGBFS, and other common solid reagents).

Another related aspect is the use of an aluminosilicate material to produce at least one of a supplementary cementitious material (SCM) and a geopolymer reagent including solid microspheroidal glassy particles and/or a non-crystalline cementitious reagent as defined herein.

Uses of the Microspheroidal Glassy Particles and Cementitious Reagent

One aspect of described embodiments concerns the broad relevance of the solid microspheroidal glassy particles and cementitious reagents described herein. Appropriate compositions of engineered cementitious reagents may be used interchangeably in significant proportion in both geopolymer cements and hydraulic cements (i.e., cements that react with water).

Accordingly, some embodiments encompass geopolymer cements and hydraulic cements including at least 5 wt. %, or at least 10 wt. %, or at least 15 wt. %, or at least 20 wt. %, or at least 25 wt. %, or at least 30 wt. %, or at least 40 wt. %, or at least 50 wt. %, or at least 60 wt. %, or at least 70 wt. %, or at least 80 wt. %, or at least 90 wt. %, or more, of solid microspheroidal glassy particles and/or cementitious reagent as defined herein.

In accordance with some aspects, some embodiments described herein relate to a supplementary cementitious material (SCM) including a cementitious reagent as defined herein. In some embodiments, the SCM includes about 5 wt. % to about 50 wt. % (preferably at least about 20 wt. %) of solid microspheroidal glassy particles and/or of the cementitious reagent.

In accordance with another aspect, some embodiments described herein relate to a supplementary cementitious material (SCM) including one or more of the following properties: less than about 35 wt. % CaO, with appreciable content of Na+K (e.g., at least 2 wt. %, preferably at least 5 wt. %) and Al content (e.g., at least 5 wt. %) and is in the form of a non-crystalline solid.

In accordance with another aspect, some embodiments relate to a solid concrete, including solid microspheroidal glassy particles and/or a cementitious reagent as defined herein, i.e., including about 5 wt. % to about 50 wt. % (preferably at least 10 wt. %, or at least 20 wt. %, least 30 wt. %, or at least 40 wt. %) of solid microspheroidal glassy particles and/or the cementitious reagent.

In accordance with another aspect, some embodiments relate to solid geopolymer concrete including about 5 wt. % to about 50 wt. % (preferably at least 10 wt. %, or at least 20 wt. %, at least 30 wt. %, or at least 40 wt. %) of solid microspheroidal glassy particles and/or cementitious reagent.

Those skilled in the art can appreciate that various embodiments advantageously provide methods to produce versatile low-$CO_2$ cementitious reagents from abundant, cheap, natural materials. Another significant advantage is the creation of a single reagent that meets specification standards for alternative SCMs, while also meeting the needs of the growing geopolymer market. Further, the cementitious reagents are formed from diverse, heterogeneous feedstocks, and through the described processes, result in a reagent material that is more homogeneous and suitable as a cementitious reagent.

As can be appreciated, one advantage of the systems and methods described herein is to provide control over the final composition of the cementitious reagent, thereby producing a reagent with predictable composition, which is very important to the industry. Such tailored composition is not available in other existing cementitious reagents, because they are typically obtained from industrial by-products. In accordance with embodiments described herein, it is possible to modify local feedstocks to standardize performance for given applications. For example, in SCM for Portland cement it may be desirable to limit alkali content, but in geopolymer systems it may be desirable to have high alkali content and lessen the need for an alkali silicate hardener. In both scenarios, composition modifications may be desirable to limit compositional variability of the feedstock.

Another notable concern for the chemistry of geopolymer reagents is labile calcium content. Adjustment of calcium content and phases containing calcium are both important variables for adjusting rate of strength gain under different temperature conditions and final material properties of geopolymer cement. The methods described herein make it possible to engineer certain advantageous compositions of microspheroidal cementitious reagents, which is not currently possible for by-product-based cementitious reagents.

In-Flight Melting Apparatus, Method and System

Embodiments also relate to an apparatus, a system, and related methods for the thermochemical production of glassy cementitious reagents having a spheroidal morphology.

Figure 9A:
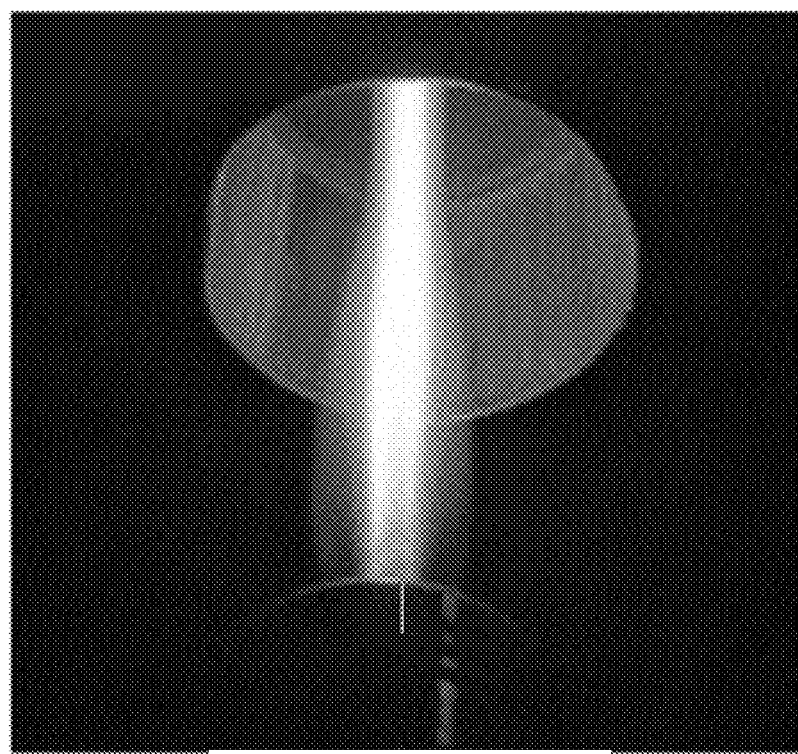
FIGS. 9A and 9B are a photograph and a corresponding illustration, respectively, of a burner flame (bottom) entering a melt/quench chamber (top) with entrained aluminosilicate feedstock particles, in accordance with one embodiment.
Figure 9B:
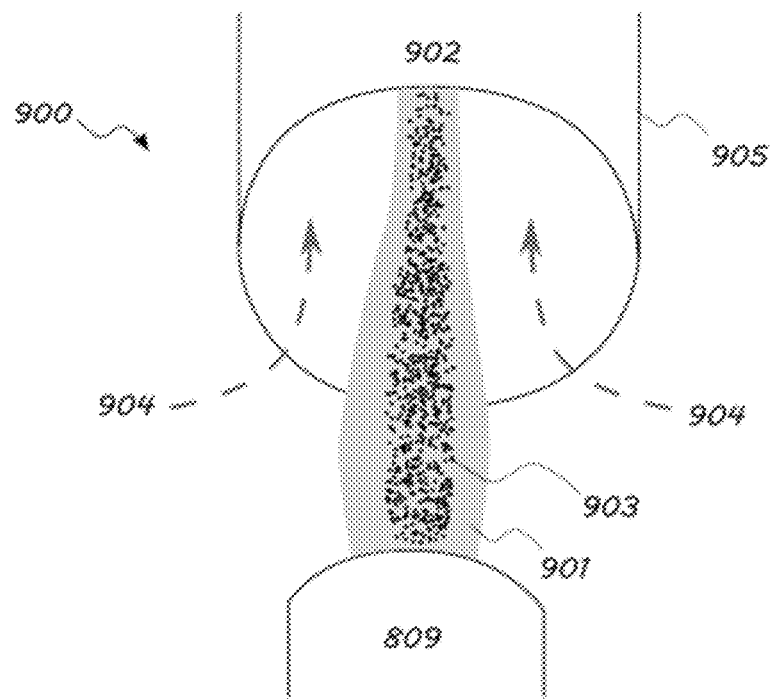

According to some embodiments, an apparatus is configured for in-flight melting/quenching. According to some embodiments, such as those illustrated in FIGS. 9A and 9B, the apparatus 900 includes a burner 809 and a melting chamber combined with a quenching chamber 902. In some embodiments the melting chamber and the quenching chamber may be first and second sections of the same chamber 902, respectively. In some embodiments, the melting chamber and the quenching chamber are separate consecutive chambers.

As illustrated, the apparatus 900 is configured for in-flight melting/quenching. Aluminosilicate feedstock particles 903 enter the melt/quench chamber (top; 902) suspended in a flame 901 combusting an oxidant gas 807 with a combustible fuel 808. The aluminosilicate feedstock particles 903 are entrained by a venturi eductor into the oxidant gas and flow in suspension during combustion towards the melt/quench chamber 902 as they become heated and eventually molten, above liquid phase transition. The gas may include an oxidant gas, including but not limited to oxygen, air mixed with a combustible fuel, including but not limited to propane, methane, liquid hydrocarbon fuels, coal, syngas, biomass, coal-water slurries, and mixtures thereof. Preferably the flame 901 is stabilized by an annular flow of quench air 904 that protects the melt/quench chamber 902 and prevents particles from sticking to inner wall 905 of the melt/quench chamber 902.

In the apparatus 900, molten particles are next quenched by cooling in air as the suspension becomes turbulent at an end of the melt/quench chamber 902. Cooling/quenching of the molten particles may be provided by cool quench air introduced directly into the melt/quench chamber 902, and/or by an optional cooling system, for instance a gas- or liquid-containing cooling loop around a quenching section of the melt/quench chamber 902 (not shown). The molten particles may be quenched or cooled to a non-crystalline solid containing microspheroidal glassy particles.

Figure 8:
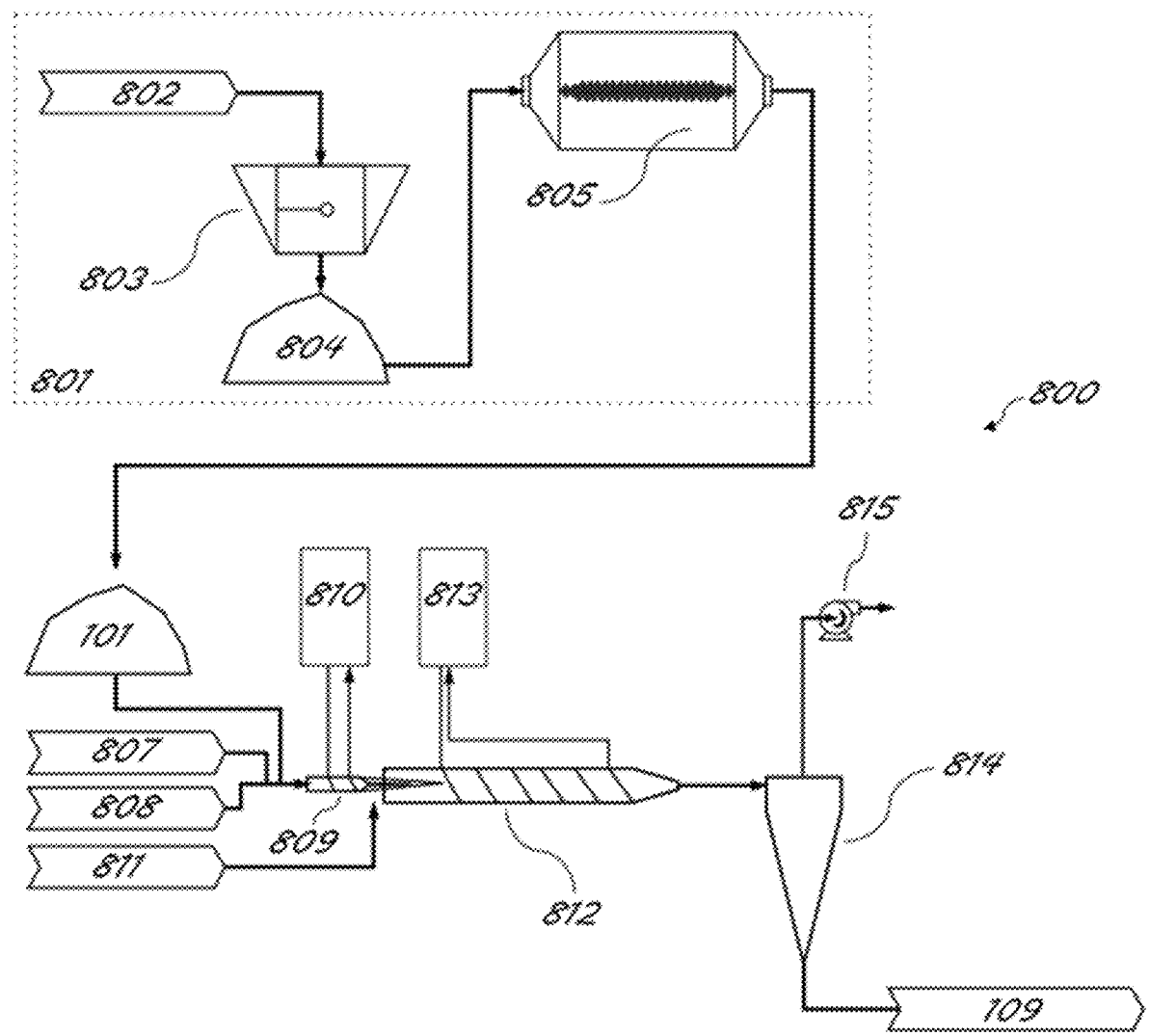
FIG. 8 is a schematic process flow diagram of a system to produce a glassy microspheroidal cementitious reagent, in accordance with one embodiment.

The apparatus 900 can be used in various systems to produce a glassy microspheroidal cementitious reagent. FIG. 8 illustrates one embodiment of a schematic process flow diagram of an exemplary system 800 for producing a glassy microspheroidal cementitious reagent, which in some cases, produces a microspheroidal glassy reagent powder 109.

In the embodiment of FIG. 8, the system 800 includes a milling circuit 801 to obtain an aluminosilicate feedstock powder 101. Coarse aluminosilicate feedstock material 802 is fed to a jaw crusher or impact mill 803 to produce a suitably sized feed 804 for fine grinding in a ball mill 805. The resulting product is a finely divided aluminosilicate feedstock powder 101.

The finely divided aluminosilicate feedstock powder 101 is next entrained in an oxidant gas (e.g., oxygen) 807 and mixed with a combustible fuel (e.g., propane) 808 in a burner 809 that is fitted with a gas- or liquid-containing cooling loop 810 for long torch life. Ambient temperature quench air 811 is introduced, preferably near the burner 809, and flows down the outside of the melt/quench chamber 812 walls for preventing molten particles from sticking to the walls of the burner 809. Wall cooling may be provided by the quench air, and/or by an optional liquid cooling loop 813. Molten particles are quenched by cool quench air as the suspension becomes turbulent at the end of the melt/quench chamber. A cyclone separator 814, operated under suction from a centrifugal blower 815 may be used to collect the microspheroidal glassy reagent powder 109.

The apparatus of FIG. 9 and system of FIG. 8 were used to produce solid microspheroidal glassy particles, and cementitious reagent including the same, as defined herein and described in the following examples. The operating parameters involved an approximately stoichiometric combustion of propane and oxygen gases (exact mass ratio not measured). Powdered feedstock 101 entered the burner from a pneumatic disperser fed by a vibratory feeder. The suspension of feedstock and combustion air included an approximately equal mass of oxygen and powdered feedstock; for example, 1 g of aluminosilicate feedstock suspended in 1 g of oxygen.

Those skilled in the art will appreciate that the illustrated apparatus, system and parameters are ones of many potential useful apparatus and systems. For instance, in alternate embodiments, the solid particles fly in suspension in a carrier gas and are heated by one or more energy sources. The energy for melting may be provided by one or a combination of suitable high-temperature heat sources such as plasma (arc discharge or inductively coupled), electrical induction heating, electrical resistance heating, microwave heating, solar irradiation, or heat from chemical reactions (e.g., combustion). Several of these energy sources may lower the $CO_2$ footprint of the process, but costs of $CO_2$ emissions must be weighed against the unique costs of each energy source. In many jurisdictions today, the cheapest energy sources are based on combustible hydrocarbon fuels. Therefore, the choice of energy source is mostly dictated by price and cost of $CO_2$ emissions in a given jurisdiction. Current economic and political factors dictate that preferably, the solid particles fly in suspension in a gas such that combustion heats the solid particles to a temperature above the liquid phase transition.

Although an oxygen-fuel burner was used in the examples provided, those skilled in the art will appreciate that the choice of burner fuels is of only secondary importance as long as adequate heating occurs. Any source of heat from combustion, plasma, concentrated solar power, nuclear, and others, are possible.

In some embodiments, an air-fuel burner is preferable to avoid the cost of oxygen enrichment. When air, consisting of only about 23 wt. % oxygen, is combusted with fuels (propane or methane for example) the air-fuel ratio is much higher (~4-5×) to maintain an approximately stoichiometric combustion. A higher air-fuel ratio results in lower flame temperatures. Therefore, it is preferable to adjust accordingly the feedstock powder mass flow to ensure the particles are heated beyond their solidus, and preferably near or beyond their liquidus temperature (about 1000° C. to about 1600° C., and commonly greater than about 1200° C.).

Figure 10:
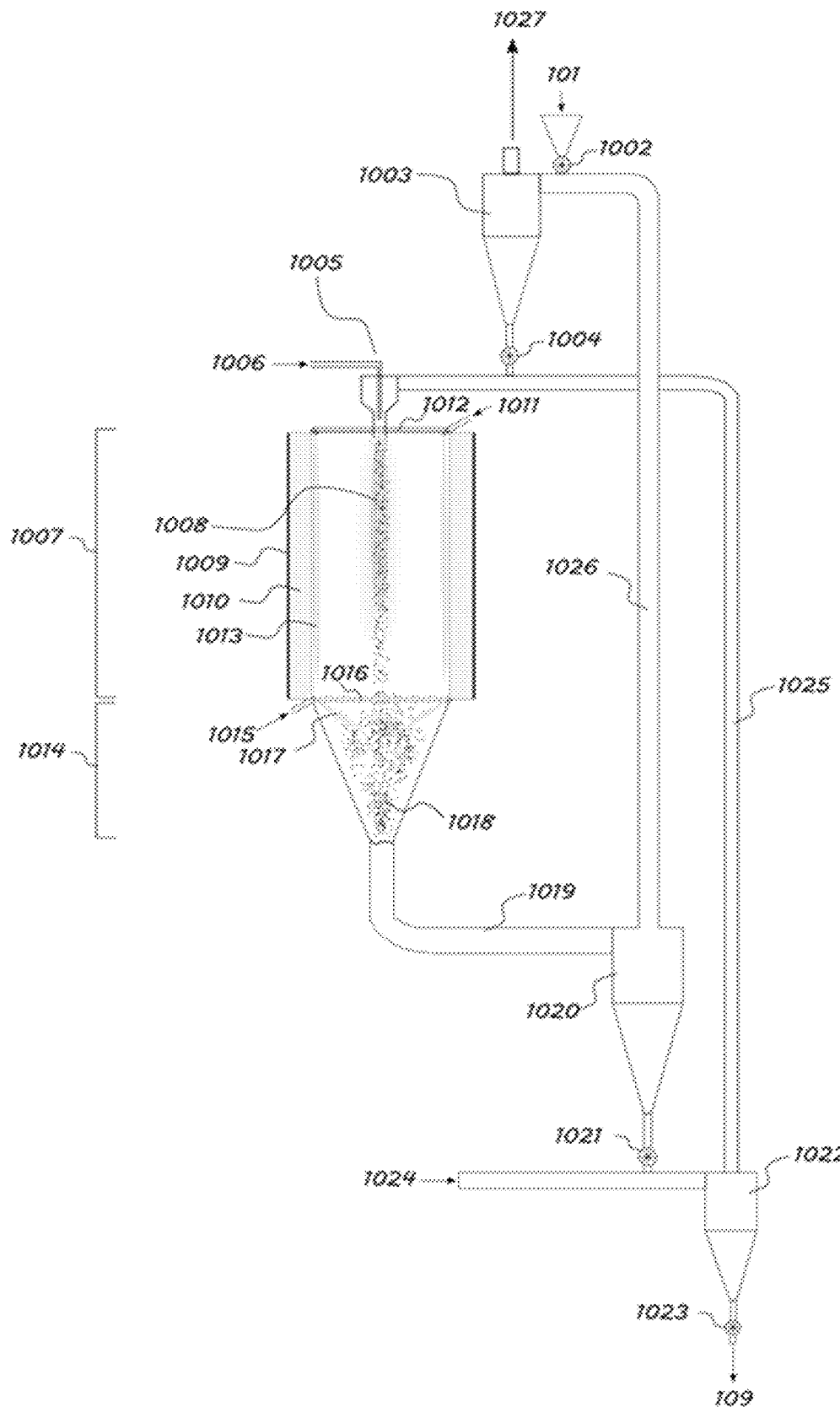
FIG. 10 is a schematic drawing of an improved in-flight melting apparatus that includes heat recovery loops for decreasing energy input and $CO_2$ emissions, in accordance with one embodiment.

FIG. 10 illustrates another embodiment of an apparatus and system for in-flight melting/quenching in accordance with embodiments described herein. Feedstock 101 passes through valve 1002 and enters cyclone 1003 where it is preheated by exchanging heat with hot gases flowing through pipe 1026. In certain embodiments, a pre-heat temperature may be insufficient to melt the feedstock 101, and may range, for example, from about 300° C. to about 800° C. Valve 1004 meters feedstock powder into hot gas (e.g., combustion air) flowing through pipe 1025. Combustion air and feedstock suspension is conveyed through a burner 1005 wherein combustible gas is introduced through pipe 1006. A cylindrical melting chamber 1007 is configured to receive a hot stream of gas (e.g., combustion gases) entrained with aluminosilicate particles in various stages of melting 1008. The melting chamber 1007 includes a cylindrical shell 1009 of suitable material such as steel, and an inner lining of suitable refractory material 1010. The melting chamber 1007 is also protected internally by a stream of cool air (primary quench air) 1011 injected from an upper distribution ring 1012. Cooling air flows inside the melting chamber 1007 around inner chamber walls in a laminar or swirling flow 1013 without mixing significantly with the central stream of molten suspended particles 1008. This airflow also protects the inner refractory lining 1010 and limits heat loss.

Molten particles 1008 next enter a quenching chamber or quench zone 1014 where particles interact with primary quench air 1013 and optionally secondary cool quench air 1015 that passes through a distributor 1016 and is injected 1017 into the quenching chamber 1014.

Quenched, hot solid particles 1018 flow suspended through pipe 1019 and are separated from hot gases in a cyclone separator 1020. Hot solid glassy particles pass through valve 1021, exchange heat with cool combustion air 1024, and are separated in combustion air preheat cyclone 1022. Valve 1023 regulates pressure and allows collection of microspheroidal glassy product 109. The cyclone separators 1003, 1020, 1022 also function as solid/gas heat exchangers for important heat recovery loops that increase energy efficiency of the process. Plural cyclone separators may be arranged in various configurations, such as in series or in parallel. In cyclone 1020, hot gases from the melting chamber 1007 are separated from solids and these gases preheat cooler feedstock powder 101 before separation in cyclone 1003. The heat-exchanged exhaust gas 1027 reports to a suitable exhaust system (for example, a baghouse and blower) or passes on to further stages of heat exchange cyclones. In cyclone 1022, hot quenched particles 1018 exchange heat with cool combustion air 1024 and the preheated combustion air is used to convey preheated feedstock powder into the melting chamber 1007 thereby considerably reducing the amount of energy that must be added to achieve melting of the suspended particles.

EXAMPLES

Example 1: Yield Stress Reduction with Synthetic Spheroidal Particles

To demonstrate the improvement to geopolymer cement mix viscosity, the following procedure was employed. A commercially-available pulverized volcanic glass powder of oxide composition $SiO_2$—73.77%; $Al_2O_3$—11.82%, $Fe_2O_3$—1.42%; $MgO$—0.1%; $CaO$—0.28%; $Na_2O$—4.22%; $K_2O$—4.09% was obtained having a D[3,2] mean particle diameter of 10 micrometers and angular morphology typical of finely ground powders. The volcanic glass powder sample 402 (FIG. 4) was processed by the presently disclosed method of in-flight melting in order to create a molten/quenched powder 403, having a D[3,2] mean particle size of 11 micrometers, and substantially spheroidal morphology characterized by roundness R>8 (see FIG. 4). More specifically, the natural volcanic glass powder (angular morphology) was processed by the apparatus shown in FIG. 8 and FIG. 9. The burner was a commercial oxygen-propane burner model QHT-7/hA from Shanghai Welding & Cutting Tool Works with modified powder feeding, the burner fired into a steel melt chamber with water-cooled walls, and particle temperatures exceeded the mean liquidus temperature of the material, about 1300° C. as estimated from compositional data. It is interpreted that liquidus temperature was exceeded based on i) the microspheroidal morphology that results from surface tension in a liquid phase, ii) homogeneous composition (under backscattered electron imaging) and iii) the absence of unmolten or partially molten particles in the final reagent.

In this experiment, the burner was not sealed tightly to the melt chamber, and thereby cool quench air was allowed to rush in along the walls of the melt chamber, only quenching the molten entrained powder after sufficient residence time to allow melting. Quenched hot powder was separated from hot combustion gases with a cyclone as shown in FIG. 8 and glass powder was collected for testing. The resulting product in this example is a highly spherical synthetic glass (D[3, 2]=11 micrometers) of equivalent composition and nearly equivalent particle size distribution (FIG. 4) as the raw feedstock.

The microspheroidal mineral glass powder has a molar Si/(Al, $Fe^{3+}$) of 19.68, and molar cementitious reagent formula of $(Ca,Mg)_{0.12} \cdot (Na,K)_{0.89} \cdot (Al, Fe^{3+})_1 \cdot Si_{19.68}$ and CaO of 0.28 wt. % (CaO,MgO of 0.38%).

Figure 4:
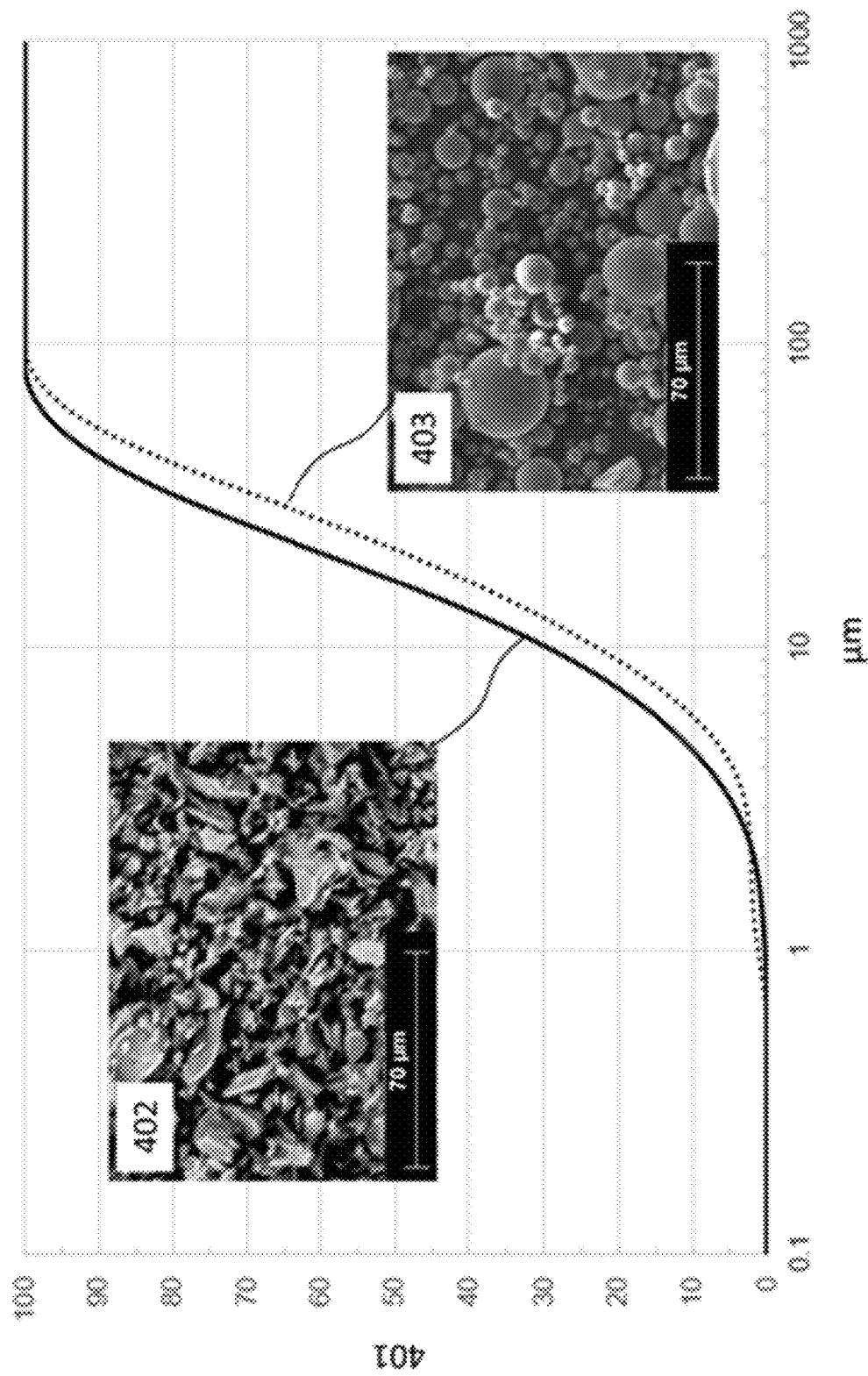
FIG. 4 is a particle size distribution graph comparing angular and spheroidal particle size distributions for commercially available natural volcanic glass powder (angular morphology) and particles produced in accordance with Example 1 (spheroidal morphology). Percentage of particles by volume below a given diameter (y axis) is provided as a function of particle diameter in micrometers (x axis). Electron micrographs demonstrate particle morphology of the samples.

The experiment compares two geopolymer reagents with particles of equivalent composition and nearly equivalent particle size distribution (confirmed by laser diffraction particle size analysis, FIG. 4). The only drastically changed variable is particle morphology.

The powders were mixed separately as geopolymer binder pastes using the following mix design optimized for minimal water use for angular volcanic glass ("Mix A"):

A 99.5 g mixture is made containing 1.77 moles of water, 0.12 moles $Na_2O+K_2O$, 0.82 moles $SiO_2$ and 0.08 moles $Al_2O_3+Fe_2O_3$. The source of $Al_2O_3+Fe_2O_3$ is the cementitious reagent glass or volcanic glass. The source of $SiO_2$ is also the cementitious reagent or volcanic glass and potassium silicate. The source of potassium oxide is potassium silicate and potassium hydroxide. The oxide mole ratios of each mix are provided in Table 1, shown below.

Spheroidal Mix A was too fluid when mixed at the same mass proportions as Angular Mix A, which had very poor workability even at very high water contents of 40 wt. % $H_2O$. Surprisingly, Spheroidal Mix B, containing only 15 wt. % $H_2O$, had excellent workability as indicated by low yield stress of ~6 Pa.

The glassy spheroidal powder was remixed with an identical amount of solid reagent, but lower proportions of silicate hardener and water ("Mix B"):

A 79 g mixture was made containing 0.73 moles of water, 0.11 moles $Na_2O+K_2O$, 0.8 moles $SiO_2$ and 0.08 moles $Al_2O_3+Fe_2O_3$. The source of $Al_2O_3+Fe_2O_3$ is the spheroidal cementitious reagent. The source of $SiO_2$ is also the spheroidal cementitious reagent and potassium silicate. The source of potassium oxide is potassium silicate and potassium hydroxide. The oxide mole ratios of each mix are provided in Table 1, shown below.

A mini-cone slump test (as described by Tan et al. 2017) was employed to determine the approximate yield stress for the angular powder Mix A (spread radius 24 mm), and the spheroidal powder Mix B (spread radius 60 mm). The angular powder produced a non-shear-flowing mass with approximate yield stress of 425 Pa or greater (as calculated by slump flow equation 10 elaborated in Pierre et al. 2013 (Pierre, A., Lanos, C., & Estelle, P. (2013). Extension of spread-slump formulae for yield stress evaluation. Applied Rheology, 23(6), 36-44). Surprisingly, the spheroidal mix had only 41% of the molecular water content of the angular mix (including water in soluble silicate hardener) yet produced an easily pourable resinous fluid with yield stress of only approximately 6.5 Pa (as calculated by the spreading flow equation 2 in Tan et al. 2017 (Tan, Z., Bernal, S. A., & Provis, J. L. (2017). Reproducible mini-slump test procedure for measuring the yield stress of cementitious pastes. Materials and Structures, 50(6), 235).

TABLE 1

| Oxide mole ratios of mixes | | | |
|---|---|---|---|
| Molar ratio | Angular "Mix A" | Spheroidal "Mix A" | Spheroidal "Mix B" |
| $(Na_2O, K_2O)/SiO_2$ | 0.14 | 0.14 | 0.14 |
| $SiO_2/(Al_2O_3, Fe_2O_3)$ | 11.72 | 11.72 | 10 |
| $H_2O/(Al_2O_3, Fe_2O_3)$ | 22.125 | 22.125 | 9.125 |
| $(Na_2O, K_2O)/(Al_2O_3, Fe_2O_3)$ | 1.63 | 1.63 | 1.375 |
| $H_2O/(Na_2O, K_2O)$ | 15.65 | 15.65 | 7.05 |
| $H_2O$ in paste (wt. %) | 40% | 40% | 15% |
| Yield Stress (Pa) | 425 | <1 | 6 |

Angular Mix A and Spheroidal Mix B were heated and cured in a sealed container at 80 degrees Celsius for 6 hours. The angular paste hardened poorly, likely due to the high water content, while the spheroidal paste hardened to a ceramic-like solid with a fine glossy surface.

Example 2: Basalt "FC"

Oligocene basaltic rock was sampled in Vancouver, BC. The mineralogy of the rock is dominated by plagioclase, diopside and a clay-like phase that is likely a weathering product (Table 2, determined by XRD with Rietveld refinement). The major element oxide composition is provided in Table 3.

TABLE 2

| Mineralogy of basalt sample | |
|---|---|
| Phase | Weight % |
| albite-low (calcian) | 56.2 |
| diopside | 13.5 |
| clay (montmorillonite model) | 12.5 |
| forsterite (ferrian) | 5.0 |
| Illite/muscovite 2M1 | 2.6 |
| lizardite 1T | 1.7 |
| ilmenite | 1.7 |
| quartz | 1.6 |
| calcite | 1.5 |
| ulvospinel (ferrian) | 1.4 |

TABLE 3

| Oxide Composition of basalt "FC" (XRF) | |
|---|---|
| Oxide | Weight % |
| $SiO_2$ | 48.13 |
| $Al_2O_3$ | 15.97 |
| $Fe_2O_3$ | 11.99 |
| MnO | 0.16 |
| MgO | 7.83 |

TABLE 3-continued

Oxide Composition of basalt "FC" (XRF)

| Oxide | Weight % |
|---|---|
| CaO | 9.51 |
| $Na_2O$ | 2.77 |
| $K_2O$ | 0.5 |

The basalt was crushed in a jaw crusher, then pulverized in a disc mill, and further reduced in a ring mill to a powder with mean particle size of approximately 10 μm. The powder was fed through a vitrification apparatus that heated the material through the liquid transition to approximately 1450° C., followed by a rapid quenching step. The resulting glass was 96.7% X-ray amorphous (Table 4).

TABLE 4

XRD-Rietveld analysis of basalt glass (corundum spike)

| Phase | Weight % |
|---|---|
| amorphous | 96.7 |
| iron-alpha (from grinding media) | 1.9 |
| quartz | 1.4 |

The microspheroidal basalt glass powder has a molar $Si/(Al, Fe^{3+})$ of 6.93, and molar cementitious reagent formula of $(Ca,Mg)_{3.15} \cdot (Na,K)_{0.21} \cdot (Al, Fe^{3+})_1 \cdot Si_{6.93}$ and CaO of 9.51 wt. % (CaO,MgO of 17.3%).

Individual particles were observed to be highly spherical and mean roundness R is >0.8 (as defined previously), and D[3,2] is 10.5 μm.

A 131 g mixture is made containing 1.31 moles of water, 0.1 moles $Na_2O+K_2O$, 0.88 moles $SiO_2$ and 0.24 moles $Al_2O_3+Fe_2O_3$. The source of $Al_2O_3+Fe_2O_3$ is the microspheroidal basalt powder prepared above. The source of $SiO_2$ is also the basalt powder and potassium silicate. The source of potassium oxide is potassium silicate and potassium hydroxide. The oxide mole ratios are provided in Table 5, shown below.

TABLE 5

| Oxide mole ratios | |
|---|---|
| $(Na_2O, K_2O)/SiO_2$ | 0.11 |
| $SiO_2/(Al_2O_3, Fe_2O_3)$ | 3.67 |
| $H_2O/(Al_2O_3, Fe_2O_3)$ | 5.45 |
| $(Na_2O, K_2O)/(Al_2O_3, Fe_2O_3)$ | 0.42 |
| $H_2O/(Na_2O, K_2O)$ | 13.76 |
| Yield Stress (Pa) | 21.7 |

A mini slump cone test was performed on the geopolymer cement paste and resulted in a flow diameter of 98.4 mm and a calculated yield stress of 21.7 Pa. 110 g of sand was added to the paste, followed by 6 hours of sealed curing at 80 degrees Celsius. The compressive strength of a mortar sample cube was determined to be 19 MPa.

Example 3: Basalt "BD"

A commercially available powdered basalt "BD" has the oxide composition provided in Table 6, shown below.

TABLE 6

Oxide Composition of basalt "BD" (XRF)

| Oxide | Weight % |
|---|---|
| $SiO_2$ | 49.77 |
| $Al_2O_3$ | 14.42 |
| $Fe_2O$ | 11.18 |
| MgO | 4.38 |
| CaO | 9.66 |
| $Na_2O$ | 2.62 |
| $K_2O$ | 0.63 |

The powder was fed through a vitrification apparatus that heated the material through a liquid phase change to approximately 1450° C., followed by a rapid quenching step. Successful melting through the liquid phase was demonstrated for most particles by a highly spherical bulk particle morphology.

The microspheroidal basalt reagent powder "BD" has a molar $Si/(Al, Fe^{3+})$ of 7.84, and molar cementitious reagent formula of $(Ca,Mg)_{2.66} \cdot (Na,K)_{0.23} \cdot (Al, Fe^{3+})_1 \cdot Si_{7.84}$ and CaO of 9.66 wt. % (CaO,MgO of 14.04%). Individual particles were observed to be highly spherical and smooth, a roundness R greater than 0.8, and D[3,2] is 8.0 μm as measured by laser diffraction.

A 116 g mixture was made containing 1.53 moles of water, 0.09 moles $Na_2O+K_2O$, 0.75 moles $SiO_2$ and 0.17 moles $Al_2O_3+Fe_2O_3$. The source of $Al_2O_3+Fe_2O_3$ is the microspheroidal basalt powder prepared above. The source of $SiO_2$ is also the basalt powder and potassium silicate. The source of potassium oxide is potassium silicate and potassium hydroxide. The oxide mole ratios are provided in Table 7.

TABLE 7

| Oxide mole ratios | |
|---|---|
| $(Na_2O, K_2O)/SiO_2$ | 0.11 |
| $SiO_2/(Al_2O_3, Fe_2O_3)$ | 4.41 |
| $H_2O/(Al_2O_3, Fe_2O_3)$ | 9.00 |
| $(Na_2O, K_2O)/(Al_2O_3, Fe_2O_3)$ | 0.53 |
| $H_2O/(Na_2O, K_2O)$ | 18.06 |

110 g of sand was added to the mixture, and the sample was cast into cube molds, followed by 6 hours of sealed curing at 80 degrees Celsius. From three samples, the mean compressive strength of the mortar was determined to be 27.4 MPa with standard deviation of 2.22 MPa.

Example 4: Coal Tailings

A coal tailings sample acquired from Cape Breton, NS includes approximately 60% residual coal and 40% mineral material. The inorganic fraction has the oxide composition provided in Table 8, shown below.

TABLE 8

Oxide Composition of Coal Tailings (XRF)

| Oxide | Weight % (avg. of 2 samples) |
|---|---|
| $SiO_2$ | 52.48 |
| $Al_2O_3$ | 21.76 |
| $Fe_2O_3$ | 15.74 |
| MgO | 1.29 |
| CaO | 1.57 |

TABLE 8-continued

Oxide Composition of Coal Tailings (XRF)

| Oxide | Weight % (avg. of 2 samples) |
|---|---|
| $Na_2O$ | 0.28 |
| $K_2O$ | 3.08 |

Dried coal tailings with measured D[3,2] of 9.9 μm were fed through a vitrification apparatus that combusted excess coal and heated the inorganic material through a liquid phase change to approximately 1450° C., followed by a rapid quenching step. The coal fraction in the feedstock added considerable energy to the process: the flame power increased at least 46% processing coal tailings compared to an "inert" basalt processed at the same mass flow rate.

Successful melting through the liquid phase was demonstrated for inorganic particles by a highly spherical bulk particle morphology, with mean roundness (R)>0.8, and D[3,2] equal to 11.2 μm.

The microspheroidal coal tailings reagent powder has a molar Si/(Al, $Fe^{3+}$) of 5.66, and molar cementitious reagent formula of $(Ca,Mg)_{0.38} \cdot (Na,K)_{0.10} \cdot (Al, Fe^{3+})_1 \cdot Si_{5.66}$ and CaO of 1.7 wt. % (CaO,MgO of 2.56%).

A 45 g mixture is made containing 0.57 moles of water, 0.04 moles $Na_2O+K_2O$, 0.42 moles $SiO_2$ and 0.12 moles $Al_2O_3+Fe_2O_3$. The source of $Al_2O_3+Fe_2O_3$ is the coal tailings microspheroidal powder prepared above. The source of $SiO_2$ is also the coal tailings powder and sodium silicate. The source of sodium oxide is sodium silicate and sodium hydroxide. The oxide mole ratios are provided in Table 9, shown below.

TABLE 9

| Oxide mole ratios | |
|---|---|
| $(Na_2O, K_2O)/SiO_2$ | 0.11 |
| $SiO_2/(Al_2O_3, Fe_2O_3)$ | 4.45 |
| $H_2O/(Al_2O_3, Fe_2O_3)$ | 4.85 |
| $(Na_2O, K_2O)/(Al_2O_3, Fe_2O_3)$ | 0.49 |
| $H_2O/(Na_2O, K_2O)$ | 14.25 |

The mixture was cast into a cube mold, followed by 6 hours of sealed curing at 80 degrees Celsius. The sample was demolded and found to have a compressive strength of 21 MPa and a glossy ceramic-like surface.

Example 5: Dredged Sediment

A sediment sample was acquired from the middle of Vancouver Harbour, BC to represent an example of dredged sediment. The sample has the oxide composition provided in Table 10, shown below.

TABLE 10

| Oxide Composition of sediment (XRF) | |
|---|---|
| Oxide | Weight % |
| $SiO_2$ | 67.06 |
| $Al_2O_3$ | 12.69 |
| $Fe_2O_3$ | 5.62 |
| MgO | 2.4 |
| CaO | 2.98 |
| $Na_2O$ | 2.69 |
| $K_2O$ | 1.64 |

The sample was dried and found to have a mass median diameter, D50, of 47 μm. Next, the sample was sieved to remove particles not passing 75 μm.

This powder was fed through a vitrification apparatus that heated the material through a liquid phase change to approximately 1450° C., followed by a rapid quenching step.

Successful melting through the liquid phase was demonstrated for most particles by a highly spherical bulk particle morphology. The microspheroidal sediment reagent powder has a molar Si/(Al, $Fe^{3+}$) of 11.49, and molar cementitious reagent formula of $(Ca,Mg)_{1.55} \cdot (Na,K)_{0.51} \cdot (Al, Fe^{3+})_1 \cdot Si_{11.49}$ and CaO of 4.42 wt. % (CaO,MgO of 7.14%).

Individual particles are highly spherical and smooth, with mean roundness (R)>0.8, and D[3,2] of 11.8 μm.

A 98 g mixture is made containing 0.89 moles of water, 0.09 moles $Na_2O+K_2O$, 0.8 moles $SiO_2$ and 0.13 moles $Al_2O_3+Fe_2O_3$. The source of $Al_2O_3+Fe_2O_3$ is the microspheroidal sediment powder prepared above. The source of $SiO_2$ is also the sediment powder and potassium silicate. The source of potassium oxide is potassium silicate and potassium hydroxide. The oxide mole ratios are provided in Table 11.

TABLE 11

| Oxide mole ratios | |
|---|---|
| $(Na_2O, K_2O)/SiO_2$ | 0.12 |
| $SiO_2/(Al_2O_3, Fe_2O_3)$ | 6.15 |
| $H_2O/(Al_2O_3, Fe_2O_3)$ | 6.85 |
| $(Na_2O, K_2O)/(Al_2O_3, Fe_2O_3)$ | 0.69 |
| $H_2O/(Na_2O, K_2O)$ | 9.19 |

110 g of sand was added to the mixture, and the sample was cast into a cube mold, followed by 6 hours of sealed curing at 80 degrees Celsius. The compressive strength of the mortar cube was determined to be 25 MPa.

Example 6: Copper Mine Tailings

A sample of copper porphyry flotation tailings was acquired from Argentina to represent an example of a globally abundant aluminosilicate waste material. The sample has the oxide composition provided in Table 12, shown below.

TABLE 12

| Oxide Composition of sediment (XRF) | |
|---|---|
| Oxide | Weight % |
| $SiO_2$ | 70.98 |
| $Al_2O_3$ | 15.26 |
| $Fe_2O_3$ | 2.64 |
| MgO | 1.18 |
| CaO | 1.09 |
| $Na_2O$ | 2.75 |
| $K_2O$ | 3.44 |

The sample was sieved to remove particles not passing 75 μm. This powder was fed through a vitrification apparatus that heated the material through a liquid phase change to approximately 1450° C., followed by a rapid quenching step. Successful melting through the liquid phase was demonstrated for most particles by a highly spherical bulk particle morphology.

The microspheroidal mine tailings reagent powder has a molar $Si/(Al, Fe^{3+})$ of 14.2, and molar cementitious reagent formula of $(Ca,Mg)_{0.6} \cdot (Na,K)_{0.5} \cdot (Al, Fe^{3+})_1 \cdot Si_{14.2}$ and CaO of 1.94 wt. % (CaO,MgO of 4.87%).

Individual particles are highly spherical and smooth, mean roundness (R) is greater than 0.8, and D[3,2] is 11.4 μm.

A 103.6 g mixture is made containing 0.76 moles of water, 0.11 moles $Na_2O+K_2O$, 1.04 moles $SiO_2$ and 0.13 moles $Al_2O_3+Fe_2O_3$. The source of $Al_2O_3+Fe_2O_3$ is the microspheroidal tailings powder prepared above. The source of $SiO_2$ is also the tailings powder and potassium silicate. The source of potassium oxide is potassium silicate and potassium hydroxide. The oxide mole ratios are provided in Table 13, shown below.

TABLE 13

| Oxide mole ratios | |
|---|---|
| $(Na_2O, K_2O)/SiO_2$ | 0.10 |
| $SiO_2/(Al_2O_3, Fe_2O_3)$ | 8.64 |
| $H_2O/(Al_2O_3, Fe_2O_3)$ | 7.78 |
| $(Na_2O, K_2O)/(Al_2O_3, Fe_2O_3)$ | 0.89 |
| $H_2O/(Na_2O, K_2O)$ | 9.67 |

110 g of sand was added to the mixture, and the sample was cast into a cube mold, followed by 6 hours of sealed curing at 80 degrees Celsius. The compressive strength of the mortar cube was determined to be 18 MPa.

Example 7: Waste Concrete

Structural concrete cores were sampled from a mid-rise condominium construction site in Vancouver, BC. The material has the oxide composition provided in Table 14, shown below

TABLE 14

| Oxide Composition of a Structural Concrete (XRF) | |
|---|---|
| Oxide | Weight % |
| $SiO_2$ | 56.61 |
| $Al_2O_3$ | 13.94 |
| $Fe_2O_3$ | 5.15 |
| MgO | 1.42 |
| CaO | 12.55 |
| $Na_2O$ | 3.55 |
| $K_2O$ | 1.48 |

The sample was sieved to remove particles not passing 75 μm. This powder was fed through a vitrification apparatus that heated the material through a liquid phase change to approximately 1450° C., followed by a rapid quenching step.

Successful melting through the liquid phase was demonstrated for most particles by a highly spherical bulk particle morphology.

The microspheroidal concrete reagent powder has a molar $Si/(Al, Fe^{3+})$ of 12.3, and molar cementitious reagent formula of $(Ca,Mg)_{3.06} \cdot (Na,K)_{0.7} \cdot (Al, Fe^{3+})_t \cdot Si_{12.3}$ and CaO of 12.55 wt. % (CaO,MgO of 13.97%).

Individual particles are highly spherical and smooth, mean roundness (R) is greater than 0.8, and D[3,2] is 10.0 μm.

A 100 g mixture is made containing 1.27 moles of water, 0.08 moles $Na_2O+K_2O$, 0.73 moles $SiO_2$ and 0.13 moles $Al_2O_3+Fe_2O_3$. The source of $Al_2O_3+Fe_2O_3$ is the microspheroidal concrete powder prepared above. The source of $SiO_2$ is also the concrete powder and potassium silicate. The source of potassium oxide is potassium silicate and potassium hydroxide. The oxide mole ratios are provided in Table 15, shown below.

TABLE 15

| Oxide mole ratios | |
|---|---|
| $(Na_2O, K_2O)/SiO_2$ | 0.11 |
| $SiO_2/(Al_2O_3, Fe_2O_3)$ | 7.59 |
| $H_2O/(Al_2O_3, Fe_2O_3)$ | 10.79 |
| $(Na_2O, K_2O)/(Al_2O_3, Fe_2O_3)$ | 0.86 |
| $H_2O/(Na_2O, K_2O)$ | 15.46 |

100 g of sand was added to the mixture, and the sample was cast into a cube mold, followed by 6 hours of sealed curing at 80 degrees Celsius. The compressive strength of the mortar cube was determined to be 27 MPa.

Example 8: Quarried Aggregate

Granodioritic crusher dust from an aggregate quarry near Vancouver, Canada was sampled for the following experiment. The sample has an oxide composition (SEM-EDX) of approximately $SiO_2$—73%; $Al_2O_3$—15%; $Fe_2O_3$—3%; MgO—0%; CaO—2%; $Na_2O$—3%; $K_2O$—4%. The rock was further crushed and milled to a fine powder completely passing 75 μm.

The resulting powder was processed by an in-flight vitrification apparatus that heated the material through a liquid phase change to approximately 1450° C., followed by a rapid quenching step.

Successful melting through the liquid phase was demonstrated for most particles by a highly smooth and spherical bulk particle morphology.

Individual particles are highly spherical and smooth, mean roundness (R) is greater than 0.8, and D[3,2] is 9.3 μm. The microspheroidal granodiorite glass reagent powder has a molar $Si/(Al, Fe^{3+})$ of 16.0, and molar cementitious reagent formula of $(Ca,Mg)_{2.5} \cdot (Na,K)_{4.4} \cdot (Al, Fe^{3+})_1 \cdot Si_{16.0}$ and CaO of 2 wt. % (CaO,MgO of 2%).

A 105 g mixture is made containing 1.53 moles of water, 0.1 moles $Na_2O+K_2O$, 0.93 moles $SiO_2$ and 0.12 moles $Al_2O_3+Fe_2O_3$. The source of $Al_2O_3+Fe_2O_3$ is the microspheroidal aggregate powder prepared above. The source of $SiO_2$ is also the aggregate powder and potassium silicate. The source of potassium oxide is potassium silicate and potassium hydroxide. The oxide mole ratios are provided in Table 16.

TABLE 16

Oxide mole ratios

| | |
|---|---|
| (Na$_2$O, K$_2$O)/SiO$_2$ | 0.1 |
| SiO$_2$/(Al$_2$O$_3$, Fe$_2$O$_3$) | 8.0 |
| H$_2$O/(Al$_2$O$_3$, Fe$_2$O$_3$) | 10.8 |
| (Na$_2$O, K$_2$O)/(Al$_2$O$_3$, Fe$_2$O$_3$) | 0.9 |
| H$_2$O/(Na$_2$O, K$_2$O) | 12.9 |

The mixture above was cast as a paste into a cube mold, followed by 24 hours of sealed curing at 80 degrees Celsius. The compressive strength of the paste cube was determined to be 11 MPa, showing that the material gains strength with heat curing, as expected. The lower relative strength can be explained by the omission of sand (as in mortar), and higher unmolten quartz mineral content compared to other examples (quartz melts at >1600° C.), which acts as a relatively inert filler.

Summary of Examples 1 to 8

Figure 5:
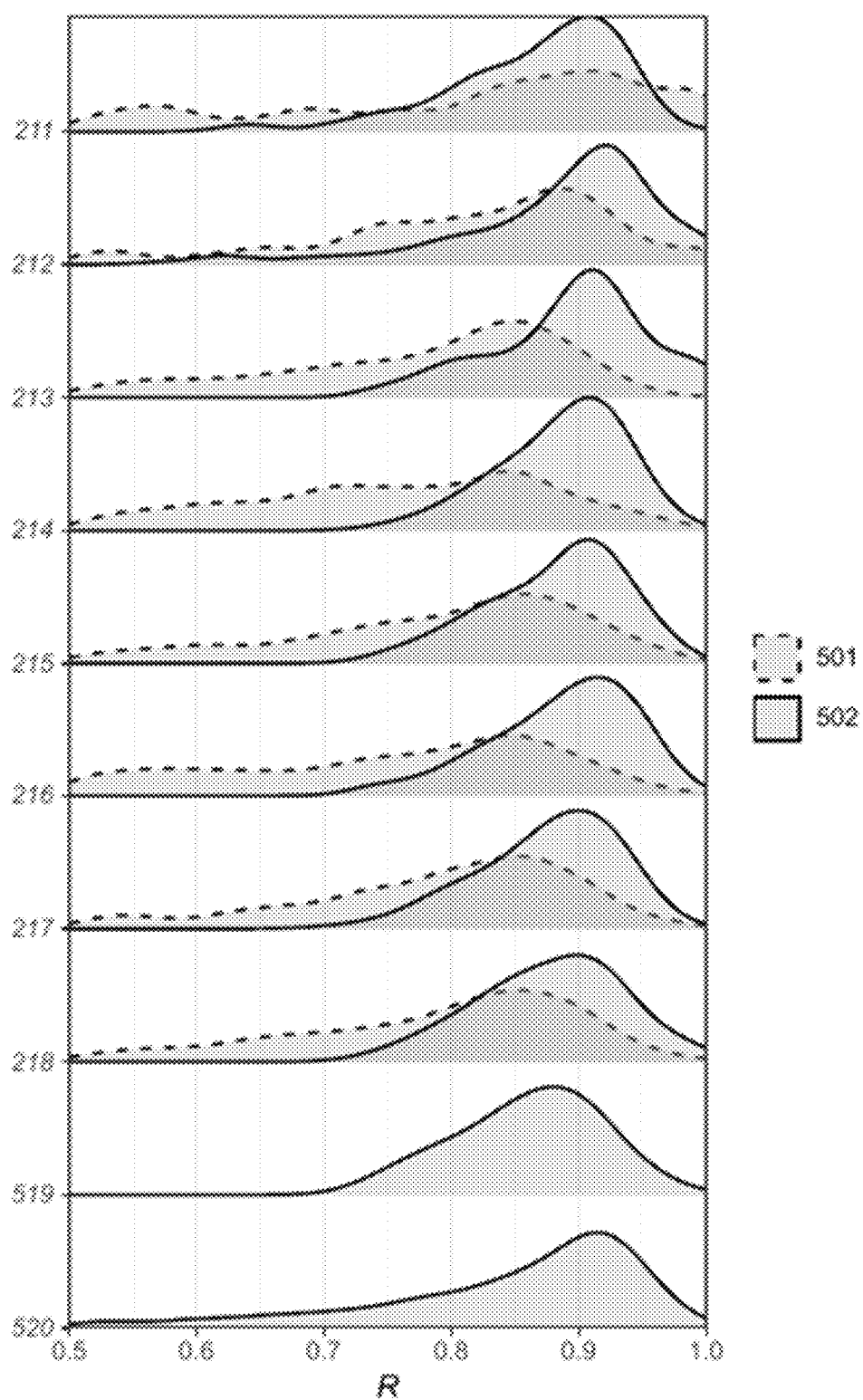
FIG. 5 is a graph providing a comparison of particle roundness (R) distributions of various powders, in accordance with some embodiments; (211-218, 519, 520, as defined hereinafter) before processing (501) and after processing (502) in accordance with Examples 1-8, in accordance with some embodiments. Image analysis was used to determine R values from micrographs of the same powders shown in FIG. 6 and FIG. 7 following the method of Takashimizu & Liyoshi (Takashimizu, Y., Iiyoshi, M. (2016). New parameter of roundness R: circularity corrected by aspect ratio. Progress in Earth and Planetary Sciences 3, 2. https://doi.org/10.1186/s40645-015-0078-x). Also see Table 17 for more precise data. For convenience, two Type F fly ash samples are also included; 519 (B-FA) a beneficiated fly ash sold commercially, and 520 (L FA) an unbeneficiated fly ash direct from a coal power plant.
Figure 6:
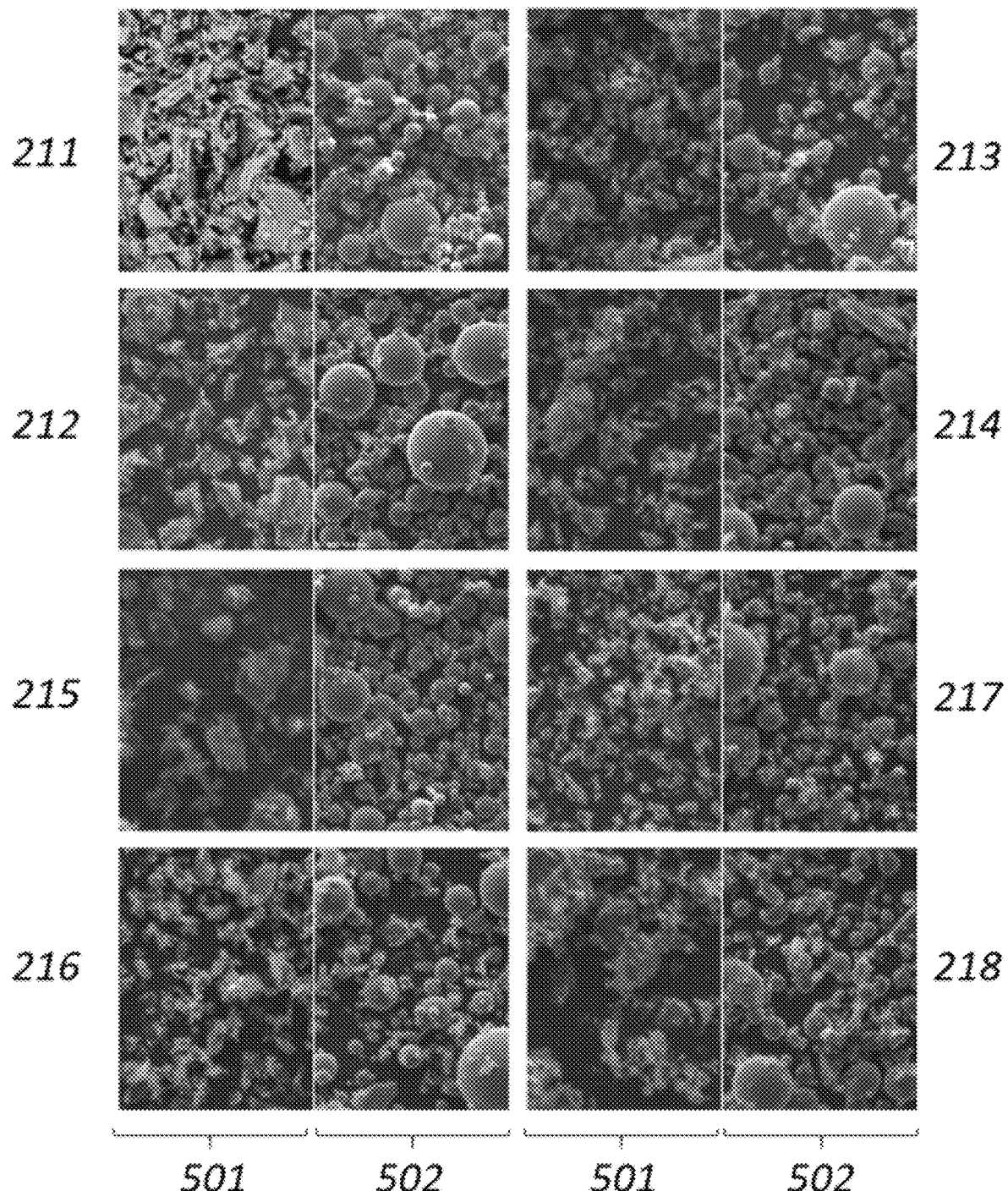
FIG. 6 is a panel showing a collection of electron micrograph pairs comparing unprocessed particles (501) and processed particles (502) from various materials (211-218 as defined hereinafter) as described in Example 1 through Example 8. Field of view width for individual panels is 140 μm.
Figure 7:
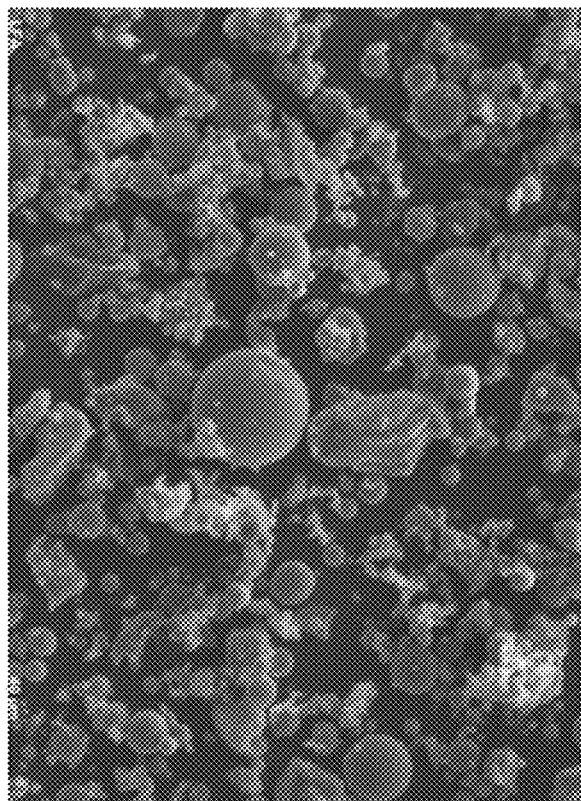
FIG. 7 is a panel showing pictures of two Type F fly ashes, one directly from a coal power plant in Nova Scotia (L-FA; 520) and another commercially available fly ash that has been beneficiated to remove activated carbon and other contaminants (B-FA; 519). Field of view width for individual panels is 140 μm.
Figure 7:
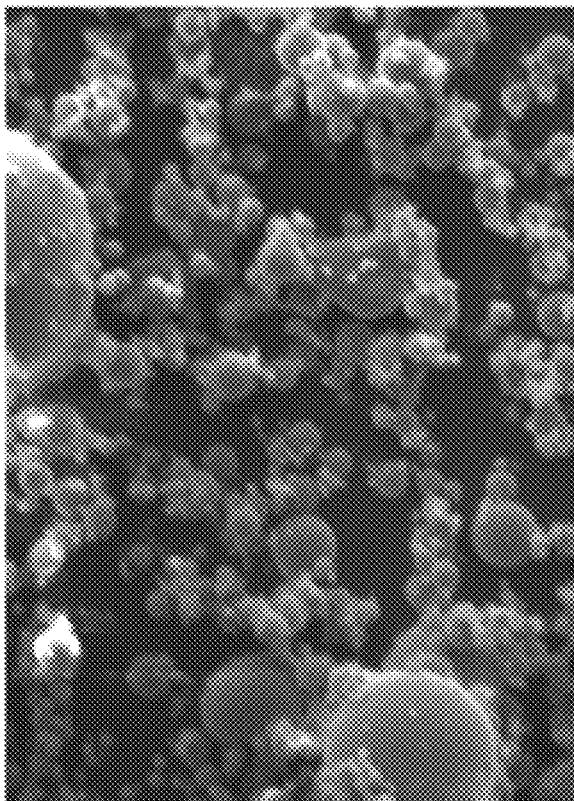

Table 17 summarizes the main findings of Examples 1-8 and also provides a comparison against the performance of two fly ashes; one commercially available Type F fly ash that has been beneficiated (B-FA), and fly ash of Type F composition sampled directly from a coal power plant in Nova Scotia, Canada. A visual representation of the roundness R distributions is provided in FIG. 5.

Example 9: Use of Synthetic Cementitious Reagent as Alternative SCM

Microspheroidal basalt sample "BD" of Example 3 above was further processed by pulverizing the powder in a ring mill for 5 minutes, causing the coarsest particles to break and thereby increase reactive surface area. The D[3,2] particle size was determined to be 3.6 μm by laser diffraction analysis. Interestingly, small spheres <10 μm tend to act as ball bearings in the mill and resist breakage. The reagent's strength activity index was compared to a commercially available high-quality Type F fly ash with an oxide composition SiO$_2$—52.09%; Al$_2$O$_3$—18.58%, Fe$_2$O$_3$—4.25%; MgO—2.98%; CaO—10.25%; Na$_2$O—6.03%; K$_2$O—1.72%.

Following ASTM C618, 50 mm cubes were cast of a Portland cement control mix, Portland cement with fly ash (20% and 40% replacement), and Portland cement with cementitious reagent BD powder (also 20% and 40% replacement). Table 18 provides the compressive strength results at 7 and 28 days. The performance of the BD mix at 20% replacement was comparable with the commercial Type F fly ash and the strength activity index was acceptable. The BD mix was easily workable and mixed without trouble. Notably, both the BD reagent and fly ash produce very useable mortar strengths greater than 40 MPa after 28 days at 40% replacement of Portland cement. BD cementitious reagent can therefore be considered a suitable fly ash replacement in terms of compressive strength.

TABLE 17

Summary of Examples 1 to 8

| Example | Sample | Material | Type | Particle Size D[3,2] (μm) | R (Roundness) Mean | R (Roundness) StDev | R (Roundness) n | Mortar Compressive Strength (MPa) |
|---|---|---|---|---|---|---|---|---|
| 1 | PUM-1 | Pumice | Feedstock | | 0.79 | 0.21 | 201 | <1 |
| | | | Processed | 11.0 | 0.86 | 0.11 | 128 | 11 |
| 2 | B-FC | Basalt | Feedstock | | 0.80 | 0.15 | 151 | |
| | | | Processed | 10.5 | 0.89 | 0.10 | 160 | 19 |
| 3 | BD-1 | Basalt | Feedstock | | 0.75 | 0.16 | 1326 | |
| | | | Processed | 8.0 | 0.91 | 0.08 | 230 | 27 |
| 4 | VJ | Coal Tailings | Feedstock | | 0.73 | 0.17 | 561 | |
| | | | Processed | 11.2 | 0.89 | 0.06 | 652 | 21 |
| 5 | FRS | Sediment Copper Mine | Feedstock | | 0.79 | 0.66 | 2383 | |
| 6 | LA-01 | Tailings | Feedstock | | 0.68 | 0.21 | 1414 | |
| | | | Processed | 11.4 | 0.90 | 0.08 | 294 | 18 |
| 7 | SC-01 | Demolished Concrete | Feedstock | | 0.78 | 0.14 | 627 | |
| | | | Processed | 10.0 | 0.88 | 0.10 | 238 | 27 |
| 8 | SV-AGG | Felsic Aggregate | Feedstock | | 0.78 | 0.16 | 2564 | |
| | | | Processed | 9.3 | 0.88 | 0.07 | 951 | 11 |
| | L-FA | Fly Ash (Type F) | Direct from Power Plant | 3.9 | 0.83 | 0.13 | 1505 | 2.2 |
| | B-FA | Fly Ash (Type F) | Beneficiated | 5.1 | 0.87 | 0.07 | 797 | 23 |

R-roundness (unitless), as defined by Takashimizu & Iiyoshi (2016), n-number of particles analyzed.

TABLE 18

Strength of Portland cement with cementitious reagent BD powder

| | Compressive Strength | | Strength Activity Index | |
| --- | --- | --- | --- | --- |
| | | | Ratio to control | Ratio to control |
| | 7 days | 28 days | (7 days) | (28 days) |
| Control | 45.4 | 60.8 | | |
| FA-20 | 38.6 | 48.4 | 85% | 79% |
| FA-40 | 29.2 | 42 | | |
| BD-20 | 38.4 | 50.8 | 84% | 83% |
| BD-40 | 26.4 | 44 | | |
| Minimum requirement of ASTM C618 | | | 75% | 75% |

Cementitious Material

According to some embodiments, a novel method of production and uses of cementitious reagents, geopolymer reagents and supplementary cementitious materials (SCM) provides significant advantages over the known methods and formulas.

According to some embodiments, a cementitious reagent has the oxide Formula 1: $(CaO,MgO)a \cdot (Na_2O,K_2O)b \cdot (Al_2O_3,Fe_2O_3)c \cdot (SiO_2)d$, where a is about 0 to about 4, b is about 0.1 to about 1, c is 1, and d is about 1 to about 15.

Advantageously, the cementitious reagent may be formulated from abundant rocks, minerals and compounds of suitable composition. Preferably the CaO content is lower that about 30 wt. % in order to reduce the $CO_2$ impact of cement.

In some embodiments, the cementitious reagent is in the form of a non-crystalline solid. In embodiments, the cementitious reagent is in a powder form having a particle size distribution with a D50 (median diameter) of approximately 20 μm or less, or preferably 10 μm or less.

In embodiments, the cementitious reagent includes at least one of the following properties: a content of 45%-100%, and preferably 90-100%, X-ray amorphous solid; and molar composition ratios of $(Ca,Mg)_{0-12} \cdot (Na,K)_{0.05-1} \cdot (Al, Fe^{3+})_1 \cdot Si_{1-20}$.

In some embodiments, the cementitious reagent includes less than about 10 wt. % CaO. In other embodiments, the cementitious reagent includes more than about 30 wt. % CaO. The composition of cementitious reagent with respect to molar ratio of (Na, K) and Ca may be varied to obtain certain advantages depending on the binder. For example, a cementitious reagent with less than about 10 wt. % CaO is suitable for use in heat-cured geopolymer and as a fly ash substitute. In the alternative, a cementitious reagent with greater than about 30 wt. % CaO has hydraulic properties and may be added to a geopolymer resin to allow ambient-temperature curing of geopolymer cement and may directly replace blast furnace slag in blended Portland cement.

In some embodiments, the cementitious reagent is a low-calcium containing cementitious reagent with a molar composition of $Si/(Fe^{3+},Al)$ between 1-20, and with a CaO content of about 10 wt. % or less. Preferably such a cementitious reagent is 40-100% X-ray amorphous, more preferably about 80 to about 100% X-ray amorphous, even more preferably 100% non-crystalline. Such a low-calcium containing cementitious reagent may find numerous commercial applications, for instance, as a pozzolanic admixture in hydraulic cement, and/or as a reagent in geopolymer binders and cements.

In other embodiments, the cementitious reagent is a high-calcium containing cementitious reagent with a molar composition of $Si/(Fe^{3+},Al)$ between 1-20, and a CaO content of about 10 to about 50 wt. %, preferably about 20 wt. % to about 45 wt. %. Preferably such cementitious reagent is 40-100% X-ray amorphous, more preferably about 80 to about 100% X-ray amorphous, even more preferably 100% non-crystalline. Such a high-calcium containing cementitious reagent may find numerous commercial applications, for instance as a hydraulic admixture in blended hydraulic cement and/or as a reagent in geopolymer binders and cements.

In still further embodiments, the cementitious reagent is an intermediate-calcium containing cementitious reagent with a molar composition of $Si/(Fe^{3+},Al)$ between 1-20, and a CaO content of about 10 to about 20 wt. %. Preferably such cementitious reagent is about 40 to about 100% X-ray amorphous, more preferably about 80 to about 100% X-ray amorphous, and even more preferably 100% non-crystalline. Such an intermediate-calcium containing cementitious reagent may find numerous commercial applications, for instance as a cementitious reagent with desirable intermediate hydraulic and pozzolanic properties.

Advantages of selecting Na/K in the cementitious reagent in accordance with certain embodiments may be realized in: 1) SCM applications where free lime in hydraulic cement will exchange with soluble alkalis and coordinate with sialate molecules from the cementitious reagent to create relatively stable alkali aluminosilicate polymerization that greatly improves chemical properties of traditional hydraulic cements; and 2) the fact that geopolymer reagents with significant Na/K content may be implemented with less soluble silicate hardener than would otherwise be necessary, thus decreasing the soluble silicate requirement (and cost) of a geopolymer mix design.

Methods of Preparation

In some embodiments, aluminosilicate materials are selected as a feedstock for producing cementitious reagent. FIG. 1 shows exemplary steps that may be implemented to produce cementitious reagent from aluminosilicate materials, in accordance with some embodiments.

Briefly, an aluminosilicate material 101 is selected, and its chemical composition is analyzed 102 and evaluated. The feedstock may be analyzed by any suitable quantitative or semi-quantitative methods such as XRF, XRD with Rietveld Refinement, LIBS, EDS, wet chemical analysis, and various other existing methods to determine the feedstock elemental composition.

If the selected composition is not acceptable, the material is amended, blended (e.g., in a vessel prior to thermochemical processing), or sorted 103, for example, through addition of a composition adjustment material 104. As used herein, the term "composition adjustment material" refers to any solid or liquid material with a composition suitable for preferentially altering the bulk composition of the aluminosilicate material 101 with respect to one or several of the elements Ca, Na, K, Al, Fe, and Si.

As described above, composition adjustment materials that introduce calcium (Ca) may include $CaCO_3$, $Ca(OH)_2$, CaO, CaCl, calcium silicate minerals and compounds, calcium aluminum silicate minerals and compounds, waste Portland cement products, wollastonite, gehlenite, and other melilite group mineral compositions.

As described above, composition adjustment materials that introduce aluminum (Al) may include aluminous rocks, minerals, soils, sediments, by-products, and compounds including one or more of kaolinite, halloysite and other aluminum-rich/alkali-poor clay minerals, $Al_2SiO_5$ polymorphs, chloritoid, staurolite, garnet, corundum, mullite, gehlenite, diaspore, boehmite, gibbsite, and nepheline and other feldspathoids. Other materials that may be used include aluminum metal, bauxite, alumina, red mud (alumina refinery residues).

As described above, composition adjustment materials that introduce iron (Fe) may include iron-rich rocks, minerals, soils, sediments, by-products, and compounds such as olivine, chlorite minerals (chamosite, clinochlore, etc.), pyroxenes, amphiboles, goethite, hematite, magnetite, ferrihydrite, lepidicrocite and other iron oxy-hydroxide compositions, iron-rich clay and phyllosilicate minerals, and elemental iron.

Sorting 105 may also be used as a composition adjustment method 103 and any undesirable waste material may be discarded.

The resulting solid aluminosilicate material having a desirable composition is next heated 106. The heating is carried out to reach a heating temperature above a liquid phase temperature to obtain a liquid, for instance about 1000° C. to about 1600° C., or about 1300° C. to about 1550° C. Any suitable method or apparatus may be used for the heating and for obtaining the liquid including, but not limited to, in-flight melting and/or batch melting. This may be achieved by using, for instance, a plasma furnace, an oxy-fuel furnace, an arc furnace, a reverberatory furnace, a rotary kiln and/or a solar furnace. Typically, a furnace temperature of about 1000° C. to about 1600° C. is needed, and most typically about 1300° C. to about 1550° C. to obtain the desired liquid phase.

If desired, a fluxing material may be added to the solid aluminosilicate material to lower its melting point and/or to induce depolymerization of the liquid. The fluxing material may be mixed with the solid aluminosilicate material prior to heating or during the heating. Common fluxing materials that may induce depolymerization in melts, and/or lower melting temperature include $CaF_2$, $CaCO_3$, waste glass, glass cullet, glass frit, alkali-bearing minerals (e.g., feldspars, zeolites, clays, and feldspathoid minerals), borate salts, halogen compounds (fluoride and chloride bearing salts) and calcium salts.

Next, the aluminosilicate liquid (e.g., molten particles) is quenched 107 to obtain a solid. In embodiments, the quenching step includes reducing temperature of the liquid significantly below the glass transition temperature, for instance at 500° C. or lower, or preferably below 200° C. or lower. In embodiments, the quenching is done rapidly, i.e., the temperature is reduced at a rate of about $10^2$ $Ks^{-1}$-$10^6$ $Ks^{-1}$ (preferably at a rate of $>10^{3.5}$ $Ks^{-1}$). Any suitable method may be used for the quenching including, but not limited to, contacting the molten material with a sufficient stream of adequately cool air, steam, or water to produce a non-crystalline solid.

Next, the solid is crushed and/or pulverized in order to reduce particle size 108 and obtain the cementitious reagent 109. This may be carried out using any suitable method or apparatus including, but not limited to, a ball mill, a roller mill and a vertical roller mill. Preferably the particle size is reduced to obtain a fine powder useful in cementitious applications. In embodiments, the powder has a particle size distribution with D50 (median diameter) of approximately 20 μm or less, more preferably 10 μm or less. Such a particle size is generally desirable to ensure sufficient reactivity and consistent material properties.

Uses of the Cementitious Reagent

One related aspect concerns the broad relevance of the cementitious reagent described herein. Appropriate compositions of engineered cementitious reagent may be used interchangeably in significant proportion in both geopolymer cements and hydraulic cements (i.e., cements that react with water).

Accordingly, embodiments described herein encompass geopolymer cements and hydraulic cements including at least 5 wt. %, or at least 10 wt. %, or at least 15 wt. %, or at least 20 wt. %, or at least 25 wt. %, or at least 30 wt. %, or at least 40 wt. %, or at least 50 wt. %, or at least 60 wt. %, or at least 70 wt. %, or at least 80 wt. %, or at least 90 wt. %, or more, of a cementitious reagent as described herein.

In accordance with another aspect, some embodiments relate to a supplementary cementitious material (SCM) including a cementitious reagent as defined herein. In embodiments, the SCM includes about 5 wt. % to about 50 wt. % (preferably at least 20 wt. %) of the cementitious reagent as defined herein.

In accordance with another aspect, some embodiments relate to a supplementary cementitious material (SCM) having one or more of the following properties: includes less than about 35 wt. % CaO, with appreciable content of Na/K (e.g., at least 2 wt. %, preferably at least 5 wt. %) and Al content (e.g., at least 5 wt. %) and is in the form of a non-crystalline solid.

In accordance with another aspect, some embodiments relate to a solid concrete, including a cementitious reagent as described herein, i.e., including about 5 wt. % to about 50 wt. % (preferably at least 20 wt. %) of the cementitious reagent as described herein.

In accordance with another aspect, some embodiments relate to a blended hydraulic cement that is distinguishable from Portland cement. For instance, solid-state $^{29}Si$ NMR spectroscopy can differentiate blended hydraulic cement with low iron (<5 wt. %) from Portland cement (having dominant CSH binder constituent) by the amount and type of connectivity of silica tetrahedra in the cured cements. Indeed, cured Portland cement binder phases are characterized by low coordination and hydrated sites (Q1, Q1(OH), Q2, and Q2(OH)), insignificant tetrahedral Al substitution, and no higher coordination (i.e., no Q3 and Q4 sites).

The blended hydraulic cement with cementitious reagent may show the typical CSH-related sites above in addition to unique features such as: aluminum substitution (e.g., Q2(1 Al)), and a "higher" level of coordination than Portland cement (i.e., branching). For instance, a blended hydraulic cement can include at least a Q3 level of coordination (e.g., (Q3(2 Al), Q3(1 Al), Q3(0 Al)). In embodiments the blended hydraulic cement contains a measurable proportion (>1 wt. %) of three-dimensional cross-linking (Q4 sites) which is not known in conventional hydraulic cements. In accordance with another aspect, disclosed is a geopolymer binder including a cementitious reagent as defined as defined herein, i.e., including about 5 wt. % to about 90 wt. % (preferably at least 20 wt. %, at least 30 wt. %, at least 50 wt. %, at least 75 wt. %,) of the cementitious reagent as defined herein.

In accordance with another aspect, some embodiments relate to solid geopolymer concrete including about 5 wt. % to about 50 wt. % (preferably at least 20 wt. %) of the cementitious reagent as defined herein.

Those skilled in the art can appreciate that the present disclosure advantageously provides methods to produce versatile low-$CO_2$ cementitious reagents from abundant, cheap natural materials. Another significant advantage is the creation of a single reagent that meets specification standards for alternative SCMs, while also meeting the needs of the growing geopolymer market.

Aluminosilicate Materials

As described herein, some embodiments provide a method for thermochemical processing of aluminosilicate materials to produce a solid cementitious reagent that may advantageously be used as an alternative supplementary cementitious material (SCM) in blended hydraulic cement and/or as a geopolymer solid reagent in geopolymer binders (thus eliminating the need for some or all of MK-750, fly ash, GGBFS, and other common solid reagents).

In some cases, an aluminosilicate material is used to produce a non-crystalline cementitious reagent. In some embodiments, an aluminosilicate material is used to produce at least one of a supplementary cementitious material (SCM) and a geopolymer reagent. In some embodiments, the aluminosilicate material is selected from dredged sediments, demolished concrete, mine wastes, glacial clay, glacial deposits, fluvial deposits, rocks and mineral mixtures, for instance rocks and mineral mixtures composed of some or all the elements Ca, Na, K, Fe, Al and Si. In some embodiments, aluminosilicate materials are selected as a feedstock for producing cementitious reagent. The feedstock may be analyzed by quantitative or semi-quantitative methods such as XRF, XRD with Rietveld Refinement, LIBS, EDS, wet chemical analysis, and various other existing methods to determine the feedstock elemental composition.

Example 10: Using Dredged Sediments

A sample of sediments was taken from the tidal lower reaches of the Fraser River, Vancouver, BC. The sample is composed of fine sand, silt and clay size fractions. The mineralogy of the sample is given in Table 19 (determined by XRD with Rietveld refinement) and oxide composition of the major elements was estimated from the mineralogy (Table 20).

TABLE 19

Mineralogy of Fraser River Sediment Sample

| Phase | Weight % |
| --- | --- |
| quartz-low | 42 |
| andesine | 16 |
| albite-low | 13 |
| illite/muscovite | 11 |
| clinochlore | 5 |
| augite | 4 |
| orthoclase | 4 |
| actinolite | 4 |
| dolomite | 2 |
| kaolinite | 2 |

TABLE 20

Oxide Composition (estimated from mineralogy)

| Oxide | Weight % |
| --- | --- |
| $SiO_2$ | 73.0 |
| $Al_2O_3$ | 11.9 |
| $Fe_2O_3$ | 0.2 |
| FeO | 1.5 |
| MnO | 0.0 |
| MgO | 3.1 |

TABLE 20-continued

Oxide Composition (estimated from mineralogy)

| Oxide | Weight % |
| --- | --- |
| CaO | 3.3 |
| $Na_2O$ | 2.6 |
| $K_2O$ | 1.4 |
| $CO_2$ | 0.9 |
| $H_2O$ | 2.2 |

Fraser river sediment (FRS) was dried, classified, and the fraction passing 120 μm was fed to a vitrification apparatus that heated the material through the melting point to approximately 1450° C., followed by a quenching step to cool the powder. The resulting FRS-glass powder was ground in a ball mill to D50<20 μm. The X-ray amorphous component of the obtained powder was 52%. The mineralogy results yield an estimated molar Si/(Al, $Fe^{3+}$) of 11.46, and molar cementitious reagent composition of $(Ca,Mg)_{1.25}\cdot(Na,K)_{0.34}\cdot(Al$, and CaO of 3.3 wt. %. This may be qualified as a "low-Ca cementitious reagent."

Heat-cured geopolymer binder: 5 parts of the low-Ca cementitious reagent was mixed with 1 part potassium silicate solution (Molar ratio $SiO_2:K_2O=1.45$). The paste was mixed thoroughly, placed in a sealed mold and cured at 80° C. for 4 hours. The resulting hardened paste achieves at least 20 MPa compressive strength in a cylinder compression test.

Ambient-cured geopolymer binder: 5 parts of the low-Ca cementitious reagent was mixed with 1 part potassium silicate solution (Molar ratio $SiO_2:K_2O=1.45$), 1 part water, and 1.5 parts finely ground $CaSiO_3$. The silicate solution was mixed with the $CaSiO_3$ powder and allowed to react for 15 minutes. The resulting paste was mixed thoroughly with the FRS glass powder and water, then placed in a sealed mold and cured at 20° C. for 7 days. The resulting hardened paste achieves at least 20 MPa compressive strength in a cylinder compression test.

Ambient-cured SCM application in Portland Cement: a series of Portland cement mortar cubes were cast from a 50:50 mix of cement and sand. The low-Ca cementitious reagent was substituted at 0%, 20%, 40%, 60% and 80% in place of Portland cement in the mortar mix. The cubes were cured for 7 days at 100% humidity and the compressive strength of the cubes is presented in Table 21. Up to 60% replacement of ordinary Portland cement ("OPC") yields useable compressive strength for many applications while proportionally reducing $CO_2$ footprint of the mortar.

TABLE 21

7-Day Compressive Strength, SCM Application

| FRS Cementitious Reagent (%) | Compressive Strength (MPa ± 10) |
| --- | --- |
| 0% (100% OPC) | 40 |
| 20% (80% OPC) | 37.5 |
| 40% (60% OPC) | 30 |
| 60% (40% OPC) | 15 |
| 80% (20% OPC) | 3.5 |

Example 11: Using Demolished Concrete

A core of structural concrete was sampled from a 2019 mid-rise housing development in Vancouver, BC. The mineral composition of the concrete (including fine and coarse aggregate) is given in Table 22 (XRD with Rietveld refinement), and the bulk elemental composition is calculated from the mineralogy in Table 23.

TABLE 22

Mineralogy of concrete sample

| Phase | Weight % |
|---|---|
| albite-low (calcian) | 31 |
| quartz-low | 21 |
| albite-low | 11 |
| orthoclase | 8 |
| calcite | 8 |
| CSH gel | 6 |
| clinozoisite | 3 |
| actinolite | 3 |
| clinochlore II | 3 |
| biotite 1M | 2 |
| ettringite | 2 |
| C2S beta | 2 |
| brownmillerite (Al) | 1 |
| gypsum | 1 |

TABLE 23

Oxide Composition (estimated from mineralogy)

| Oxide | Weight % |
|---|---|
| $SiO_2$ | 64 |
| $Al_2O_3$ | 13 |
| $Fe_2O_3$ | 0 |
| FeO | 1 |
| MnO | 0 |
| MgO | 2 |
| CaO | 11 |
| $Na_2O$ | 5 |
| $K_2O$ | 2 |
| $CO_2$ | 4 |
| $H_2O$ | 4 |

The concrete was crushed and pulverized to a powder with D50 of about 20 µm. The powder was fed through a vitrification apparatus that heated the material through the melting point to approximately 1450° C., followed by a quenching step. The resulting glassy particles were finely ground to a powder with D50 of approximately 5-15 µm.

The mineralogy results of this powder yield an estimated molar ratio Si/(Al, $Fe^{3+}$) of 9.88, and a molar cementitious reagent composition of $(Ca,Mg)_{2.79} \cdot (Na,K)_{0.55} \cdot (Al, Fe^{3+})_1 \cdot Si_{9.88}$ and CaO of 11 wt. %. This may be qualified as an "intermediate-Ca cementitious reagent."

Ambient-cured geopolymer cement: Cement paste was thoroughly mixed by weight using the powdered concrete glass (2.5 parts), a potassium silicate solution with molar ratio $SiO_2:K_2O=1.45$ (0.74 parts), and water (0.08 parts). The paste was then placed in cylinder molds and cured at 20° C. Setting time was estimated by Vicat needle penetration test. Initial setting occurred at 51 minutes, and final setting time was 195 minutes.

Compressive strength of a mortar mix including 50:50 of the ambient-cured geopolymer cement and sand was measured by compressing cylinders to failure. After 3 days, compressive strength attained approximately 25 MPa, and tensile strength was approximately 2 MPa (by split cylinder method).

To test high heat performance, a sample of the original structural concrete and a 1 cm diameter cast cylinder of geopolymer were subjected to 750° C. in air for 2 hours. The Portland cement concrete decrepitated and turned to powder upon handling, but the geopolymer mortar cylinder remained intact with no visible cracks or defects.

The novel methods, systems, apparatus, and formulations presented herein provide numerous benefits as detailed throughout. In some instances, the novel formulation and processes result in a particle, powder, or reagent that is particularly useful as a replacement for traditional cementitious additives in hydraulic cement or geopolymer cement compositions. The novel formulation may have a molar composition, in which:

$$\frac{Si}{Si + Al + Fe + (Ca + Mg) + (Na + K)} = 0.295 \text{ to about } 0.605$$

$$\frac{Al}{Si + Al + Fe + (Ca + Mg) + (Na + K)} = 0.190 \text{ to about } 0.340$$

$$\frac{Ca + Mg}{Si + Al + Fe + (Ca + Mg) + (Na + K)} = 0 \text{ to about } 0.215, \text{ and}$$

$$\frac{Na + K}{Si + Al + Fe + (Ca + Mg) + (Na + K)} = 0.04 \text{ to about } 0.24$$

While the novel compositions presented herein result in a unique material that is especially suited for the purposes described throughout, it can be difficult to differentiate the material by its individual elemental ranges or a region on a ternary diagram alone, due to the fact that ternary diagrams are limited to visualization of exactly three compositional parts and all the elemental parts of the total composition have interdependent relationships.

As geochemical compositions are classified as "compositional data," a transformation (centered log-ratio transformation—CLR) from the Simplex to the Euclidean space was applied to the 7-part compositions, preserving the information encoded in molar compositions in a way that standard statistical methods can handle.

On the CLR representation of chemical data, a Rand©m Forest classification was completed, and from this predictive model, the 8-rule classification set (presented below) was extracted. Using this rule set, fly ash and the described feedstock compositions are separated, despite the fact that there may appear to be compositional overlap between these materials on ternary diagrams. A classification model such as this is useful to accurately represent or classify compositions exceeding 3-dimensional data.

Modeling the Novel Formulation and Material

The described glassy reagent ("Novel Feedstock" or alternative cementitious material "ACM") is differentiated from fly ash in several important characteristics, such as time-temperature history, manufacturability at nearly any location, and relatively lower values of problematic heavy metal contaminants. Major element chemical composition of embodiments described herein is also readily differentiated statistically from fly ash using compositional rules. By way of example, a statistical model was built using fly ash compositional data from the literature and expected suitable feedstock compositions as described herein. The classification rules were generated from a subsample as training data, and tested on remaining compositions (fly ash, and the novel compositions described herein) to assess accuracy and predictive power of the classification rules.

In the model below, fly ash is predicted correctly 94% of the time on 331 global compositions of fly ash from the literature, and the other 6% were classified as "outside the rule set." No fly ash samples were misclassified as the novel feedstock geological material described herein. The model was applied to more than 70,000 compositions of natural geological materials that fit in the disclosed molar composition range, and the model predicts the novel feedstock described herein with 99% success rate. Less than 1% of the compositions fell under the category of "outside the rule set." Clearly there are significant and predictable differences between the novel feedstocks described herein and other by product reagents, such as fly ash. Composition alone, represented in centered log-ratio coordinates (CLR) is highly accurate in discerning the chemistry of the described glassy particles from fly ash.

Application of the Model

To apply the model below:
1. Measure bulk chemical composition of a given glassy sample by any suitable analytical method and provide molar % of Si, Al, Fe, Ca, Mg, Na and K.
2. Convert molar data to CLR coordinates for the 7 elements.
3. Apply the following conditions sequentially to predict whether the sample is Fly Ash, or a Novel Feedstock material, respectively.

Note: If a condition is not satisfied, apply next condition. If no conditions apply to given composition, ELSE predicts that the sample is outside of the model's rule set and cannot be confidently predicted.

Rules
1. For glassy material with bulk CaO oxide equivalent wt. %<35%, AND
2. Bulk mol % ratio Si/Al>2, Notably, Rule 1 above can be used to rule out slag as a feedstock, and Rule 2 can be used to rule out metakaolin, kaolinite, and other 1:1 clay rich feedstocks. Apply the following conditions to closed, CLR transformed molar sample compositions using the logic IF (condition=TRUE), THEN (prediction), ELSE (move to next condition) as shown in Table 24 below:

TABLE 24

| Condition | Prediction |
|---|---|
| Si > 0.40109 & Si < =1.18718 & Al <= 0.52677 & Al = 0.40675 & Ca <= −0.40656 & Ca <= −0.7324 | Novel Feedstock |
| Al > 0.5364 & Al > 0.55929 & Ca > −4.65173 & Na <= −1.2763 & Mg <= −0.7076 & K > −4.1446 | Fly Ash |
| Si > 0.43721 & Fe <= 0.31807 & Fe > −2.32162 & Ca <= −0.08759 & Mg > −1.80049 & Mg > −1.47036 | Novel Feedstock |
| Al <= 0.52677 & Ca <= −0.31475 & K > −1.52367 | Novel Feedstock |
| Si <= 0.44413 & K <= −2.12091 | Fly Ash |
| Fe > −1.19597 & Ca <= −0.36227 & Na > −1.79741 & Na <= −0.18124 & Mg > −2.7976 & K <= −1.87031 | Novel Feedstock |
| Al > 0.5364 & Fe > −2.59819 & Mg <= −0.7076 & Mg > −6.29972 & Mg <= −0.93309 & K > −4.10525 | Fly Ash |
| ELSE | Outside rule set |

Figure 11:
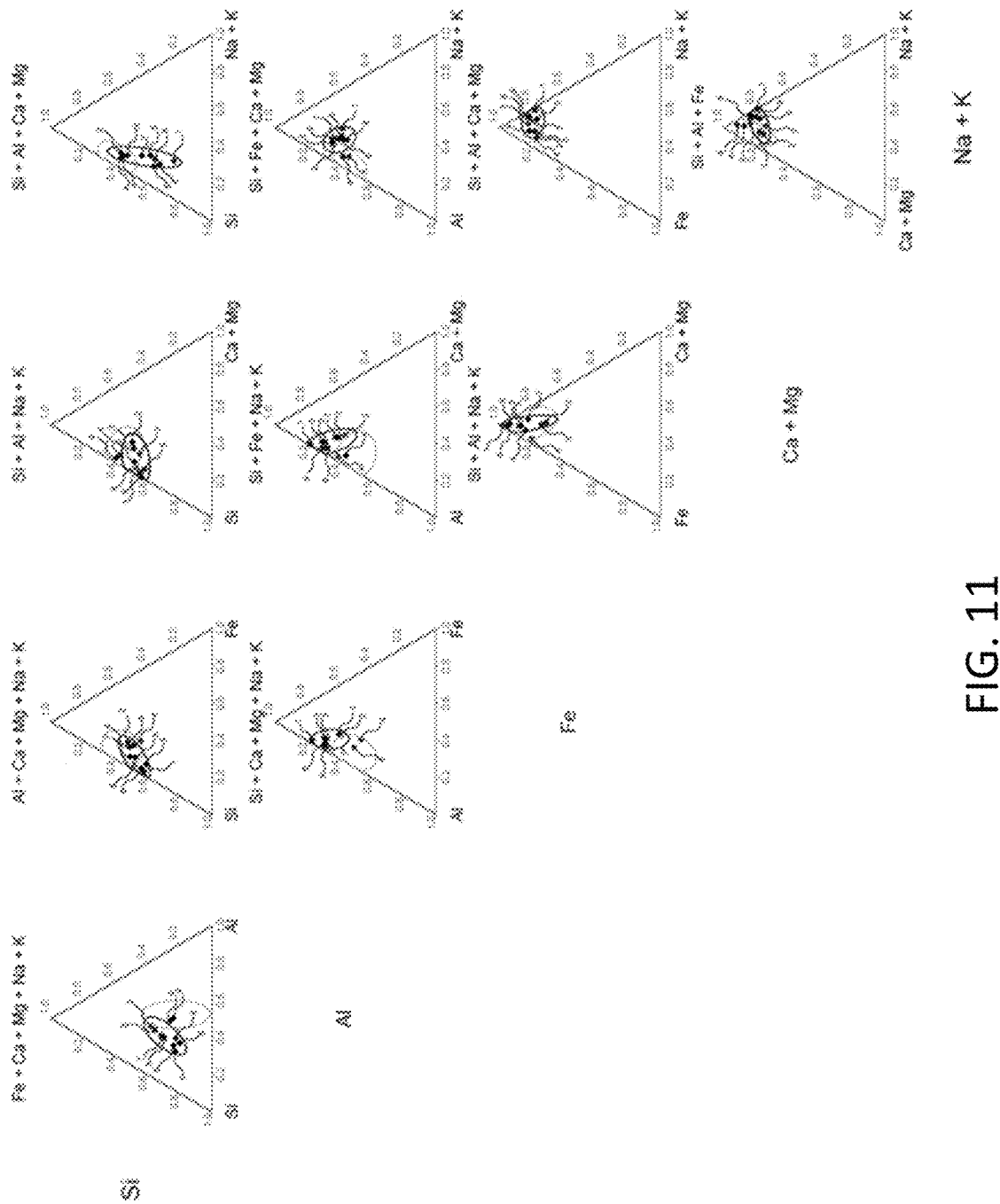
FIG. 11 illustrates the complete set of ternary representations of a Novel Composition closed to Si, Al, Fe, Ca+Mg and Na+K; in accordance with some embodiments.
Figure 12:
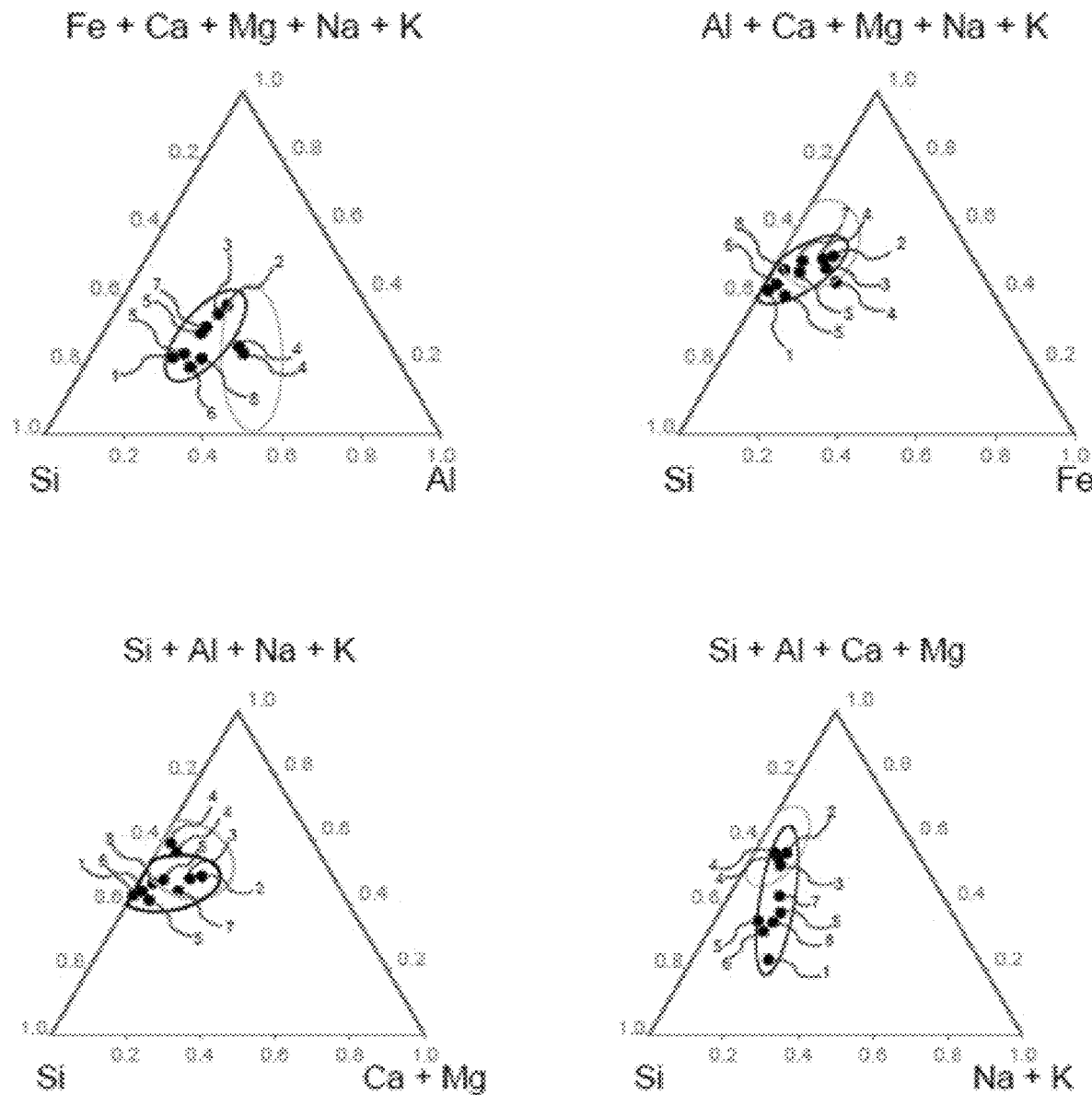
FIG. 12 illustrates ternary diagrams for a Novel Composition from the Si perspective; in accordance with some embodiments.

FIG. 11 illustrates the region of the novel 7-part molar compositions in a complete set of ternary diagrams. The circled areas highlight the differences between the Novel Feedstock and global fly ash samples from the literature. Examples As illustrated, the top row of four ternary diagrams represents the Si perspective and is shown in more detail in FIG. 12. With reference to FIGS. 11-15, a black outline of samples indicates the alternative cementitious material ("ACM") described herein, which may also be referred to as the Novel Feedstock. ACM Compositions of Examples 1-8 are shown as black dots labelled with the number corresponding to the example composition (numbers and compositions summarized in Table 17). The grey outline shown in the figures represents a 90% confidence interval of fly ash samples, based on 331 unique samples (same as were categorized using the above statistical model).

Figure 13:
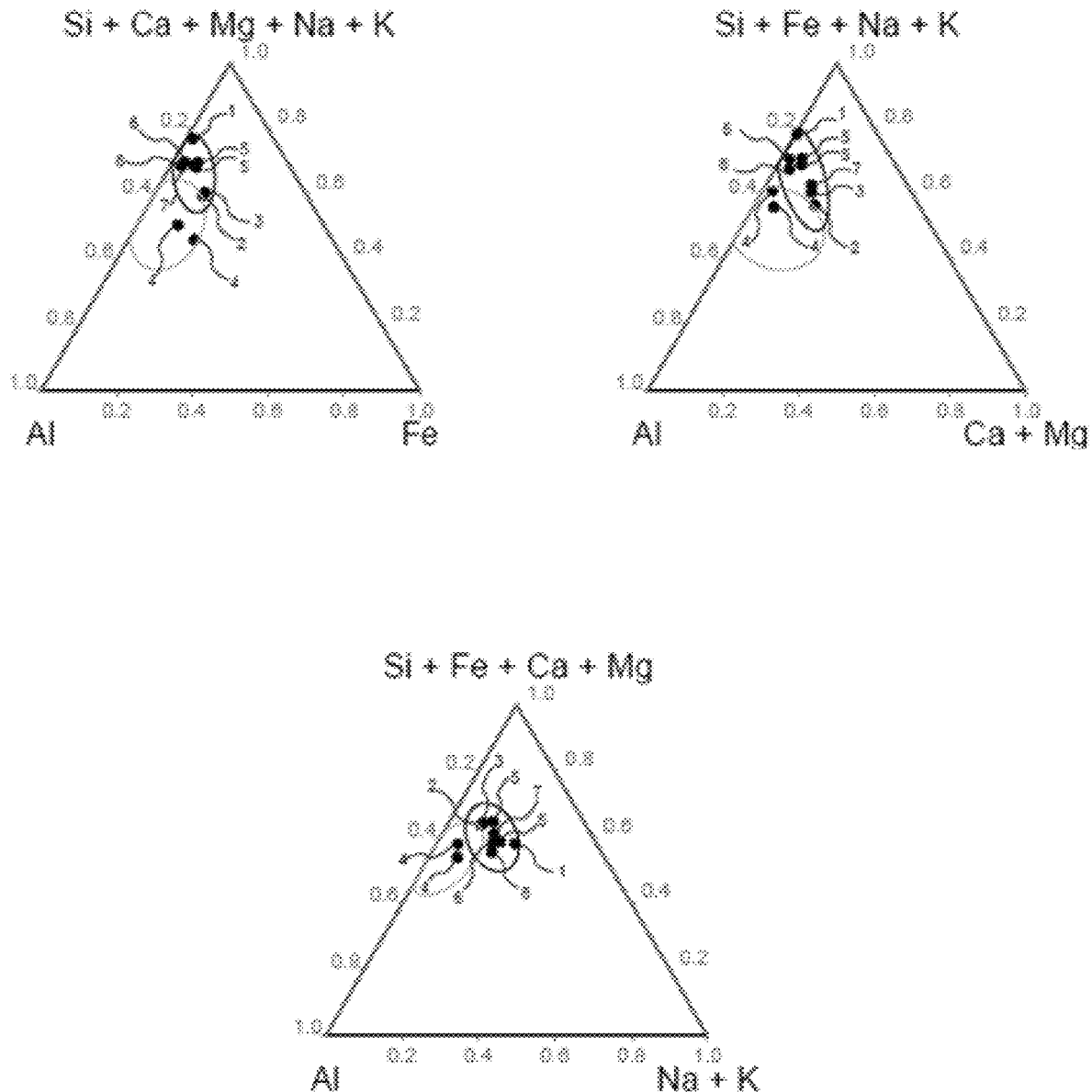
FIG. 13 illustrates ternary diagrams for a Novel Composition from the Al perspective; in accordance with some embodiments.
Figure 14:
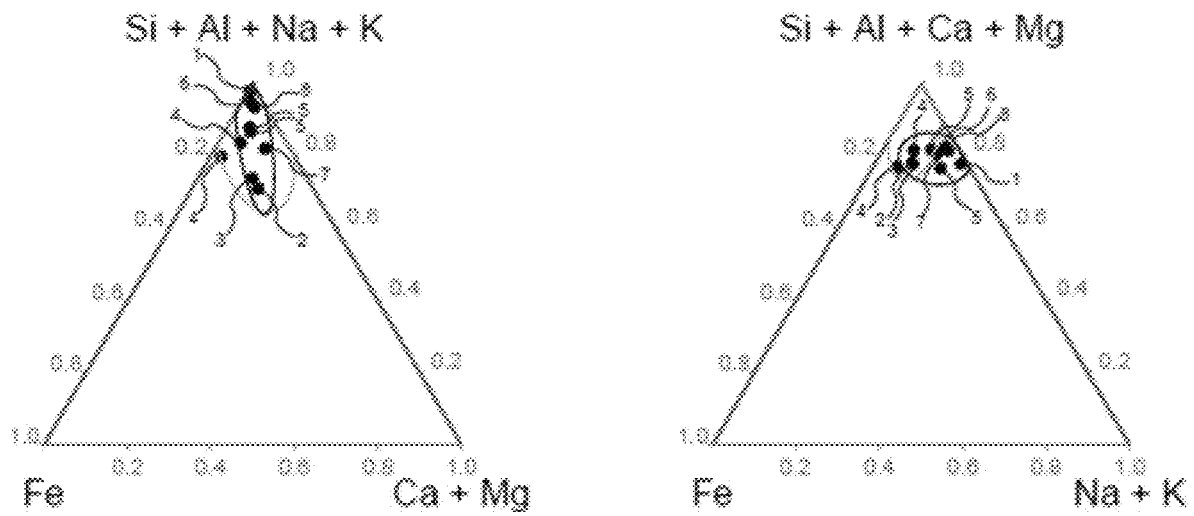
FIG. 14 illustrates ternary diagrams for a Novel Composition from the Fe perspective; in accordance with some embodiments.
Figure 15:
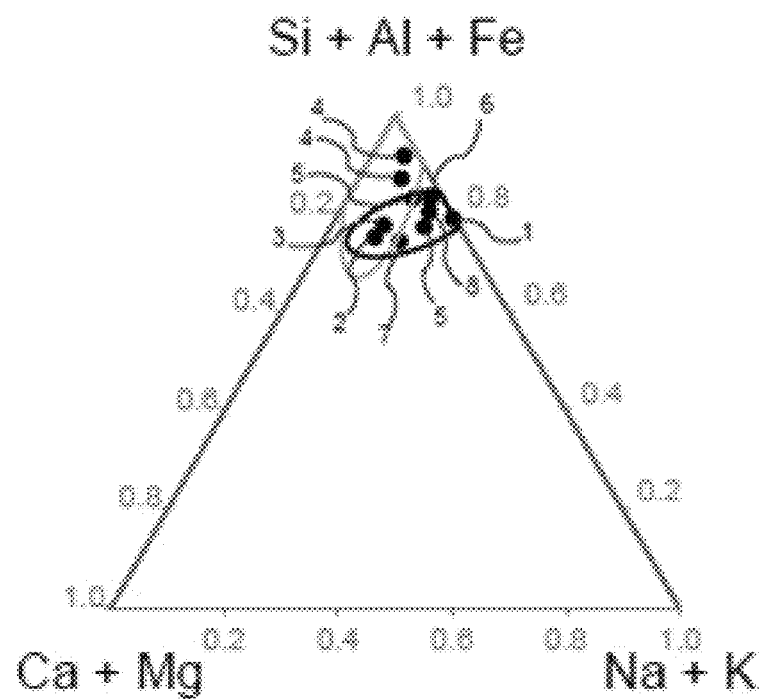
FIG. 15 illustrates ternary diagrams for a Novel Composition from the Ca+Mg perspective; in accordance with some embodiments.

The second row of figures in FIG. 11 represents ternary diagrams from the Al perspective and is shown in further detail in FIG. 13. The third row of figures in FIG. 11 represents ternary diagrams from the Fe perspective and is shown in further detail in FIG. 14. Finally, the last row of FIG. 11 represents a ternary diagram from the Ca+Mg perspective and is shown in greater detail in FIG. 15.

FIGS. 11-15 illustrate the Novel Feedstock as it relates to global fly ash compositions and clearly shows that the two material populations are highly distinguishable from each other even on elemental molar ternary diagrams. The areas of apparent overlap between the Novel Feedstock and fly ash are shown to be differentiated in the higher dimensional classification model provided herein. The Novel Feedstocks or ACM described herein are not particularly alkali resistant and participate in a reaction with alkali hydroxides or lime as a reagent.

Figure 16:
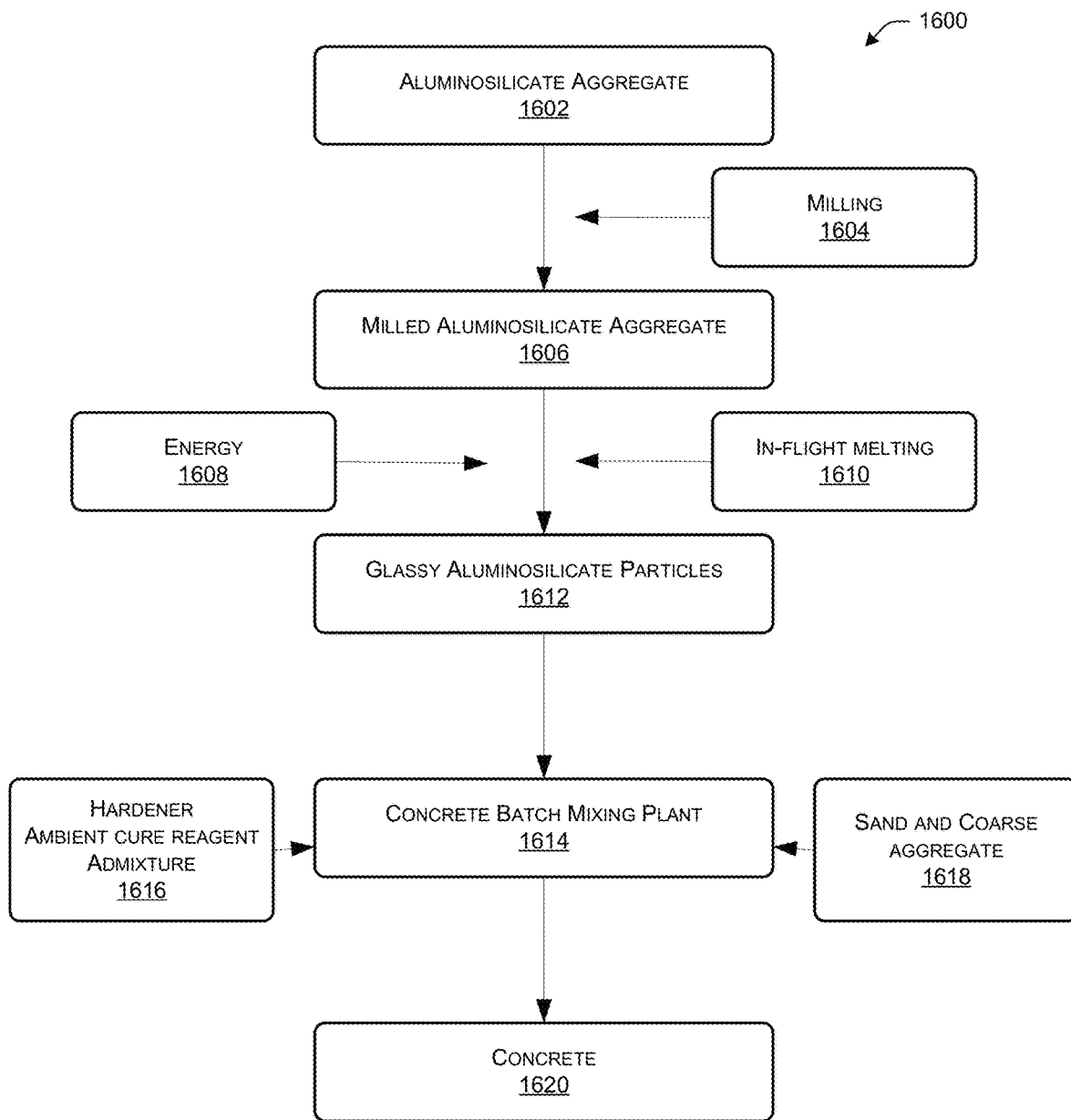
FIG. 16 is a schematic flow diagram describing the process of making an alternative cement concrete using a relatively small decentralized in-flight mini kiln, in accordance with some embodiments.

FIG. 16 illustrates a schematic flow diagram of the process 1600 of making an alternative cement concrete using a relatively small decentralized in-flight mini kiln. The mini kiln can be located at any suitable place, and because of the size and nature of the mini kiln, is especially suited to be collocated at an aggregate quarry, at a concrete batch plant, in between a quarry and a concrete batch plant, or any other suitable location to minimize, or at least reduce, the transportation time and distance typically required for concrete batch plants relying on Portland cement.

At 1602, an aluminosilicate aggregate is provided, as described herein. The aggregate material may be any suitable aluminosilicate material, and may be specifically mined for the intended purpose, or may be waste material, such as mine tailings, ground concrete, or some other type of aggregate. At block 1604, the aluminosilicate material is milled to a powder, as described herein.

At block 1606, a milled aluminosilicate material may be stored, shipped, or provided to an input of a mini kiln as described herein. At block 1608, energy is added to the milled aluminosilicate aggregate, such as combustion of an air/fuel mixture, a torch, industrial heat, or some other form of energy to increase the temperature of the aggregate. In some embodiments, the aluminosilicate particles are optionally amended, blended (e.g., in a vessel prior to thermochemical processing), for example, through addition of a composition adjustment material in order to reach desired ratio(s) with respect to one or several of the elements Ca, Mg, Na, K, Al, Fe, and Si.

At block 1608, the energy causes the aluminosilicate aggregate to melt, which in some cases, occurs in-flight 1610, such as where the aggregate is entrained within a column of air and/or air/fuel within a melting chamber.

At block 1612, after the aggregate is melted and quenched, the feedstock becomes glassy aluminosilicate particles. In some cases, the particles are substantially spheroidal with a roundness R>0.8.

At block 1614, the particles are combined with other ingredients at a concrete batch mixing plant, which may be collocated with the mini kiln in some instances. At block 1616, Additives may be added to the concrete, such as hardener, ambient cure reagent, admixtures, plasticizers, reinforcement materials, and the like. At block 1618, sand and coarse aggregate may be added to the cement as is known in the art.

At block 1620, the final concrete mixture is formed and ready to be used.

According to some embodiments, a method of cement production decreases cement transportation distance (and therefore cost) compared to conventional methods. Some embodiments allow for decentralized production of an Alternative Cement Material (ACM) in close proximity to an aluminosilicate aggregate quarry and a concrete batch plant. This ACM may be advantageously used as a primary reagent in a suitable alternative cement formulation that can be used to make cost-effective and $CO_2$-reduced concrete.

Alternatively, the ACM may be used as an alternative supplementary cementitious material (ASCM) to replace a proportion of Portland cement in conventional concrete and thereby reduce cost and environmental impact of resulting concrete.

Figure 17:
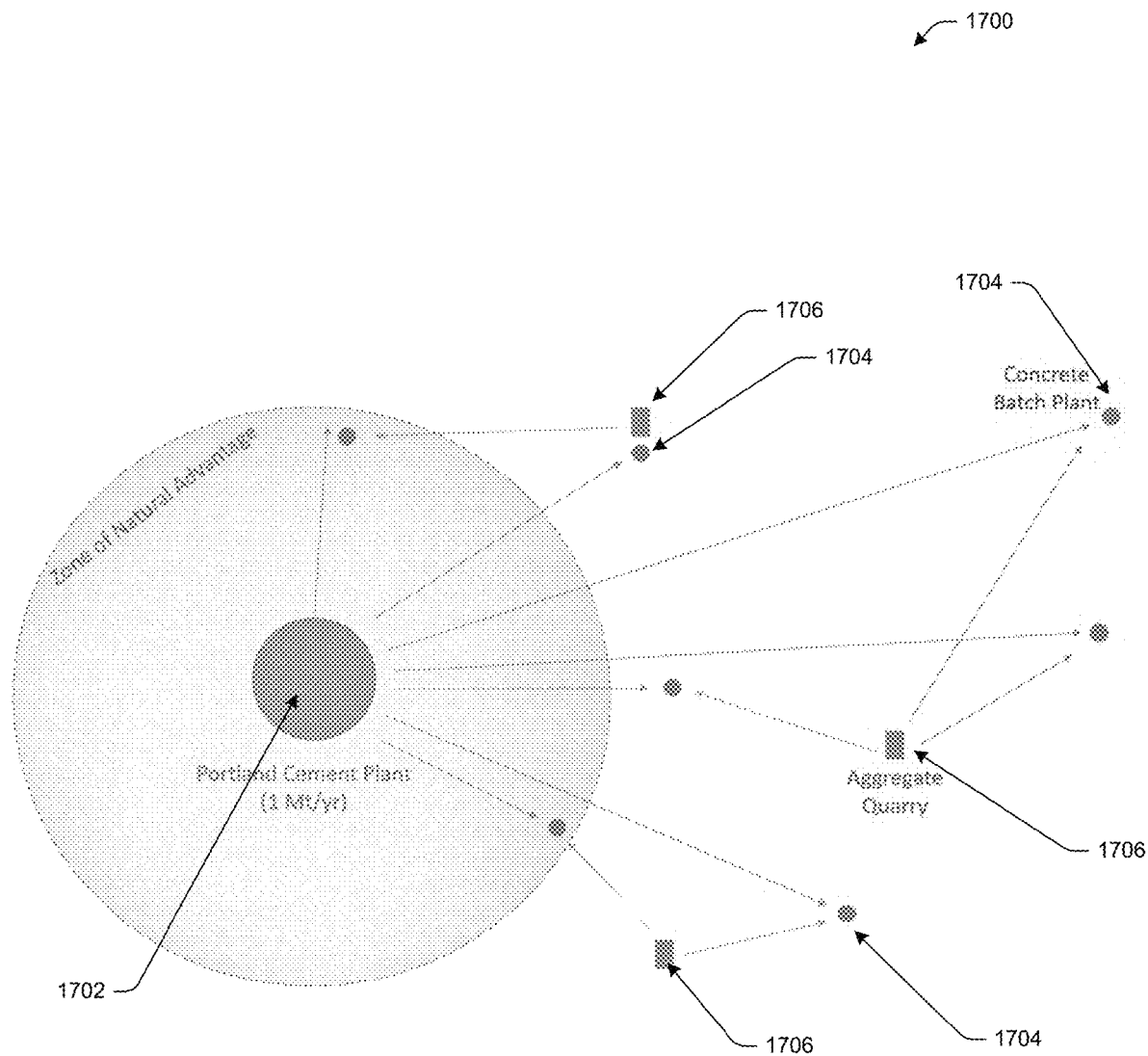
FIG. 17 is a schematic diagram showing conventional cement and aggregate distribution in a modern centralized Portland cement kiln supply chain, in accordance with some embodiments.

FIG. 17 illustrates a typical Portland cement plant 1702 in which the cement may typically be shipped over long distances to reach concrete batch plants 1704. Similarly, aggregate from quarries 1706 may also be shipped long distances to reach their destination at concrete batch plants 1704. The time and energy to ship these dense and voluminous products dramatically increases the cost associated with manufacturing concrete as well as contributes to the overall $CO_2$ emissions associated with concrete production.

Figure 18:
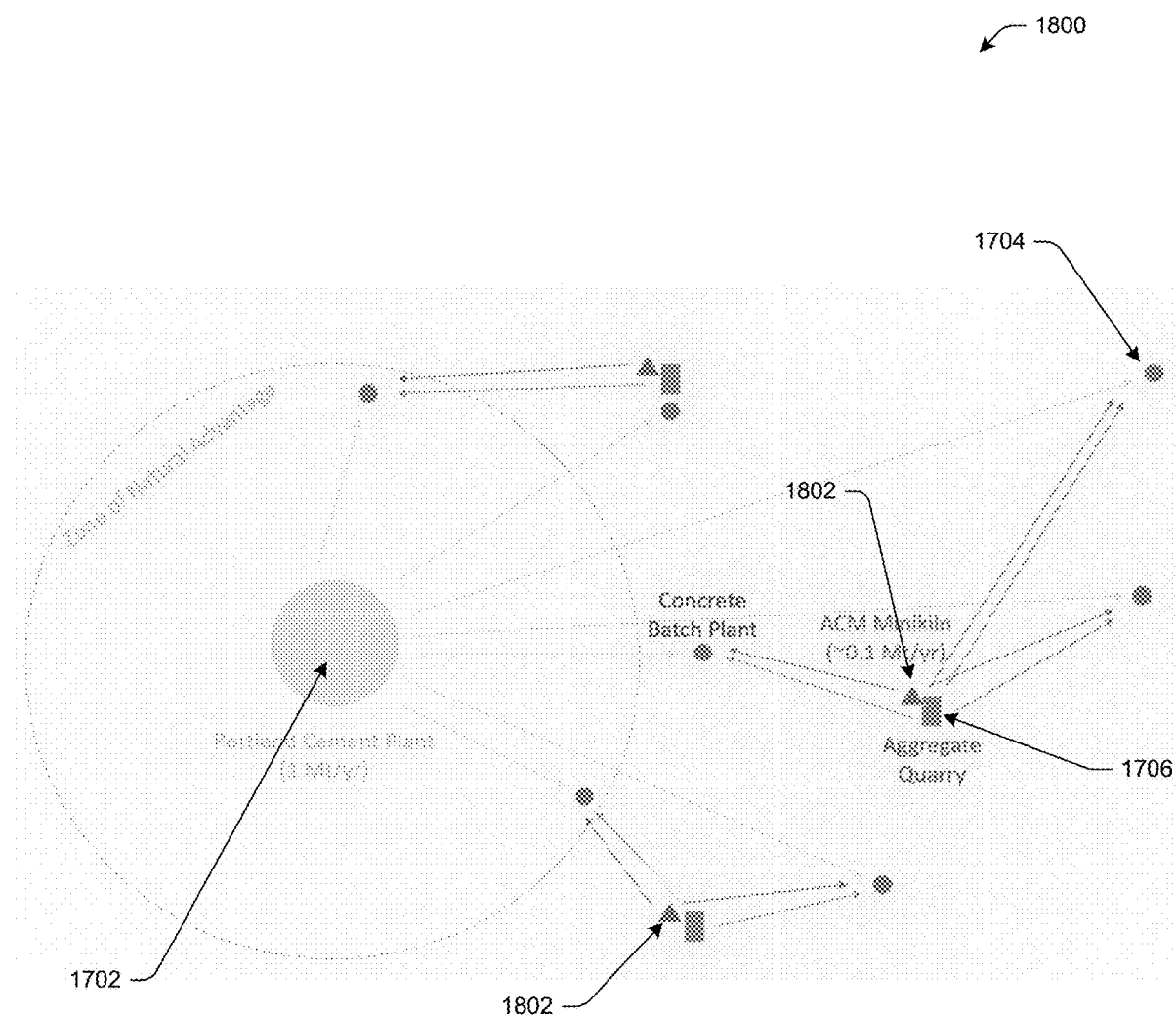
FIG. 18 is a schematic diagram showing the transportation advantages of collocating alternative cement material (ACM) mini kilns at aggregate quarries in a novel decentralized method, in accordance with some embodiments.

FIG. 18 illustrates an alternative arrangement 1800 that utilizes the ACM described herein. In some instances, an ACM mini kiln 1802 can be collated at an aggregate quarry 1706 site. In this way, the aluminosilicate material mined at the aggregate quarry 1706 can be processed at the ACM mini kiln 1802 on-site without transporting the aggregate to a remote location. The ACM and sufficient aggregate can then be sent to the concrete batch plant 1704, which may be in much closer proximity.

Figure 19:
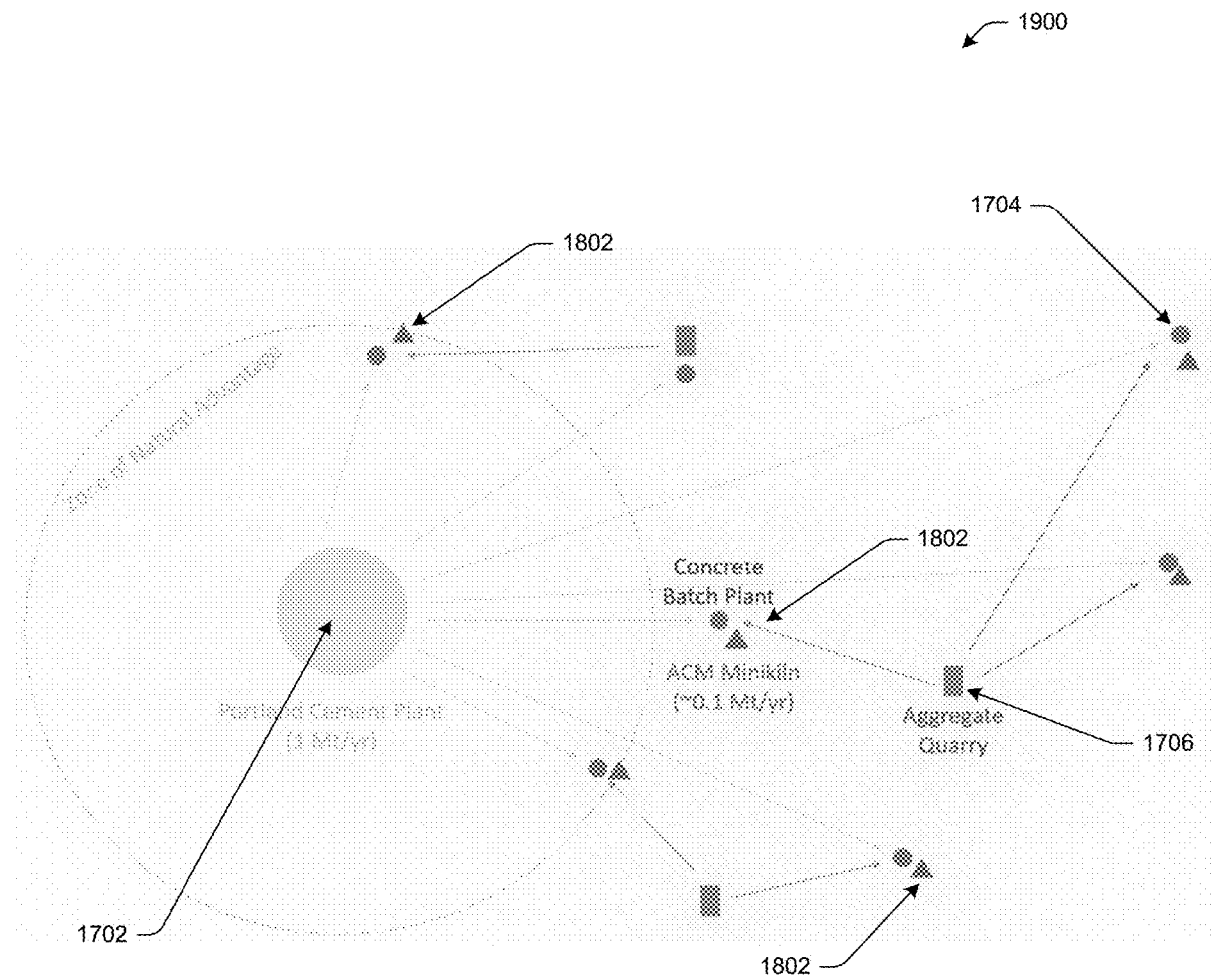
FIG. 19 is a schematic diagram showing the transportation advantages of collocating alternative cement material (ACM) mini kilns at concrete batch plants in a novel decentralized method, in accordance with some embodiments.

FIG. 19 illustrated an alternative arrangement 1900 that utilizes the ACM described herein. In the illustrated embodiment, and ACM mini kiln 1802 can be collocated with a concrete batch plant 1704. Accordingly aggregate from an aggregate quarry 1706 can be delivered to the concrete batch plant 1802 and the aggregate can be used by the ACM mini kiln 1802 as described herein, and also be used as the coarse aggregate in the concrete mix.

Figure 20:
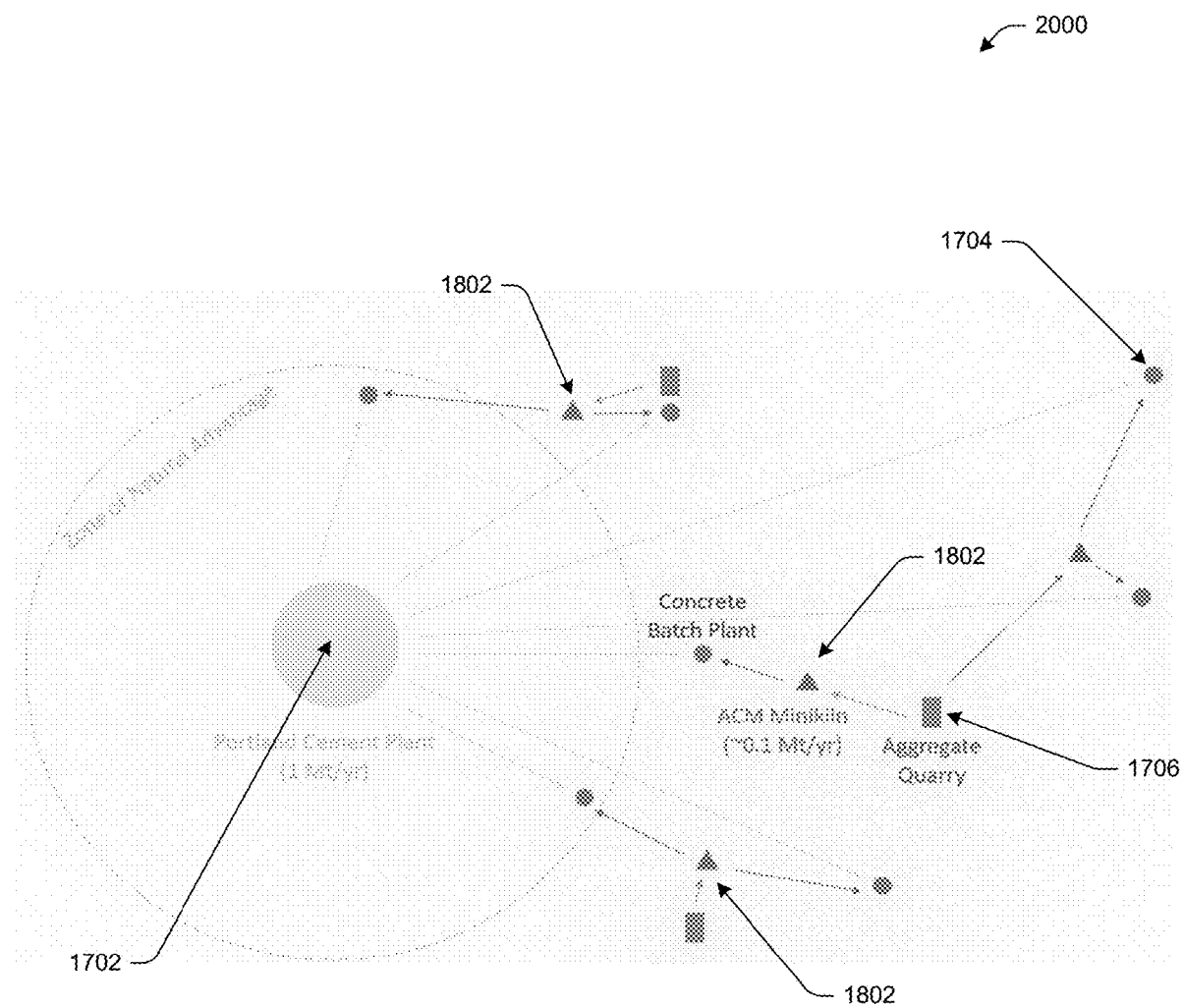
FIG. 20 is a schematic diagram showing the transportation advantages of locating alternative cement material (ACM) mini kilns in a novel decentralized manner at independent sites in the vicinity of aggregate quarries and concrete batch plants, in accordance with some embodiments.

FIG. 20 illustrates an alternative arrangement 2000 that utilizes the ACM described herein. In the illustrated embodiment, an ACM mini kiln 1802 is located between an aggregate quarry 1706 and a concrete batch plant 1704. In this arrangement, aggregate can be delivered to the ACM mini kiln, which utilizes the aggregate to formulate ACM as described herein, and the ACM and additional aggregate can be shipped to a concrete batch plant.

The mini kiln architecture allows a distributed system that takes advantage of the smaller, and even portable nature, of the ACM mini kiln. Rather than relying on a single centralized Portland cement plant that must ship cement long distances, a number of ACM mini kilns can replace a Portland cement plant and reduce shipping times and costs dramatically. The illustrated embodiments of FIGS. 17-20 offer an architecture that is nimble, efficient, and reduces waste by locating the ACM mini kiln in close proximity to the aggregate quarry, the concrete batch plant, or both.

Suitable feedstock compositions and the process of converting the feedstock to microspheroidal glassy particles have been disclosed in Applicant's co-pending applications having Ser. No. 62/867,480, filed on Jun. 27, 2019 and Ser. No. 63/004,673, filed Apr. 3, 2020, the entire disclosures of which are hereby incorporated by reference in their entirety. Suitable feedstocks are generally rocks and minerals bearing a proportion of both aluminum and silicon oxides. Ordinary construction aggregate materials used in concrete are suitable, economic, and conveniently located for use as an ideal cement feedstock. Previously, it was not possible to make a cementitious material from such ordinary crystalline aluminosilicate materials.

One particular advantage of using aluminosilicate aggregate as ACM feedstock is that the material is cheaply and abundantly available.

Another particular advantage is that aluminosilicate aggregate quarries exist widely, and generally there is no need for permitting of new quarries to make ACM by the present method in most markets.

Another particular advantage of using aluminosilicate aggregate as ACM feedstock is that a mini kiln (for example as described in Applicant's co-pending application having Ser. No. 63/004,673) may be collocated at or very near the aggregate quarry, or concrete batch plant, or both, thus minimizing transportation costs of cement. This great advantage comes about because cement from large centralized kilns travels on average 5-10 times further than aggregate (supply of which is decentralized); a natural consequence of widespread aggregate availability, low price of aggregate, and high price of shipping aggregate.

Another particular advantage of using aluminosilicate aggregate as ACM feedstock is that frequently quarries have abundant byproduct material available that is "off-specification" meaning that there is no common use for that particular gradation, despite such materials sharing generally identical composition with the main quarry products. Such byproduct materials are very cheaply available at both crushed stone aggregate quarries, as well as sand and gravel quarries.

Another particular advantage of the decentralized ACM mini kilns is that capital cost per unit of throughput is expected to be similar to conventional rotary cement kilns, though the absolute scale of capital requirement is on the order of $\frac{1}{10}^{th}$ what it would be for Portland cement production.

Another particular advantage of the decentralized ACM mini kilns is that operating expenditures per unit of throughput are not expected to exceed the corresponding expenses in manufacture of Portland cement. Thereby, ACM production is cost-competitive with Portland cement at a smaller scale of production yet requires 5-10 times less shipping expense.

The present disclosure further includes the following numbered clauses.

Clause 1. Solid microspheroidal glassy particles, wherein said particles comprise one or more of the following properties: mean roundness (R)>0.8; and less than about 40% particles having angular morphology (R<0.7).

Clause 2. The particles of clause 1, wherein said particles comprise a mean roundness (R) of at least 0.9.

Clause 3 The particles of clause 1 or 2, wherein less than about 30% particles, or less than about 25% particles, or less than about 20% particles, or less than about 15% particles, or less than about 10% particles have an angular morphology (R<0.7).

Clause 4. The particles of any one of clause 1 to 3, wherein said particles comprise the mean oxide Formula 1: $(CaO,MgO)a \cdot (Na_2O,K_2O)b \cdot (Al_2O_3,Fe_2O_3)c \cdot (SiO_2)d$ [Formula 1] wherein a is about 0 to about 4, b is about 0.1 to about 1, c is 1, and d is about 1 to about 20.

Clause 5. The particles of any one of clauses 1 to 4, wherein said particles comprise one or more of the following properties: (i) a content of 45%-100%, and preferably 90-100%, X-ray amorphous solid; and (ii) molar composition ratios of $(Ca,Mg)_{0-12} \cdot (Na,K)_{0.05-1} \cdot (Al, Fe^{3+})_1 \cdot Si_{1-20}$.

Clause 6. The particles of any one of clauses 1 to 5, wherein said particles are 40-100% X-ray amorphous, more preferably about 80 to about 100% X-ray amorphous, even more preferably 100% non-crystalline.

Clause 7. The particles of any one of clauses 1 to 6, wherein said particles comprise less than about 10 wt. % CaO.

Clause 8. The particles of any one of clauses 1 to 6, wherein said particles comprise more than about 30 wt. % CaO.

Clause 9. The particles of any one of clauses 1 to 6, wherein said particle comprises a high-calcium content with a molar composition of $Si/(Fe^{3+},Al)$ between 1-20, and CaO content of about 10 to about 50 wt. %, preferably about 20-45 wt. %.

Clause 10. The particles of any one of clauses 1 to 6, wherein said particle comprises an intermediate-calcium content with a molar composition of $Si/(Fe^{3+},Al)$ between 1-20, and CaO content of about 10 to about 20 wt. %.

Clause 11. A cementitious reagent comprising a mixture of microspheroidal glassy particles as defined in any one of clauses 1 to 10.

Clause 12. A cementitious reagent comprising a mixture of microspheroidal glassy particles, wherein said particles comprises one or more of the following properties: (i) mean roundness (R)>0.8; (ii) less than about 20% particles having angular morphology (R<0.7); (iii) the oxide Formula 1 as defined in claim 4; (iv) a content of 45%-100%, and preferably 90-100%, X-ray amorphous solid; and (v) a molar composition ratios of $(Ca,Mg)_{0-12} \cdot (Na,K)_{0.05-1} \cdot (Al, Fe^{3+})_1 \cdot Si_{1-20}$; and (vi) a low calcium content of about <10 wt. % CaO, or an intermediate calcium content of about 10 to about 20% wt. % CaO, or a high calcium content of >30 wt. % CaO.

Clause 13. The cementitious reagent of clause 12, wherein said cementitious reagent is in the form of a non-crystalline solid.

Clause 14. The cementitious reagent of clause 12 or 13, wherein said cementitious reagent is in the form of a powder.

Clause 15. The cementitious reagent of any one of clauses 12 to 14, wherein said cementitious reagent comprises particle size distribution with D[3,2] of about 20 μm or less, more preferably 10 μm or less, or most preferably 5 μm or less.

Clause 16. The cementitious reagent of any one of clauses 12 to 15, wherein said mixture of particles comprises the oxide Formula 1: $(CaO,MgO)a \cdot (Na_2O,K_2O)b \cdot (Al_2O_3, Fe_2O_3)c \cdot (SiO_2)d$ [Formula 1] wherein a is about 0 to about 4, b is about 0.1 to about 1, c is 1, and d is about 1 to about 20.

Clause 17. The cementitious reagent of any one of clauses 12 to 16, wherein said cementitious reagent comprises less than about 10 wt. % CaO.

Clause 18. The cementitious reagent of any one of clauses 12 to 16, wherein said cementitious reagent comprises more than about 30 wt. % CaO.

Clause 19. The cementitious reagent of any one of clauses 12 to 16, wherein the cementitious reagent is a high-calcium containing cementitious reagent with a molar composition of $Si/(Fe^{3+},Al)$ between 1-20, and CaO content of about 10 to about 50 wt. %, preferably about 20-45 wt. %.

Clause 20. The cementitious reagent of any one of clauses 12 to 16, wherein the cementitious reagent is an intermediate-calcium containing cementitious reagent with a molar composition of $Si/(Fe^{3+},Al)$ between 1-20, and CaO content of about 10 to about 20 wt. %.

Clause 21. The cementitious reagent of any one of clauses 12 to 20, wherein the cementitious reagent is about 40-100% and preferably about 80 to about 100% X-ray amorphous, and even more preferably 100% non-crystalline.

Clause 22. A geopolymer binder comprising a cementitious reagent as defined in any one of clauses 11 to 21.

Clause 23. A supplementary cementitious material (SCM) comprising a cementitious reagent as defined in any one of claims 11 to 21.

Clause 24. The SCM of claim 23, comprising at least 20 wt. % of said cementitious reagent.

Clause 25. A solid concrete, comprising a cementitious reagent as defined in any one of clauses 11 to 20.

Clause 26. Use of the microspheroidal glassy particles as defined in any one of clauses 1 to 10 and/or of the cementitious reagent of any one of claims 11 to 20, to manufacture a geopolymer binder or cement, a hydraulic cement, a supplementary cementitious material (SCM) and/or solid concrete.

Clause 27. A method for producing a cementitious reagent from aluminosilicate materials, comprising the steps of: (i) providing a solid aluminosilicate material; (ii) in-flight melting/quenching said solid aluminosilicate material to melt said material into a liquid and thereafter to quench said liquid to obtain a molten/quenched powder comprising solid microspheroidal glassy particles; thereby obtaining a cementitious reagent with said powder of microspheroidal glassy particles.

Clause 28. The method of clause 27, wherein said method further comprises step (iii) of grinding said powder of microspheroidal glassy particles into a finer powder.

Clause 29. The method of clauses 27 or 28, wherein said powder comprises particle size distribution with D[3,2] of about 20 μm or less, more preferably 10 μm or less, or most preferably 5 μm or less.

Clause 30. The method of any one of clauses 27 to 29, wherein said particles comprise one or more of the following properties: a mean roundness (R) of at least 0.7; less than about 20% particles of angular morphology; the oxide Formula 1 as defined in claim 4; a content of 45%-100%, and preferably 90-100%, X-ray amorphous solid; molar composition ratios of $(Ca,Mg)_{0-12} \cdot (Na,K)_{0.05-1} \cdot (Al, Fe^{3+})_1 \cdot Si_{1-20}$; and a calcium content of less than about 10 wt. % CaO.

Clause 31. The method of any one of clauses 27 to 30, wherein said cementitious reagent comprises one or more of the following properties: is reactive in cementitious systems and/or in geopolymeric systems; delivers workable low yield stress geopolymer cement mixes below 25 Pa when a cement paste has an oxide mole ratio of $H_2O/(Na_2O,K_2O)<20]$; uses a water content in cement paste such that the oxide mole ratio $H_2O/(Na_2O,K_2O)<20$; and delivers a cement paste with higher workability than an equivalent paste with substantially angular morphology, given the same water content.

Clause 32. The method of any one of clauses 27 to 31, further comprising the step of adjusting composition of a non-ideal solid aluminosilicate material to a desired content of the elements Ca, Mg, Na, K, Al, Fe, and Si.

Clause 33. The method of clause 32, wherein said adjusting comprises blending said non-ideal aluminosilicate material with a composition adjustment material in order to reach desired ratio(s) with respect to one or several of the elements Ca, Mg, Na, K, Al, Fe, and Si.

Clause 34. The method of any one of clauses 27 to 33, further comprising the step of sorting said solid aluminosilicate material to obtain a powder of aluminosilicate particles of a desired size.

Clause 35. The method of any one of clauses 27 to 34, further comprising the step of discarding undesirable waste material from said solid aluminosilicate material.

Clause 36. The method of any one of clauses 27 to 35, wherein said in-flight melting comprises heating at a temperature above a liquid phase temperature to obtain a liquid.

Clause 37. The method of clause 36, wherein said temperature is about 1000° C. to about 1600° C., or about 1300° C. to about 1550° C.

Clause 38. The method of any one of clauses 27 to 37, further comprising adding a fluxing material to the solid aluminosilicate material to lower its melting point and/or to induce greater enthalpy, volume, or depolymerization of said liquid.

Clause 39. The method of clause 38, wherein the fluxing material is mixed with said solid aluminosilicate material prior to, or during said melting.

Clause 40. The method of any one of clauses 27 to 39, wherein said in-flight melting/quenching comprises reducing temperature of said liquid below temperature of glass transition to achieve a solid.

Clause 41. The method of clause 40, wherein said in-flight melting/quenching comprises reducing temperature of said liquid below about 500° C., or preferably below about 200° C. or lower.

Clause 42. The method of clause 41, wherein reducing temperature of said liquid comprises quenching at a rate of about $10^2$ $Ks^{-1}$ to about $10^6$ $Ks^{-1}$, preferably at a rate of $>10^{3.5}$ $Ks^{-1}$.

Clause 43. The method of clause 41, wherein quenching comprises a stream of cool air, steam, or water.

Clause 44. The method of any one of clauses 27 to 43, further comprising reducing particle size of said powder of solid microspheroidal glassy particles.

Clause 45. The method of clause 44, wherein reducing particle size comprises crushing and/or pulverizing said powder in any one of a ball mill, a roller mill, a vertical roller mill.

Clause 46. The method of any one of clauses 27 to 45, further comprising separating quenched solid particles from hot gases in a cyclone separator.

Clause 47. An apparatus for producing microspheroidal glassy particles, comprising: a burner; a melting chamber; and a quenching chamber.

Clause 48. The apparatus of clause 47, wherein the melting chamber and the quenching chamber are first and second sections of the same chamber, respectively.

Clause 49. The apparatus of clauses 47 or 48, wherein said apparatus is configured such that solid particles are flown in suspension, melted in suspension, and then quenched in suspension in said apparatus.

Clause 50. The apparatus of any one of clauses 47 to 49, wherein said burner provides a flame heating solid particles in suspension to a heating temperature sufficient to substantially melt said solid particles into a liquid.

Clause 51. The apparatus of any one of clauses 47 to 50, wherein said burner comprises a flame that is fueled with a gas that entrains aluminosilicate feedstock particles towards the melt/quench chamber.

Clause 52. The apparatus of clause 51, wherein the gas comprises an oxidant gas and a combustible fuel.

Clause 53. The apparatus of any one of clauses 47 to 52, wherein said the quenching chamber comprises a cooling system for providing cool air inside the quenching chamber, said cool air quenching molten particles to solid microspheroidal glassy particles.

Clause 54. The apparatus of clause 53, wherein said a cooling system comprises a liquid cooling loop positioned around the quenching chamber.

Clause 55. The apparatus of any one of clauses 47 to 54, wherein the apparatus further comprises a cyclone separator to collect microspheroidal glassy particles.

Clause 56. The apparatus of any one of clauses 47 to 55, wherein the burner comprises at least one of a plasma torch, an oxy-fuel burner, an air-fuel burner, a biomass burner, and a solar concentrating furnace.

Clause 57. A method for producing a cementitious reagent from aluminosilicate materials, comprising the steps of: (i) providing a solid aluminosilicate material; (ii) in-flight melting/quenching said solid aluminosilicate material to melt said material into a liquid and thereafter to quench said liquid to obtain a molten/quenched powder comprising solid microspheroidal glassy particles; thereby obtaining a cementitious reagent with said powder of microspheroidal glassy particles.

Clause 58. A method for producing microspheroidal glassy particles, comprising the steps of: providing an in-flight melting/quenching apparatus, said apparatus comprising a burner, a melting chamber and a quenching chamber; providing solid particles; flowing said solid particles in suspension in a gas to be burned by said burner; heating said solid particles into said melting chamber to a heating temperature above liquid phase to obtain liquid particles in suspension; quenching said liquid particles in suspension to a cooling temperature below liquid phase to obtain a powder comprising solid microspheroidal glassy particles.

Clause 59. The method of clause 58, wherein the melting chamber and the quenching chamber are first and sections of the same chamber, respectively.

Clause 60. The method of clauses 58 or 59, wherein said heating temperature is about 1000° C. to about 1600° C., or about 1300° C. to about 1550° C.

Clause 61. The method of any one of clauses 58 to 60, wherein cooling temperature is below 500° C., or below 200° C.

Clause 62. The method of any one of clauses 58 to 61, wherein said solid particles comprise aluminosilicate materials.

Clause 63. The method of any one of clauses 58 to 62, wherein said burner comprises a flame that is fueled with a gas that entrains the solid particles towards the melting chamber.

Clause 64. The method of clause 63, wherein the gas comprises an oxidant gas and a combustible fuel.

Clause 65. The method of any one of clauses 58 to 64, wherein said quenching comprises providing cool air inside the quenching chamber.

Clause 66. The method of any one of clauses 58 to 65, further comprising collecting said powder with a cyclone separator.

Clause 67. Use of an apparatus comprising at least one of a plasma torch, an oxy-fuel burner, an air-fuel burner, a biomass burner, and a solar concentrating furnace, for producing microspheroidal glassy particles.

Clause 68. Use of an apparatus comprising at least one of a plasma torch, an oxy-fuel burner, an air-fuel burner, a biomass burner, and a solar concentrating furnace, for producing a cementitious reagent from aluminosilicate materials.

Clause 67. All novel compounds, compositions, processes, apparatuses, systems methods and uses substantially as hereinbefore described with particular references to the Examples and the Figures.

Headings are included herein for reference and to aid in locating certain sections. These headings are not intended to limit the scope of the concepts described therein, and these concepts may have applicability in other sections throughout the entire specification.

Unless otherwise indicated, all numbers expressing quantities of ingredients, reaction conditions, concentrations, properties, and so forth used in the specification and claims are to be understood as being modified in all instances by the term "about." At the very least, each numerical parameter should at least be construed in light of the number of reported significant digits and by applying ordinary rounding techniques. Accordingly, unless indicated to the contrary, the numerical parameters set forth in the present specification and attached claims are approximations that may vary depending upon the properties sought to be obtained. Notwithstanding that the numerical ranges and parameters setting forth the broad scope of the embodiments are approximations, the numerical values set forth in the specific examples are reported as precisely as possible. Any numerical value, however, inherently contains certain errors resulting from variations in experiments, testing measurements, statistical analyses and such. As used herein, the terms "about" and "approximately" may, in some examples, indicate a variability of up to ±5% of an associated numerical value, e.g., a variability of up to ±2%, or up to ±1%.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." For ease of use, the terms "including" and "having" (and their derivatives), as used in the specification and/or claims, are interchangeable with and have the same meaning as the word "comprising."

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an oxidant gas that comprises or includes oxygen include embodiments where an oxidant gas consists essentially of oxygen and embodiments where an oxidant gas consists of oxygen.

What is claimed is:

1. A geopolymer cement, comprising:
   a cementitious reagent comprising:
   particles comprising atoms of Si, Al, Fe, Ca, Mg, Na, and K, in which:

$$\frac{Si}{Si + Al + Fe + (Ca + Mg) + (Na + K)} = 0.067 \text{ to about } 0.95$$

$$\frac{Al}{Si + Al + Fe + (Ca + Mg) + (Na + K)} = 0 \text{ to about } 0.488$$

$$\frac{Fe}{Si + Al + Fe + (Ca + Mg) + (Na + K)} = 0 \text{ to about } 0.488$$

$$\frac{Ca + Mg}{Si + Al + Fe + (Ca + Mg) + (Na + K)} = 0 \text{ to about } 0.857, \text{ and}$$

$$\frac{Na + K}{Si + Al + Fe + (Ca + Mg) + (Na + K)} = 0.0015 \text{ to about } 0.33;$$

an ambient cure reagent; and
a hardener.

2. The geopolymer cement of claim 1, wherein the particles are in the form of a non-crystalline solid.

3. The geopolymer cement of claim 1, wherein the particles are in a powder form comprising a particle size distribution with D[3,2] of 20 μm or less.

4. The geopolymer cement of claim 1, wherein the particles are solid microspheroidal glassy particles.

5. The geopolymer cement of claim 1, wherein less than 40% of the particles have an angular morphology in which (R)<0.7.

6. The geopolymer cement of claim 1, wherein the particles comprise a mean roundness (R) of at least 0.9.

7. The geopolymer cement of claim 1, comprising: $(CaO, MgO)_a \cdot (Na_2O, K_2O)_b \cdot (Al_2O_3, Fe_2O_3)_c \cdot (SiO_2)_d$
   wherein a is about 0 to about 4;
   b is about 0.1 to about 1;
   c is 1; and
   d is about 1 to about 20.

8. The geopolymer cement of claim 1, wherein the cementitious reagent comprises 40-70% of the geopolymer cement.

9. The geopolymer cement of claim 1, wherein the ambient cure reagent comprises a leachable source of calcium.

10. The geopolymer cement of claim 1, wherein the hardener is a liquid hardener.

11. The geopolymer cement of claim 1, wherein the particles are 100% non-crystalline.

12. A geopolymer cement comprising a cementitious reagent comprising non-fly ash microspheroidal glassy particles containing Si, Al, Fe, Ca, Mg, Na, and K, in which:

$$0.067 < \frac{Si}{Al + Fe + (Ca + Mg) + (Na + K)} < 0.95;$$

$$0 < \frac{Al}{Si + Fe + (Ca + Mg) + (Na + K)} < 0.488;$$

$$0 < \frac{Fe}{Si + Al + (Ca + Mg) + (Na + K)} < 0.488;$$

$$0.0 < \frac{Ca + Mg}{Si + Al + Fe + (Na + K)} < 0.857;$$

$$0.0015 < \frac{Na + K}{Si + Al + Fe + (Ca + Mg)} < 0.33,$$

and a liquid hardener, wherein the liquid hardener is an alkali-silicate solution where a molar ratio of $Me_2O/SiO_2$ is less than 1, wherein Me=(Na or K).

13. The geopolymer cement as in claim 12, further comprising an ambient cure reagent.

14. The geopolymer cement as in claim 12, further comprising a concrete batch mixture comprising:
- 5-45 wt. % solid aggregate;
- 15-25 wt. % ambient cure reagent; and
- 20-70 wt. % of the cementitious reagent.

15. The geopolymer cement as in claim 12, wherein the geopolymer cement is substantially free of fly ash.

16. The geopolymer cement as in claim 12, wherein less than about 50% of the microspheroidal glassy particles have a mean roundness (R)<0.7.

17. The geopolymer cement as in claim 12, wherein the microspheroidal glassy particles have a Sauter mean diameter D[3,2] of about 20 micrometers or less.

18. The geopolymer cement as in claim 12, comprising less than about 10 wt. % CaO.

* * * * *